United States Patent
Choyi et al.

(10) Patent No.: US 10,601,594 B2
(45) Date of Patent: *Mar. 24, 2020

(54) END-TO-END SERVICE LAYER AUTHENTICATION

(71) Applicant: Convida Wireless, LLC, Wilmington, DE (US)

(72) Inventors: Vinod Kumar Choyi, Conshohocken, PA (US); Dale N. Seed, Allentown, PA (US); Catalina M. Mladin, Hatboro, PA (US); Chonggang Wang, Princeton, NJ (US)

(73) Assignee: Convida Wireless, LLC, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/156,396

(22) Filed: Oct. 10, 2018

(65) Prior Publication Data

US 2019/0123909 A1    Apr. 25, 2019

Related U.S. Application Data

(63) Continuation of application No. 14/928,909, filed on Oct. 30, 2015, now Pat. No. 10,129,031.
(Continued)

(51) Int. Cl.
*H04L 9/32* (2006.01)
*H04L 29/06* (2006.01)
(Continued)

(52) U.S. Cl.
CPC .......... *H04L 9/3242* (2013.01); *H04L 9/0833* (2013.01); *H04L 9/0861* (2013.01);
(Continued)

(58) Field of Classification Search
CPC ... H04L 9/3242; H04L 63/061; H04L 9/0861; H04L 9/3239; H04L 9/30; H04L 9/14;
(Continued)

(56) References Cited

U.S. PATENT DOCUMENTS

| 5,689,565 A | 11/1997 | Spies et al. |
| 5,943,426 A | 8/1999 | Frith et al. |

(Continued)

FOREIGN PATENT DOCUMENTS

| JP | 2009-514050 | 4/2009 |
| JP | 2015-023375 A | 2/2015 |

(Continued)

OTHER PUBLICATIONS

Interdigital et al.,"Ticket #12: Gateway and Device Protection; M2M(10)0269 Ticket12 discussion doc", Sep. 8, 2010, European Telecommunications Standards D2 Institute (ETSI), pp. 1-29.*

(Continued)

*Primary Examiner* — Joseph P Hirl
*Assistant Examiner* — Stephen T Gundry
(74) *Attorney, Agent, or Firm* — BakerHostetler

(57) ABSTRACT

A variety of mechanisms to perform End-to-End authentication between entities having diverse capabilities (E.g. processing, memory, etc.) and with no prior security associations are used. Security provisioning and configuration process is done such that appropriate security credentials, functions, scope and parameters may be provisioned to an Entity. Mechanisms to distribute the security credentials to other entities which could then use the credentials to perform an End-to-End authentication at the Service Layer or the Session Layer and using Direct or Delegated modes are developed.

20 Claims, 37 Drawing Sheets

Related U.S. Application Data

(60) Provisional application No. 62/073,578, filed on Oct. 31, 2014.

(51) Int. Cl.
    *H04L 9/08*       (2006.01)
    *H04L 9/14*       (2006.01)
    *H04L 9/30*       (2006.01)
    *H04W 4/70*      (2018.01)
    *H04W 12/04*     (2009.01)
    *H04W 12/06*     (2009.01)

(52) U.S. Cl.
    CPC .................. *H04L 9/14* (2013.01); *H04L 9/30* (2013.01); *H04L 9/3239* (2013.01); *H04L 63/061* (2013.01); *H04L 63/0884* (2013.01); *H04L 63/0281* (2013.01); *H04L 2209/76* (2013.01); *H04W 4/70* (2018.02); *H04W 12/04* (2013.01); *H04W 12/06* (2013.01)

(58) Field of Classification Search
    CPC ........... H04L 63/0884; H04L 63/0281; H04W 12/06; H04W 12/04; H04W 4/005
    See application file for complete search history.

(56) References Cited

U.S. PATENT DOCUMENTS

| | | | |
|---|---|---|---|
| 6,145,079 | A | 11/2000 | Mitty et al. |
| 7,036,010 | B2 | 4/2006 | Wray |
| 7,171,555 | B1 | 1/2007 | Salowey et al. |
| 7,353,541 | B1 | 4/2008 | Ishibashi et al. |
| 7,437,558 | B2 | 10/2008 | Fenton et al. |
| 7,499,547 | B2 | 3/2009 | Zheng et al. |
| 7,506,368 | B1 * | 3/2009 | Kersey ................ H04L 63/0428 726/12 |
| 7,596,225 | B2 | 9/2009 | Mizikovsky et al. |
| 7,735,117 | B2 | 6/2010 | Nadalin et al. |
| 7,954,139 | B1 | 5/2011 | Hall |
| 7,966,652 | B2 | 6/2011 | Ganesan |
| 7,984,298 | B2 | 7/2011 | Wei et al. |
| 8,082,446 | B1 | 12/2011 | Carroll |
| 8,386,767 | B2 | 2/2013 | Barriga et al. |
| 8,418,241 | B2 * | 4/2013 | Elzur ..................... H04L 63/08 713/154 |
| 8,423,759 | B2 | 4/2013 | Moreau |
| 8,484,467 | B2 | 7/2013 | Chan et al. |
| 8,578,159 | B2 | 11/2013 | Emeott et al. |
| 8,582,766 | B2 | 11/2013 | Yan |
| 8,583,929 | B2 | 11/2013 | Patel et al. |
| 8,644,510 | B2 | 2/2014 | Cakulev et al. |
| 8,745,374 | B2 | 6/2014 | Blom et al. |
| 8,769,288 | B2 | 7/2014 | Sundaram et al. |
| 8,850,545 | B2 | 9/2014 | Cha et al. |
| 8,856,509 | B2 | 10/2014 | Nakhjiri et al. |
| 8,856,941 | B2 | 10/2014 | Cha et al. |
| 8,881,257 | B2 | 11/2014 | Cha et al. |
| 8,887,246 | B2 | 11/2014 | Naslund et al. |
| 9,009,801 | B2 | 4/2015 | Shah et al. |
| 9,025,771 | B2 | 5/2015 | Dutta et al. |
| 9,137,740 | B2 | 9/2015 | Stanforth et al. |
| 9,167,422 | B2 | 10/2015 | Yan |
| 9,178,696 | B2 | 11/2015 | Blom et al. |
| 9,203,832 | B2 | 12/2015 | Thakore et al. |
| 9,319,220 | B2 | 4/2016 | Grewal et al. |
| 9,397,990 | B1 | 7/2016 | Taly et al. |
| 9,398,049 | B2 | 7/2016 | Fries et al. |
| 9,866,391 | B1 | 1/2018 | Crites et al. |
| 2001/0005883 | A1 | 6/2001 | Wray et al. |
| 2001/0023482 | A1 | 9/2001 | Wray |
| 2002/0007453 | A1 | 1/2002 | Nemovicher |
| 2002/0087862 | A1 | 7/2002 | Jain et al. |
| 2002/0152384 | A1 | 10/2002 | Shelest et al. |
| 2002/0153998 | A1 * | 10/2002 | Litwin, Jr. ............... H04B 3/54 380/255 |
| 2003/0115488 | A1 | 6/2003 | Kunito et al. |
| 2003/0182581 | A1 | 9/2003 | Isozaki |
| 2003/0204720 | A1 | 10/2003 | Schoen et al. |
| 2004/0039906 | A1 | 2/2004 | Oka et al. |
| 2004/0039911 | A1 | 2/2004 | Oka et al. |
| 2004/0043756 | A1 * | 3/2004 | Haukka .................. H04L 63/164 455/411 |
| 2004/0148504 | A1 * | 7/2004 | Forsberg ............. H04L 63/0823 713/168 |
| 2004/0167984 | A1 | 8/2004 | Herrmann |
| 2004/0225878 | A1 * | 11/2004 | Costa-Requena ....... H04L 63/08 713/150 |
| 2005/0036616 | A1 | 2/2005 | Huang et al. |
| 2005/0120214 | A1 | 6/2005 | Yeates et al. |
| 2005/0154889 | A1 * | 7/2005 | Ashley ................ H04L 63/0435 713/171 |
| 2005/0201363 | A1 | 9/2005 | Gilchrist et al. |
| 2006/0004662 | A1 | 1/2006 | Nadalin et al. |
| 2006/0018483 | A1 * | 1/2006 | Das ....................... H04L 9/0833 380/277 |
| 2006/0053296 | A1 | 3/2006 | Busboom et al. |
| 2006/0106836 | A1 | 5/2006 | Masugi et al. |
| 2006/0206931 | A1 | 9/2006 | Dillaway et al. |
| 2006/0264202 | A1 | 11/2006 | Hagmeier et al. |
| 2006/0294366 | A1 | 12/2006 | Nadalin et al. |
| 2006/0294383 | A1 | 12/2006 | Austel et al. |
| 2007/0079382 | A1 | 4/2007 | Celikkan et al. |
| 2007/0124592 | A1 | 5/2007 | Oyama |
| 2007/0180229 | A1 * | 8/2007 | Salowey ................ H04L 9/3271 713/156 |
| 2007/0204160 | A1 | 8/2007 | Chan et al. |
| 2007/0220598 | A1 | 9/2007 | Salowey et al. |
| 2007/0260879 | A1 | 11/2007 | Dzung |
| 2007/0277035 | A1 | 11/2007 | Patel et al. |
| 2007/0294186 | A1 * | 12/2007 | Yan ..................... G06Q 20/3829 705/71 |
| 2008/0022389 | A1 | 1/2008 | Calcev et al. |
| 2008/0065884 | A1 | 3/2008 | Emeott et al. |
| 2008/0065888 | A1 | 3/2008 | Zheng et al. |
| 2008/0072310 | A1 | 3/2008 | Dutta et al. |
| 2008/0104666 | A1 | 5/2008 | Dillaway |
| 2008/0115203 | A1 | 5/2008 | Elzur |
| 2008/0127317 | A1 | 5/2008 | Nakhjiri |
| 2008/0134311 | A1 | 6/2008 | Medvinsky et al. |
| 2008/0178004 | A1 | 7/2008 | Wei et al. |
| 2008/0178274 | A1 | 7/2008 | Nakhjiri et al. |
| 2008/0267189 | A1 | 10/2008 | Li |
| 2008/0282079 | A1 | 11/2008 | Yaghmour et al. |
| 2009/0006844 | A1 | 1/2009 | Wing et al. |
| 2009/0043901 | A1 | 2/2009 | Mizikovsky et al. |
| 2009/0063851 | A1 | 3/2009 | Nijdam |
| 2009/0080656 | A1 | 3/2009 | Hughes et al. |
| 2009/0099860 | A1 | 4/2009 | Karabulut et al. |
| 2009/0138711 | A1 | 5/2009 | Heimbigner |
| 2009/0210696 | A1 * | 8/2009 | Moreau ................ H04L 63/0435 713/151 |
| 2009/0210699 | A1 * | 8/2009 | Grewal ................ H04L 9/083 713/155 |
| 2009/0210710 | A1 * | 8/2009 | Zheng ................... H04L 9/0844 713/171 |
| 2009/0254745 | A1 | 10/2009 | Ganesan |
| 2010/0017597 | A1 | 1/2010 | Chandwani |
| 2010/0049980 | A1 | 2/2010 | Barriga et al. |
| 2010/0088519 | A1 | 4/2010 | Tsuruoka et al. |
| 2010/0138539 | A1 | 6/2010 | Neville et al. |
| 2010/0192197 | A1 * | 7/2010 | Nadalin .............. G06F 21/6209 726/2 |
| 2010/0257588 | A1 | 10/2010 | Urien |
| 2010/0260337 | A1 | 10/2010 | Song et al. |
| 2010/0268937 | A1 | 10/2010 | Blom et al. |
| 2011/0047372 | A1 | 2/2011 | Ganesan |
| 2011/0258447 | A1 * | 10/2011 | Wei ..................... H04L 63/0869 713/168 |
| 2011/0302638 | A1 * | 12/2011 | Cha ........................ G06F 21/57 726/6 |

(56) References Cited

U.S. PATENT DOCUMENTS

| | | |
|---|---|---|
| 2012/0023568 A1* | 1/2012 | Cha ..................... G06F 21/335 726/10 |
| 2012/0042160 A1 | 2/2012 | Nakhjiri et al. |
| 2012/0191970 A1 | 7/2012 | Blom et al. |
| 2012/0198520 A1* | 8/2012 | Cha ........................ H04L 63/20 726/3 |
| 2012/0260088 A1 | 10/2012 | Fries et al. |
| 2012/0272064 A1 | 10/2012 | Sundaram et al. |
| 2012/0288092 A1 | 11/2012 | Cakulev et al. |
| 2013/0007858 A1* | 1/2013 | Shah .................. H04L 63/0815 726/6 |
| 2013/0080769 A1* | 3/2013 | Cha ................ H04W 12/04031 713/155 |
| 2013/0117824 A1 | 5/2013 | Naslund et al. |
| 2013/0227658 A1 | 8/2013 | Leicher et al. |
| 2013/0227663 A1 | 8/2013 | Cadenas Gonzalez |
| 2013/0239169 A1 | 9/2013 | Nakhjiri |
| 2013/0246784 A1 | 9/2013 | Zhang et al. |
| 2013/0297940 A1 | 11/2013 | Chan et al. |
| 2013/0298209 A1 | 11/2013 | Targali et al. |
| 2014/0169563 A1 | 6/2014 | Yan |
| 2014/0189350 A1 | 7/2014 | Baghdasaryan et al. |
| 2014/0282957 A1 | 9/2014 | Thakore et al. |
| 2014/0331279 A1 | 11/2014 | Aissi et al. |
| 2014/0365777 A1 | 12/2014 | Cha et al. |
| 2015/0026471 A1 | 1/2015 | Cha et al. |
| 2015/0033024 A1 | 1/2015 | Mashima et al. |
| 2015/0033311 A1 | 1/2015 | Seed et al. |
| 2015/0033312 A1 | 1/2015 | Seed et al. |
| 2015/0067813 A1 | 3/2015 | Cha et al. |
| 2015/0245205 A1 | 8/2015 | Kim et al. |
| 2015/0296470 A1 | 10/2015 | Kim et al. |
| 2015/0326561 A1 | 11/2015 | Shah et al. |
| 2015/0373124 A1 | 12/2015 | Bhalla |
| 2016/0007137 A1 | 1/2016 | Ahn et al. |
| 2016/0014674 A1 | 1/2016 | Ahn et al. |
| 2016/0021118 A1* | 1/2016 | Roth ....................... H04L 9/083 726/4 |
| 2016/0044007 A1* | 2/2016 | Boudguiga ............. H04L 9/083 713/171 |
| 2016/0056959 A1 | 2/2016 | Blom et al. |
| 2016/0065362 A1 | 3/2016 | Choyi et al. |
| 2016/0087973 A1* | 3/2016 | Thakore .............. H04L 63/0823 726/7 |
| 2016/0112981 A1 | 4/2016 | Ann et al. |
| 2016/0127341 A1 | 5/2016 | Yan |
| 2016/0261570 A1 | 9/2016 | Grewal et al. |
| 2016/0277391 A1 | 9/2016 | Choyi et al. |
| 2016/0285844 A1* | 9/2016 | Olivereau ............... H04L 9/083 |
| 2016/0337354 A1 | 11/2016 | Smadja et al. |
| 2016/0373257 A1 | 12/2016 | Adrangi et al. |
| 2017/0005999 A1 | 1/2017 | Choyi et al. |
| 2017/0041231 A1 | 2/2017 | Seed et al. |
| 2017/0215026 A1 | 7/2017 | Kim et al. |
| 2017/0238279 A1 | 8/2017 | Jeong et al. |

FOREIGN PATENT DOCUMENTS

| | | |
|---|---|---|
| JP | 2015-026362 A | 2/2015 |
| KR | 10-2012-0090456 A | 8/2012 |
| WO | 2010/003713 A1 | 1/2010 |
| WO | 2015/013685 A1 | 1/2015 |
| WO | 20151013645 A1 | 1/2015 |

OTHER PUBLICATIONS oneM2M-TR-0012-V-0.2.1 "oneM2M End-to-End Security and Group Authentication" Sep. 29, 2014, 15 pages.

Armknecht, et al., "Cross-layer Privacy Enahncement and Non-repudiation in Vehicular Communication", Feb. 2007, 13 pages.

* cited by examiner

END-TO-END SERVICE LAYER AUTHENTICATION

CROSS-REFERENCE TO RELATED APPLICATIONS

This application is a continuation of U.S. patent application Ser. No. 14/928,909 filed Oct. 30, 2015, which claims the benefit of U.S. Provisional Application Ser. No. 62/073,578 filed on Oct. 31, 2014, the contents of which are hereby incorporated by reference in their entirety.

BACKGROUND

Machine-to-machine (M2M) technologies allow devices to communicate more directly with each other using wired and wireless communications systems. M2M technologies enable further realization of the Internet of Things (IoT), a system of uniquely identifiable objects and virtual representations of such objects that communicate over a network, such as the Internet. IoT may facilitate communication with even mundane everyday objects, such as products in a grocery store, and thereby reduce costs and waste by improving knowledge of such objects. For example, stores may maintain very precise inventory data by being able to communicate with, or obtain data from, objects that may be in inventory or may have been sold. As will be appreciated, the IoT has the potential to include many millions of devices.

FIG. 1A is a diagram that illustrates an exemplary oneM2M functional architecture 100. The oneM2M standard under development defines a Service Layer called "Common Service Entity (CSE)" as illustrated in FIG. 1A-B. The purpose of the Service Layer is to provide "horizontal" services that can be utilized by different 'vertical' M2M silo systems and applications, such as e-Health, fleet management, and smart homes. CSE supports four reference points. The Mca reference point interfaces with the Application Entity (AE). The Mcc reference point interfaces with another CSE within the same service provider domain and the Mcc' reference point interfaces with another CSE in a different service provider domain. The Mcn reference point interfaces with the underlying network service entity (NSE). An NSE provides underlying network services to the CSEs, such as device management, location services and device triggering. CSE contains multiple logical functions called "Common Service Functions (CSFs)", such as "Discovery", "Data Management & Repository".

FIG. 1B is a diagram that illustrates the CSFs under development for a oneM2M architecture.

oneM2M enables the following types of Nodes: Application Service Nodes (ASNs), Application Dedicated Node (ADNs), Middle Nodes (MNs) and Infrastructure Nodes (INs).

An Application Service Node (ASN) is a Node that contains one CSE and contains at least one AE. An example of physical mapping is an ASN that resides in an M2M Device.

An Application Dedicated Node (ADN) is a Node that contains at least one AE and does not contain a CSE. An example of physical mapping is an ADN that resides in a constrained M2M Device.

A Middle Node (MN) is a Node that contains one CSE and contains zero or more AEs. An example of physical mapping is an MN that resides in an M2M Gateway.

An Infrastructure Node (IN) is a Node that contains one CSE and contains zero or more AEs. An example of physical mapping is an IN that resides in an M2M Service Infrastructure.

Currently, when oneM2M end-nodes want to communicate with one another in a secure manner, the nodes and intermediate nodes establish security association with one another in a hop-by-hop manner. Hop-by-hop security associations may be established by means of symmetric keys, using certificates or by a bootstrapping process which may be performed by a direct process or by means of an infrastructure. Also, TS-0003—Security Solutions doc states that: "At the service layer level, the security association establishment results in a TLS or DTLS session which protects messages being exchanged between adjacent AE/CSE, i.e. hop-by-hop. AEs that need to preserve the privacy of their information exchange from untrusted intermediate nodes may be provisioned to support a direct security association between them."

SUMMARY

A variety of mechanisms to perform End-to-End authentication between entities having diverse capabilities (E.g. processing, memory, etc.) and with no prior security associations are used. Security provisioning and configuration process is done such that appropriate security credentials, functions, scope and parameters may be provisioned to an Entity. Mechanisms to distribute the security credentials to other entities which could then use the credentials to perform an End-to-End authentication at the Service Layer or the Session Layer and using Direct or Delegated modes are used.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF THE DRAWINGS

A more detailed understanding may be had from the following description, given by way of example in conjunction with accompanying drawings wherein.

DETAILED DESCRIPTION OF ILLUSTRATIVE EMBODIMENTS

Current oneM2M specifications only provide for hop-by-hop authentication, therefore an Entity that is requesting to perform CRUD (Create, Retrieve, Update, Delete) operations on a remotely hosted service/resource is not explicitly authenticated by the Entity that is hosting the resource. Issues include:

Entity hosting the resource is not able to completely authenticate the Entities that are trying to perform operations on the resource since the target entity is only able to authenticate the entity that is one hop away from it and therefore access control may not be easily enforceable Any intermediate entities (e.g. MN-CSE, IN-CSE) may be able to impersonate messages on behalf of other intermediate entities because of hop-by-hop mechanisms Since hop-by-hop mechanisms are to be protected using (D)TLS, at each hop (D)TLS session will have to be setup, integrity protecting and authenticating at each hop and possibly encrypting and decrypting at each of the hops and therefore additional operational overhead are incurred at the session/service layer. Security provisioning and security association establishment procedures are done by only the 2 entities involved in each of the hops.

Figure 1A:
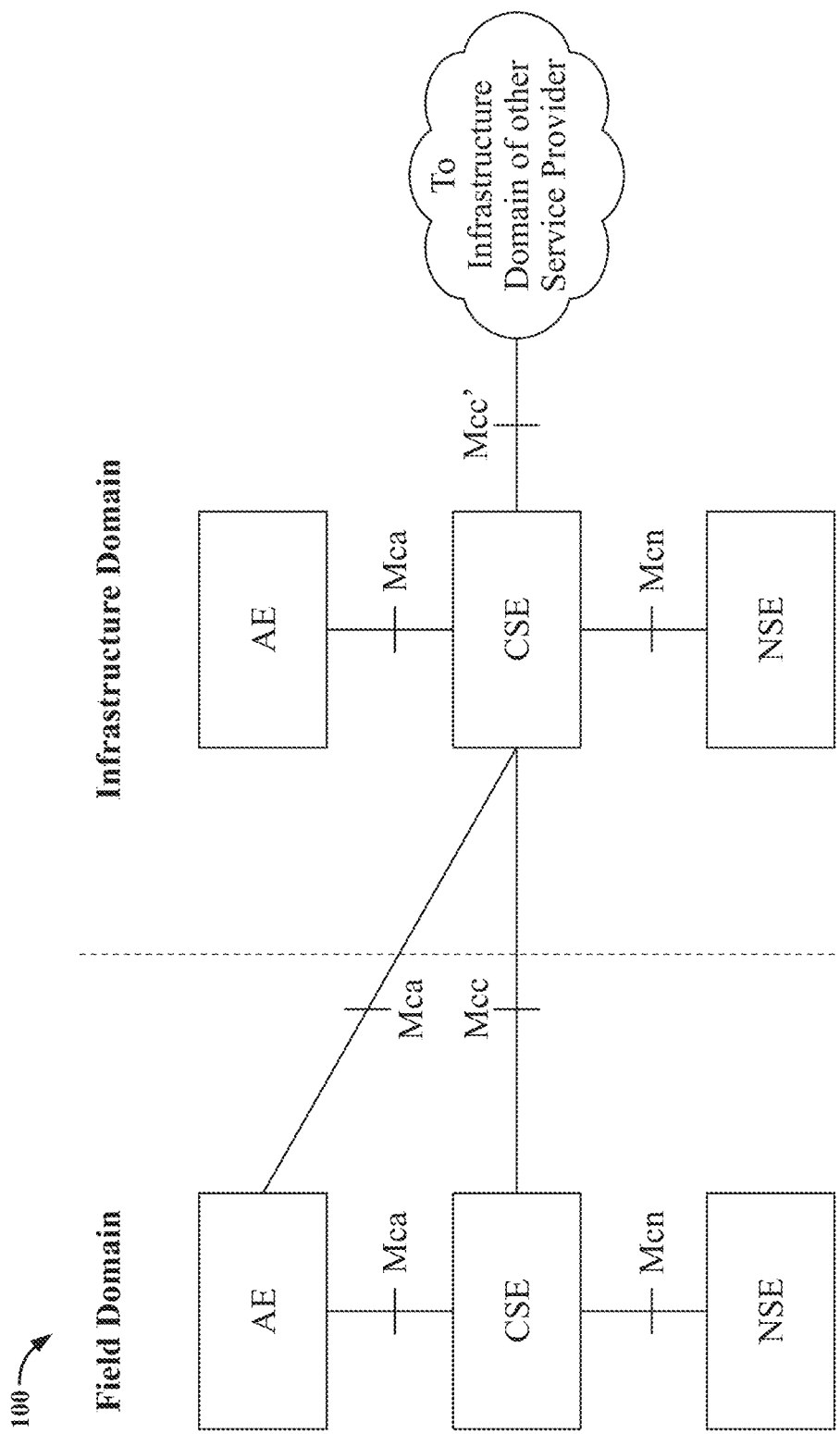
FIGS. 1A-B are diagrams of a oneM2M Service layer.
Figure 1B:
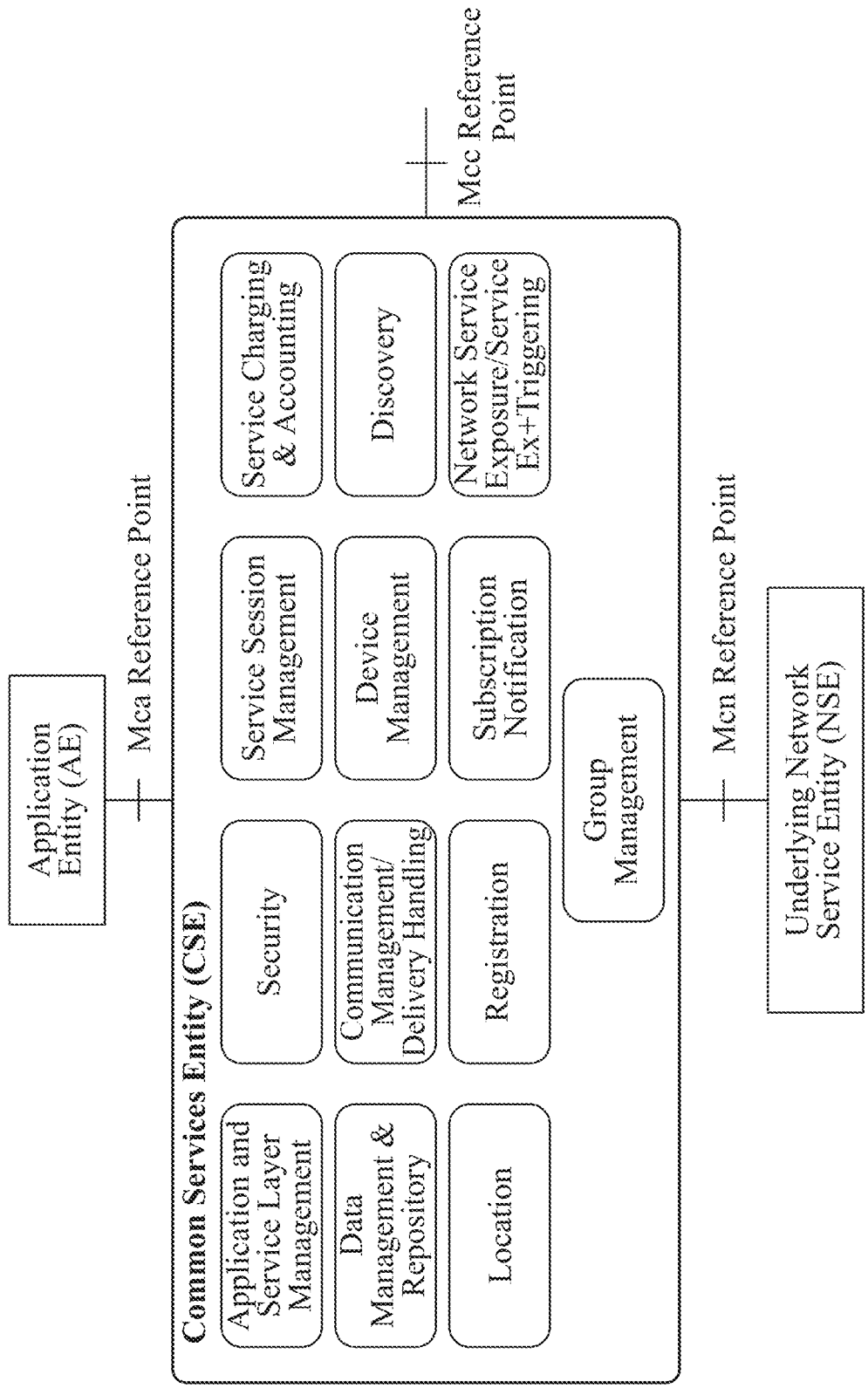
Figure 2:
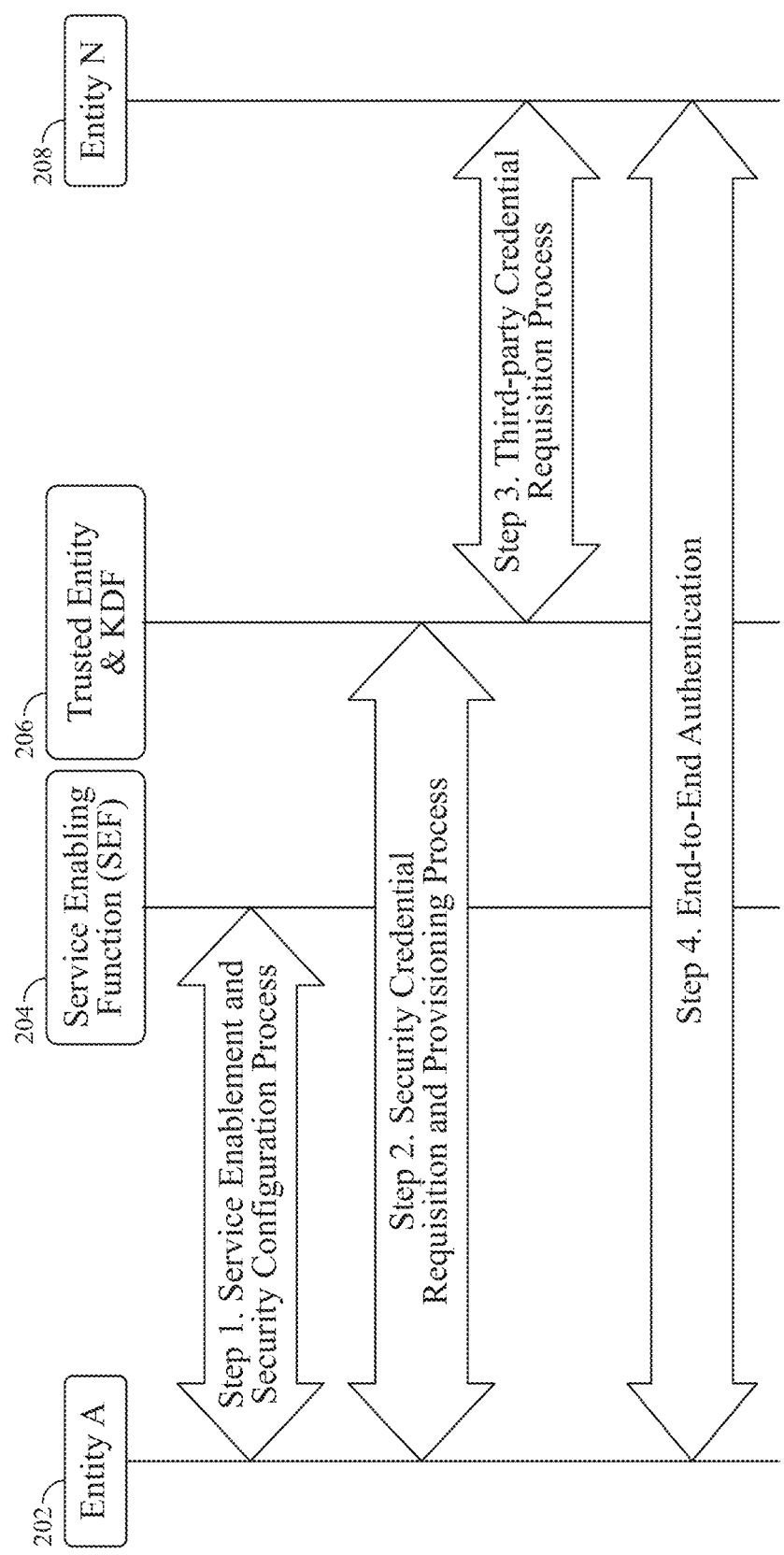
FIG. 2 is a diagram that illustrates End-to-End (E2E) Security Phases.

FIG. 2 is a diagram that illustrates End-To-End (E2E) Security Phases. Performing an End-to-End Authentication process may entail the following steps:

Step 1 of FIG. 2 shows a Service Enablement and Security Configuration Process. At this step an Entity A 202 establishes an association with a Service Enabling Function (SEF) 204. The association established may be in-band or out-of-band and may also involve a mutual authentication process before the association is established. As part of the association establishment process, the nature of the service requested or offered by Entity A 202 202 is identified by the SEF 204. Also, the security requirements and features required or requested by the Entity A 202 are also identified by the SEF 204. In short, a Security Profile (SP) and optionally a Privacy Profile (PP) of the Entity A 202 is obtained from the Entity A 202, or determined/inferred and created by the SEF or obtained from a third entity. Based on deployment scenarios, each entity may have a different SP, which may be identified by a unique SP-Id and optionally an associated PP identified by a PP-Id.

Step 2 of FIG. 2 shows a Security Credential Provisioning Process. Based on the SP and the corresponding security requirements and features that have been identified, the Entity A 202 is provisioned with appropriate security credentials. The security credentials that have been issued to Entity A 202 are used by it to perform authentication of entities that would like to establish a security association with it. In addition a list of authorized entities that may be provided with an Entity's E2E credential is created. In certain cases, during the Security Credential Provisioning Process, only the seeding material required for generating the security credentials is provided to the Entity A 202. The seeding material may be used with an existing security credential in order to generate the appropriate security credentials. The seeding material may also be used along with a credential bootstrapping process in order to generate the appropriate end-to-end security (end-to-end message authentication, end-to-end message confidentiality) credentials. The bootstrapping process may be based on security association that exists at a lower layer (e.g. network layer/MAC layer) or based on an existing security association with a higher layer (e.g. application layer or service layer). In some cases, where an existing security association does not exist then a fresh bootstrapping process (e.g. GBA, MEF-based) may have to be carried out before the End-to-End security credentials are generated.

Step 3 of FIG. 2 shows a Third-party Credential Requisition Process. Another Entity N, may also be provisioned with security credentials that were setup by Entity A 202, in order that a security association may be established between Entity N 208 and Entity A 202, so that Entity N 208 can access the services/resource offered by Entity A 202 and vice versa. Only those entities that have been authorized to be provisioned with the credentials is provided with the credentials.

Step 4 of FIG. 2 shows an End-to-End Authentication Process: In this step, Entity A 202 and Entity N 208 may perform an End-to-End Authentication process directly between the two entities or optionally enabled by means of another (e.g. SEF).

Figure 21A:
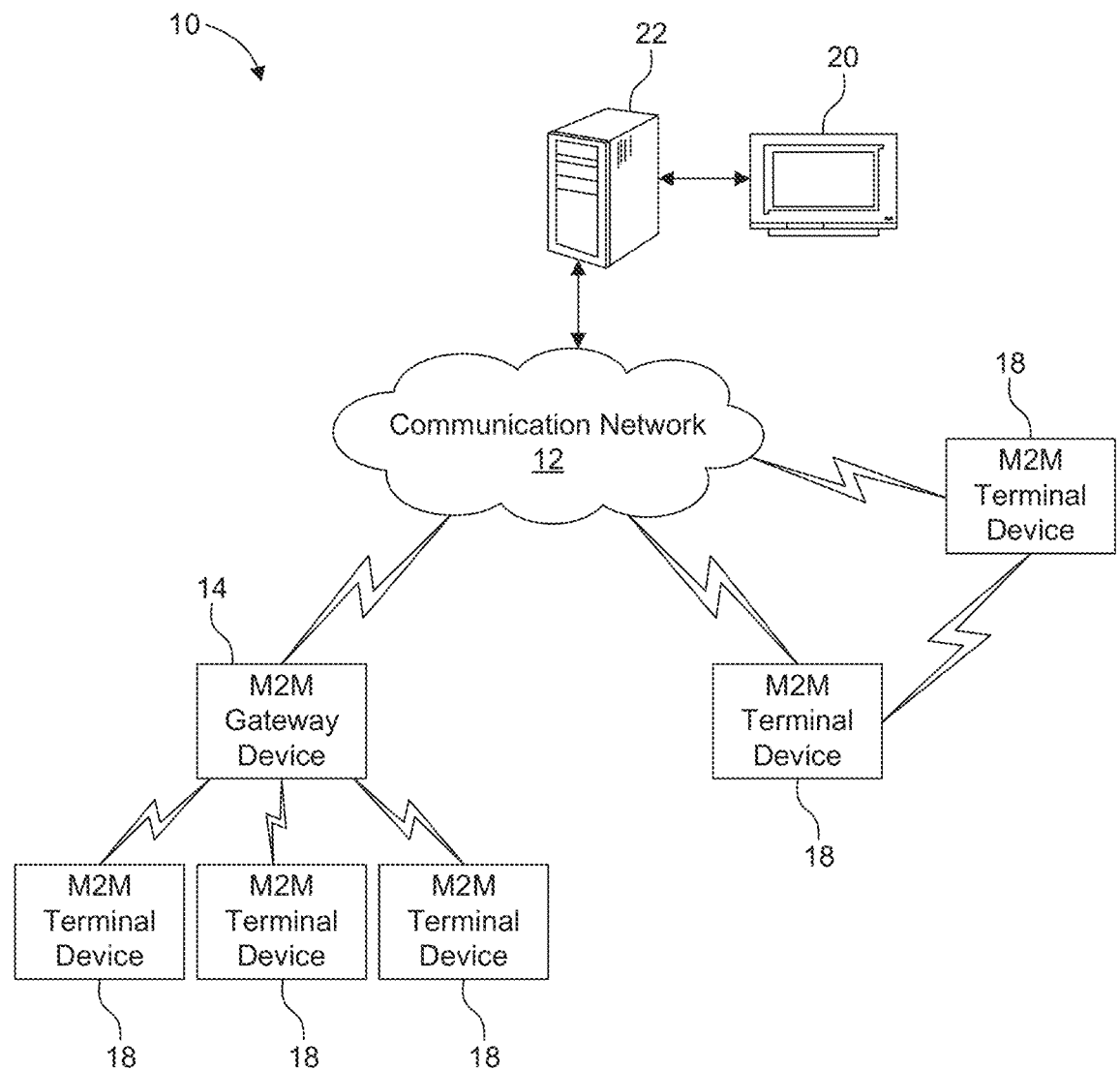
FIG. 21A is a diagram of an example machine-to machine (M2M) or Internet of Things (IoT) communication system in which one or more disclosed embodiments of IoT event management systems and methods may be implemented.
Figure 21B:
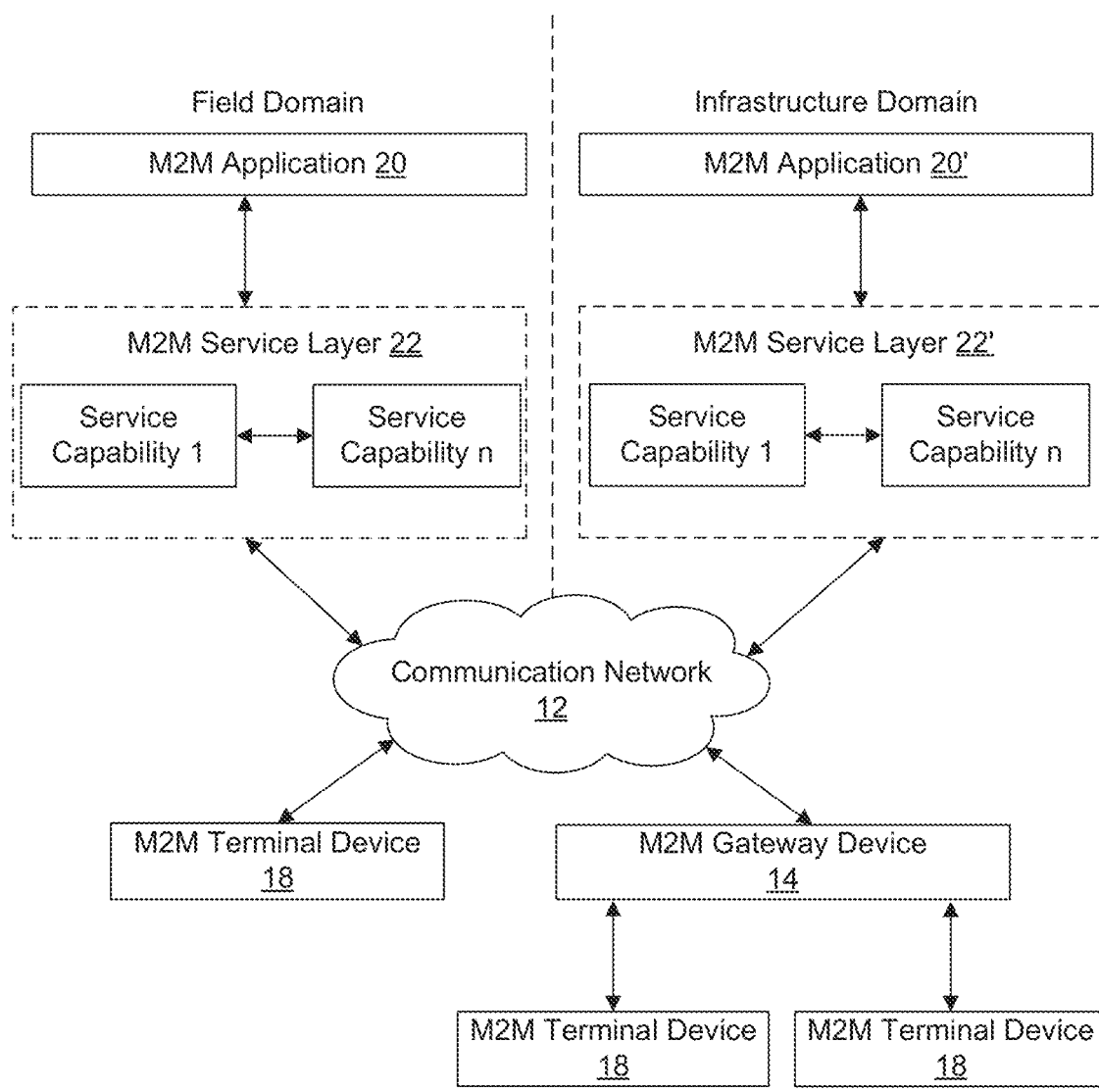
FIG. 21B is a system diagram of an example architecture that may be used within the M2M/IoT communications system illustrated in FIG. 21A
Figure 21C:
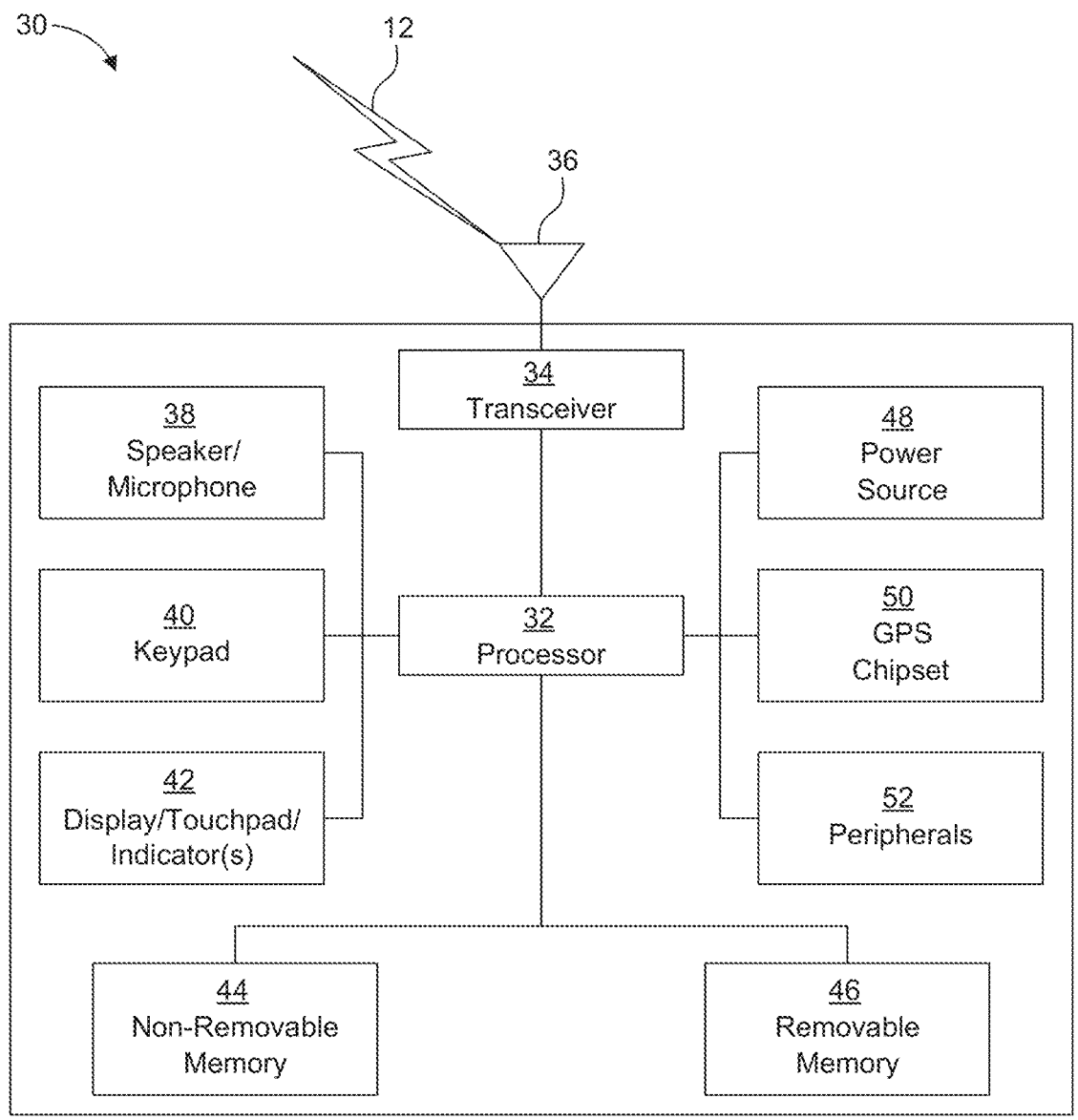
FIG. 21C is a system diagram of an example M2M/IoT terminal or gateway device that may be used within the communications system illustrated in FIG. 21A.
Figure 21D:
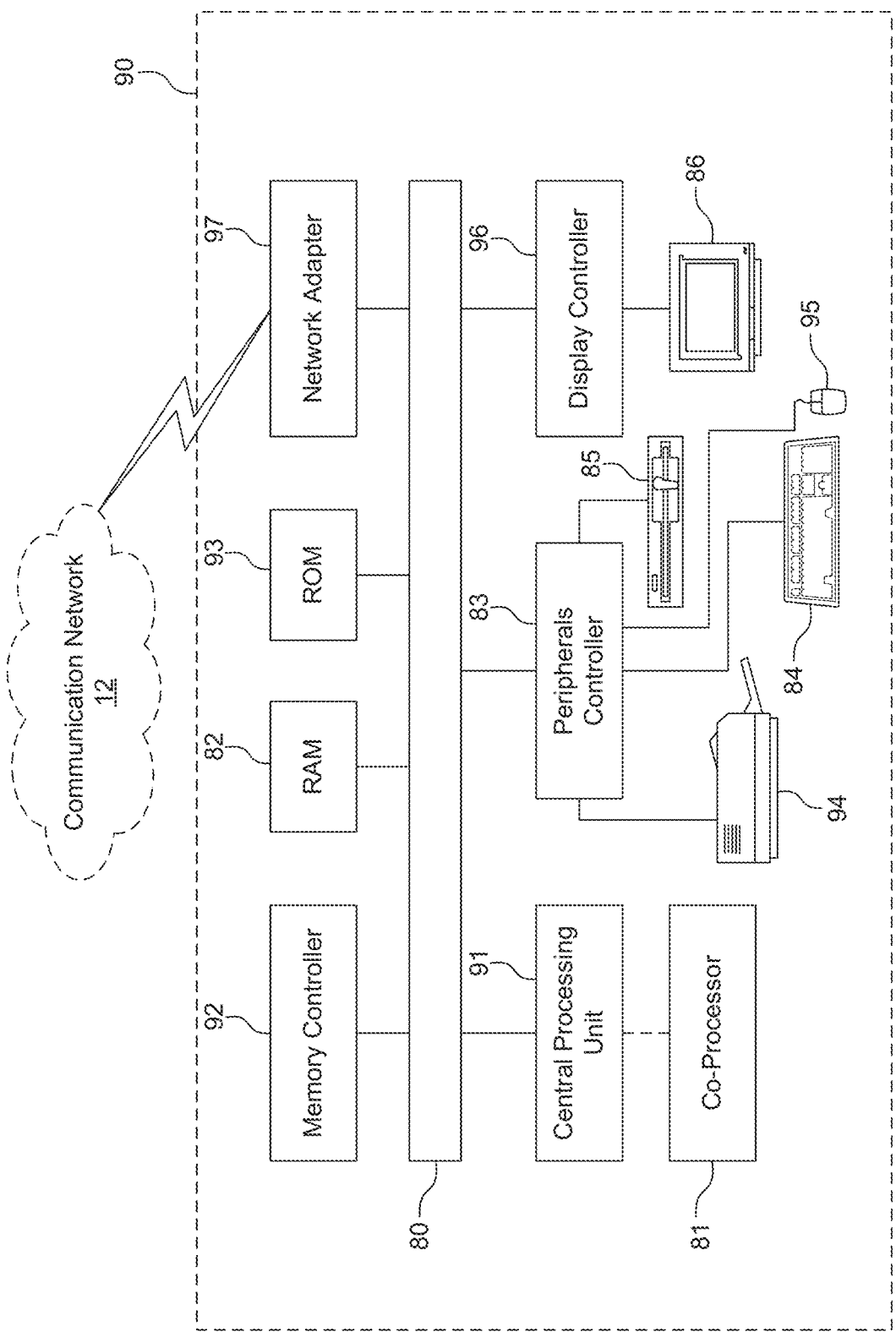
FIG. 21D is a block diagram of an example computing system in which aspects of the communication system of FIG. 21A may be embodied.

It is understood that the entities performing the steps illustrated in FIG. 2 are logical entities that may be implemented in the form of software (i.e., computer-executable instructions) stored in a memory of, and executing on a processor of, a network node or computer system such as those illustrated in FIG. 21C or FIG. 21D. That is, the method(s) illustrated in FIG. 2 may be implemented in the form of software (i.e., computer-executable instructions) stored in a memory of a network node, such as the node or computer system illustrated in FIG. 21C or FIG. 21D, which computer executable instructions, when executed by a processor of the node, perform the steps illustrated in FIG. 2. It is also understood that any transmitting and receiving steps illustrated in FIG. 2 may be performed by communication circuitry of the node under control of the processor of the node and the computer-executable instructions (e.g., software) that it executes.

Service Enablement and Security Configuration (SESC) Process

During the SCSC step, the SEF 204 determines the appropriate security requirements and features that would suit the working of Entity A. Security requirements and features may be determined by the SEF 204 based on an SP and PP provided by the entity. The SP and optionally a PP may be created using some inference process or explicitly provided by the Entity or configured by an individual (e.g. Administrator) who may be setting up the system.

TABLE 1

An example Security Profile (SP) of an Entity A

| Security Requirement | Within Security domain (at HCSE or RCSE) | End-to-End |
| --- | --- | --- |
| Message Originator Authenticity/Integrity | High | Very High |
| Message Re-play protection | High | Very High |
| Non-repudiation capability | Low | Low |
| Message Confidentiality | Medium | Medium |
| Data Confidentiality in Transit | High | High |
| Data Confidentiality at Rest | Medium | High |
| Data Integrity in Transit | High | Very High |
| Data Integrity at Rest | Medium | Very High |
| Service Availability | High | Very High |
| Data Availability | High | Very High |

Depicted in Table 1 an example SP, which may be provided by the Entity to the SEF 204 as part of the SESC process. Alternatively, the SP may be inferred by the SEF based on the type of service provided by the entity. In other cases, the SP may be configured by an administrator for a particular entity, which is then fetched by the SEF from a third entity such as server at the service/network provider.

TABLE 2

Example Device Profile (DP) of an Entity A

| Device Capability | Values |
| --- | --- |
| Processing Capability | 900 MHz |
| RAM | 500 Kb |

TABLE 2-continued

Example Device Profile (DP) of an Entity A

| Device Capability | Values |
| --- | --- |
| Flash | 1 MB |
| Battery | 5.0 Micro-W/MHz |
| Wireless Capability | Bluetooth, WiFi |
| Sleep Mode | Sleep/Deep-Sleep |
| Secure Environment | Yes |
| Trusted Platform Module (TPM) | No |
| OS/version | Android/Kitkat |

An Entity 202 may provide the Device Profile (DP) on which the Entity is hosted. Table 2 depicts an example DP that is either provided by the Entity 202 to the SEF 204 or obtained by the SEF by querying a device's operating systems if the SEF 204 is implemented on the same device as the Entity 202. Alternatively, the SEF 204 may obtain the DP from a third entity.

TABLE 3

An example Entity Profile (EP) of Entity A

| Entity Profile | Values |
| --- | --- |
| Class of Service | Healthcare |
| Type of Service | Real-time |
| Impact | Critical (Life and Limb) |
| Security Level | High |
| Privacy Level | High |

An Entity 202 may in addition also provide an Entity Profile (EP) or an Application Profile (AP) to SEF 204. The terminology EP and AP may be used interchangeably within the rest of the document. An example EP/AP is depicted in Table 3 Alternatively, the SEF 204 may infer the EP or obtain the EP from a third entity. The entity is an application that belongs to "Healthcare", providing "real-time" service and having a "Critical" impact, requiring "High" security and "High" Privacy. In certain cases, the SEF may only use the EP and the DP in order to determine the SP or the security requirements directly.

TABLE 4

An example EP of Entity B

| Entity Profile | Values |
| --- | --- |
| Class of Service | Home Automation |
| Type of Service | Near-real-time |
| Impact | Low |
| Security Level | Medium |
| Privacy | Low |

Table 4 depicts an example AP or EP of another entity, Entity B. The entity is an application that belongs to the home automation, with an impact, if the system were to fail is considered to be "Low", and having a Security profile of "Medium" and "Low" privacy impact.

The SEF 204 may use the SP, DP and the EP in order to determine the security requirements that is appropriate for the Entity 202. The inference process on determining the security requirements may be performed by using the combination of information provided within the SP and/or DP and/or the EP. When anyone of the profiles are not present then the SEF 204 uses the best judgement based on the profile that it has access to. In cases, where the SEF 204 may not have access to the profiles, it may obtain the profiles from a third entity. In order for the SEF 204 to determine the appropriate security requirements and therefore the security features, access to the EP and the DP may be required at a minimum. The SEF 204 may then use the EP and the DP to create a SP. If the Entity 202 is able to furnish a SP or the SEF 204 is able to obtain then the SEF 204 would be able to create a more granular security requirements list. It would be ideal for the SEF 204 to have access to the SP, DP and EP of Entity A 202 in order that it can determine a very detailed security requirements.

Based on the above information provided by an Entity, appropriate Security requirements may be determined. The SEF 204 may select the appropriate security requirements based on a combination of security required highlighted by the SP, device capability provided by DP and the type of service being offered by the Entity, by means of an EP.

TABLE 5

Security Requirements Inferred by the SEF for Entity A

| Security Requirement | Within Security domain (at HCSE or RCSE) | End-to-End |
|---|---|---|
| Message Originator Authenticity/Integrity | Digital Signature | Digital Signature |
| Message Re-play protection | Timestamp + Nonce | Timestamp + Nonce |
| Non-repudiation capability | None | None |
| Message Confidentiality | Secure Protocol | Secure Protocol |
| Confidentiality of Data in Transit | Secure Protocol | Object Security |
| Confidentiality of Data at Rest | Object Security | Object Security |
| Integrity of Data in Transit | Secure Protocol | Object Security |
| Integrity of Data at Rest | Object Security | Object Security |

TABLE 5-continued

Security Requirements Inferred by the SEF for Entity A

| Security Requirement | Within Security domain (at HCSE or RCSE) | End-to-End |
|---|---|---|
| Availability of Service | Authentication: Certificate | Authentication: Certificate |
| Availability of Data | Malware Service Authentication: Public Key | Malware Service Authentication: Public Key |

Similarly a Security Requirement inferred by the SEF for Entity B is shown in Table 6.

TABLE 6

Security Requirements Inferred by the SEF for Entity B

| Security Requirement | Within Security domain (at HCSE or RCSE) | End-to-End |
|---|---|---|
| Message Originator Authenticity/Integrity | Message Authentication Code (MAC) | Message Authentication Code (MAC) |
| Message Re-play protection | Nonce | Nonce |
| Non-repudiation capability | None | None |
| Message Confidentiality | None | None |
| Confidentiality of Data in Transit | None | None |
| Confidentiality of Data at Rest | None | None |
| Integrity of Data in Transit | Data Security: Symmetric Key | Data Security: Symmetric Key |
| Integrity of Data at Rest | Data Security: Symmetric Key | Data Security: Symmetric Key |
| Availability of Service | Authentication: PSK | Authentication: PSK |
| Availability of Data | Authentication: PSK + ACP | Authentication: PSK + ACP |

A detailed security features is shown in table Table 7.

TABLE 7

Detailed Security Features for Entity B

| Entity ID | Security Features | Within Security Domain | | | End-to-End | |
|---|---|---|---|---|---|---|
| | | Algorithms | Sizes | Protocol(s) | Algorithms | Sizes |
| Entity A | Message Originator Authenticity/Integrity | HMAC-SHA-2 | 256/512 | (D)TLS, JWS | HMAC-SHA-2 | 256/512 |
| | Message Replay Protection | Nonce | 256 | N/A | Timestamp/ Nonce + Sequence Number | 256 bits |
| | Non-Repudiation | None | | N/A | None | |
| | Message Confidentiality | AES | 112 | (D)TLS | AES | 192 |
| | Confidentiality of Data in Transit | AES | 192 | (D)TLS, JWE | AES | 192 |
| | Confidentiality of Data at Rest | AES | 256 | N/A | AES | 256 |
| | Integrity of Data in Transit | HMAC-SHA-2 | 256 | (D)TLS, JWS | HMAC-SHA-2 | 256 |
| | Integrity of Data at Rest | HMAC-SHA-512 | 512 | N/A | HMAC-SHA-512 | 512 |
| | Authentication Mechanism | Symmetric Key | 256 | (D)TLS | Symmetric Key | 256 |
| | Un-Authenticated use | YES | | | | |
| | Authentication Process | Direct | | | | |
| | Presence of Secure Element | YES | | | | |
| | Integrity of Data | | | | | |

So, a low-powered, low-memory device that only provides a service that requires "low" Security, then the security function(s), the algorithms selected and the key sizes may be selected appropriately. E.g. the message authentication mechanism selected may be HMAC-SHA1 with 160 bit keys whereas an entity with more processing and memory and requiring a higher security would be provisioned with 256 bit keys that may be used with HMAC-SHA2 mechanism. An e.g. list of security requirements that is inferred by the SEF or provided by the Entity A 202 in order or priority:

Message Authentication and/or Integrity of signaling/control messages
 Algorithms supported: HMAC-SHA2 (preferred)
 Key lengths: 256/512/1024 . . .
Data confidentiality
 Algorithms supported: AES, DES . . .
 Key lengths: 128/256/512.
Integrity of Data: Required
Authentication mechanisms:
 Symmetric key and/or
 Certificates and/or
 Bootstrapping Process
Capability of supporting Un-Authenticated users
Supported protocols: EAP/IPSec/(D)TLS/JWT
Authentication: Direct/Delegated/Partial delegated approach At the end of the SESC process, the SEF 204 has a complete profile and the capabilities of the Entity. Having knowledge of the capabilities of the Entity, helps the SEF 204 in determining the appropriate security measures and features that must be implemented in order to protect the workings of the Entity, data and service provided by the entity and the communications with the Entity. The SEF 204 maintains a table of the capabilities of the Entity.

Security Credential Provisioning (SCP) Process

The SCP process may involve the steps of Security Credential Request Process and Security Credential Provisioning Process.

The Security Credential Request Process process may be initiated by the Entity or by the SEF 204 on behalf of the Entity. Based on the capability and/or the type service offered by the Entity, appropriate Security Credentials and additionally, other configuration parameters are requested to a Key Derivation Function (KDF) 206 preferably hosted on a Trusted Third-party (TTP). Authentication between the Entity and the TTP may be optional. The SEF 204 may perform the role of a KDF 206, however, from a scalability perspective, the TTP/KDF 206 functionality may be performed by a different entity. The SEF 204 may be mutually authenticated with the TTP/KDF 206 if the SEF 204 is requesting the credentials on behalf of the Entity A 202.

In the Security Credential Provisioning Process, the KDF 206 generates Key(s), and describes how the keys may be used and what purpose (MAC, Encryption, at which Layer the protection is to be applied and the associated parameters that are to be included etc.), Scope of how the Key(s) may be used and the context it is used for, and optionally a new ID may be generated and recommended algorithm(s) to be used. The TTP/KDF 206 maintains a table that may resemble as shown below:

TABLE 8

Security Association and Credentials associated with each Entity

| Context ID | Certificate | Key(s) | Key Size (bits) | Scope/ Algorithm | Validity (secs) | Authentication Parameters |
|---|---|---|---|---|---|---|
| Entity A-Context 1 | N/A | 34B2342E . . . | 256 | Encryption: AES | 259,200 | N/A |
| | | 3CC2342AF . . . | 128 | Message Auth: HMAC-SHA1 | 259,200 | Time and Nonce |
| | | 3BB1234E . . . | 256 | Master Session Key/ Boostrapping Key | 604,800 | N/A |
| Entity B-Context 1 | EntityB-Context1-Certificate | 52689A2D | 128 | Encryption: AES | 259,200 | N/A |
| | | 37894621F . . . | 128 | Message Auth: HMAC-SHA1 | 259,200 | Time and Nonce |
| | | 7028CCE . . . | 256 | Master Session Key/ Boostrapping Key | 604,800 | N/A |

The ContextID, associated keys and other associated parameters and scope are provided to the requesting Entity or the SEF 204. The authentication parameters may indicate the security information that may be included as part of the security process (e.g. authentication process). Each security context that is established has a valid lifetime, after which the context may be updated or a new one created. The ContextID may be used to identify the credentials (keys, algorithms etc.) and the associated scope and parameters.

Third-Party Credential Requisition Process

In the Third-party Credential Requisition step, an Entity N 208 that is required to perform an End-to-End authentication with another Entity (such as Entity A 202), it requests for the keying material, scope associated with the keys, parameters that may be used for demonstrating message authentication and other information so that an E2E security association may be created. The requesting Entity may be optionally authenticated with the TTP/KDF 206 and also determines if the Entity has been authorized to be provisioned with the E2E keys. From here-on, the TTP and/or the KDF 206 will be referred to as the TTP. The Entity is provisioned with the Context ID, URI, Port#, associated Key(s), scope and associated parameters. Keys that are generated may be tailored to further suit the two end entities. Optionally, another level of key generation process may occur. At the Entity N, it may maintain the following parameters with Entities that it would like to create and maintain security associations:

TABLE 9

Authentication Mechanism, Scope and parameters to be used with each Entity

| Resource ID | Context ID | Type of Auth | Port # | Auth Protocol | Credential (Key/Cert) | Protection Layer | Validity | Parameters |
|---|---|---|---|---|---|---|---|---|
| Entity A's URI | Entity A-Context 1 | Hop-by-Hop | | HMAC-SHA2 | 2341234E . . . | Service Layer: JWS/JWT | 3,600 | Nonce, Time |
| Entity B's URI | Entity B-Context 1 | End-to-End | 8443 | DTLS | 3569424 . . . | Session Layer | 7000 | |

In the above table it can be observed that in order for an Entity N 208 to perform an E2E authentication with Entity A 202, it may be provided with a Context ID (EnityA-Context1), which may be an optional parameter.

Context ID: May be used to identify the security features/parameters that are to be used for establishing E2E authentication. The ContextID is used to identify the E2E security credentials and associated scope and parameters. The ContextID may be generated randomly or using a cryptographic process. The ContextID may be used as a temporary identity of an Entity or transaction.

Resource ID: It is the identity of the Entity (e.g. Entity's URI or domain name, IP@ etc.) with which Entity N would like to create an E2E authentication process and association Port#: In case of Session Layer E2E authentication, a port # may be optionally provided Protocol: In the case of Service Layer E2E, the protocol just indicates the Message Authentication algorithm that is to be used (e.g. HMAC-SHA2), whereas in the case of Session Layer, the protocol indicates the protocol (which may be DTLS or TLS or any other). This may not be restricted to just the Session or Service layer and may involve protocols associated with application layers (e.g. Secure RTP) or other lower layer protocols such as IPSec, EAP etc.

Parameters: Indicates the values (e.g. Nonce, Time, Random challenge etc.) that may be used to provide proof of key possession/message authentication.

Type-of-Auth: Determine the Layer at which Authentications may be carried out. These include authentications that may be carried out at the Service, Session, Network, MAC layer. The Authentication mechanisms at the Service and Session Layers are of interest for the current disclosure;

End-to-End credentials associated with Entity A 202, may be provisioned to the third-party, referred to as Entity N by the TTP or the required keying material is provisioned to the Entity N 208, in order the Entity N 208 is able to generate the appropriate security credentials that is used for verifying or providing end-to-end security protections, namely, end-to-end message authentication, end-to-end message confidentiality, end-to-end data confidentiality and end-to-end data integrity between Entity A 202 and Entity N 208. A list of the types of credentials that may be generated is provided in table reference:

| Security | Symmetric Keys Generated and Used | Parameters |
|---|---|---|
| Message Originator Authenticity/Integrity | Ke2e_EntityA_EntityN_msg_auth | None |
| Message Re-play protection | Ke2e_EntityA_EntityN_msg_auth | Nonce/Time/Seq# |
| Non-repudiation capability | N/A | N/A |
| Message Confidentiality | Ke2e_EntityA_EntityN_msg_conf | IV |
| Confidentiality of Data in Transit | Ke2e_EntityA_EntityN_data_conf or Ke2e_EntityA_EntityN_msg_conf | IV |
| Confidentiality of Data at Rest | Ke2e_EntityA_EntityN_data_conf or Ke2e_EntityA_EntityN_msg_conf | IV |
| Integrity of Data in Transit | Ke2e_EntityA_EntityN_msg_auth | None |
| Integrity of Data at Rest | Ke2e_EntityA_EntityN_data_auth | Time |

Generating Keying Material

The TTP that employs a KDF 206 may perform an authentication of the Entity N 208 after which and if the Entity N has been authorized, the Entity N is provisioned with the appropriate EntityA_EntityN specific end-to-end keys. Pre-configured EntityA_EntityN specific keys which was pre-provisioned by the Entity A 202 is provided to the Entity N 208. If an Ke2e_EntityA_master has been provisioned then the TTP generates the appropriate Ke2e_EntityA_EntityN specific keys and provisions them to the Entity N 208. Alternatively, the TTP only provides the Ke2e_EntityA_EntityN key to the Entity N 208 and also provides the Entity N 208 with the necessary seeding material so that the Entity N 208 is able to generate the various keys necessary for security protection by the Entity N 208. The various keys generated may be Ke2e_EntityA_EntityN_msg_auth also referred within the document as E2E_MAC_Key for message authentication, Ke2e_EntityA_EntityN_msg_conf for message confidentiality, Ke2e_EntityA_EntityN_data_conf for providing data confidentiality and Ke2e_EntityA_EntityN_data_auth for providing end-to-end data integrity.

Note: In certain diagrams, the end-to-end Ke2e_EntityA_EntityN_msg_auth and Ke2e_EntityA_EntityN_msg_auth may be generically referred to as KpsaE2E.

The Ke2e_EntityA_master may be generated by the Entity A 202 and the TTP, based on an authentication process carried out by the Entity A 202 and the TTP. The Ke2e_EntityA_master may be the result of a bootstrapping process carried out between Entity A 202 and the TTP. In addition, the Ke2e_EntityA_master may be channel bound to the authentication and the authentication channel used for performing the authentication (e.g. TLS or DTLS or GBA) between the Entity A 202 and the TTP. Bootstrapped process: Bootstrapping mechanisms such as GBA may be used in order to derive Ke2e keys that may be associated with each Entity pair. An Entity (e.g. EntityA) that would like to authenticate Entities from an E2E perspective may be authenticated with a TTP using GBA. The Master E2E key generated as a result of authenticating EntityA using a GBA process may be of the form:

Ke2e_EntityA_master: 148735880652C65238B432A . . . (256 bits) The Ke2e_EntityA_master may be generated by the Entity A 202 as well as the TTP bootstrapping based on a successful mutual authentication between the Entity A 202 and the TTP.

Entity-specific keys are generated and provisioned by the TTP or seeding material is provided to each of the end entities so that Entity-specific end-to-end keys can be generated. Example mechanisms of generating the end-to-end keys are shown below Ke2e_EntityA_EntityB=HMAC-SHA256
(Ke2e_EntityA_master, "Bootstrap Process"||Entity_B-ID-||Random1)
Ke2e_EntityA_EntityC=HMAC-SHA256
(Ke2e_EntityA_master, "Bootstrap Process"||Entity_C-ID||Random2)
Ke2e_EntityA_EntityN=HMAC-SHA256
(Ke2e_EntityA_master, "Bootstrap Process"||Entity_N-ID_Random3)

Key expansion mechanisms may be used by Entity A and Entity N in order to generate the associated Ke2e_EntityA_EntityN_msg_auth and Ke2e_EntityA_EntityN_msg_conf keys that are used for providing end-to-end message authenticity as well as end-to-end message confidentiality respectively for messages between Entity A and Entity N. Example of Key expansion for end-to-end keys are provided:

Ke2e_EntityA_EntityN_msg_auth=HMAC-Hash
(Ke2e_EntityA_EntityN_master, T(0)|"E2E Message Authentication Key"|0x01)
Ke2e_EntityA_EntityN_msg_conf=HMAC-Hash
(Ke2e_EntityA_EntityN_master, T(1)|"E2E Message Confidentiality Key"|0x02)

If an AEAD cryptographic process based on a single key is used then only one of the above keys are generated.

Service Layer: E2E Authentication at the service layer, wherein hop-by-hop protection mechanisms may still be used but in addition, an E2E message origination authentication is used. Additionally, information and parameters that are considered to be of security importance may be protected at the Service Layer. Protection may be provided by means of JSON Web Signature (JWS). Only the meta-data may be processed by intermediate nodes. The Meta-data may be integrity protected by E2E JSON web signature based on the E2E key that acts as Message Authentication Code (MAC) key and represented using JSON format such as the JSON Web Signature. Using cryptographic algorithms such as Authentication Encryption with Associated Data (AEAD)-class of algorithms such as AES-CCM and AES-GCM can provide for both end-to-end message authenticity as well as message confidentiality. Identifying the associated data that is used for providing and checking for message authenticity. The Associated Data may be made up of the message header, which is not encrypted in cases where message confidentiality is required. Alternatively, the entire message that is not modified by any intermediate nodes may be used to create a Message Authentication Code. As mentioned previously a sub-set of the message header, called the meta-data of the message may be used as the Associated Data within the AEAD algorithm, which is then used for computation of the MAC. It may also be possible for the MAC to be generated using other means and represented using proprietary means. Irrespective of the mechanisms used to generate the MAC and representation of the MAC within the messaging, the overall message that is not modified or removed by intermediate nodes may be protected against replay attacks by making use of Nonce that is associated with a time component or a combination of both Time the message was created and a Nonce (a very large random value that may be time dependent). Alternatively, a sequence number for each message, which is incremented each time the message is sent may be used during the signature creation process or used in place of Time along with the Nonce. Alternatively, the sequence number of the message is included along with the Time and Nonce for replay protection. E.g. Signature or MAC or Authentication Tag (Auth_Tag) may be derived as follows:

MAC=HMAC-SHA-256
(Ke2e_EntityA_EntityN_msg_auth,
"E2E_ServiceLayerMAC"||OriginData||Time||Nonce)
Or:
MAC=HMAC-SHA-256
(Ke2e_EntityA_EntityN_msg_auth,
"E2E_ServiceLayerMAC"||OriginData||Message Sequence Number||Nonce)

Instead of just the "OriginData", the complete message or meta-data associated with the message may be used.

Ke2e_EntityA_EntityN_msg_auth: The key provisioned to the Entity requesting E2E authentication. Here it implies an end-to-end message authentication key between Entity A and Entity N. Generally a symmetric key that shared by the two Entities (e.g. Entity A 202 and Entity N 208). In the case of public keying mechanism the Ke2e_EntityA_EntityN_msg_auth may be a private key (also referred as the E2E_DS_Key: End-to-End Digital Signature Key) used in signing the message (only known to the signing Entity) and verified by the other entity using a certificate that contains a public key. In the case of certificate-less public key mechanism, the end Entity must be provisioned with the public key of the Entity to which an E2E authentication is being performed. In an alternative embodiment, the public key mechanism may be used to derive an Ke2e_EntityA_EntityN_msg_auth that is symmetric in nature and shared by the entities.

OriginData: The data that contains information about the original request, this data may be considered as the meta-data of the actual message but also contains information about the originator of the actual message. It is assumed that the "OriginData" has not been modified by any intermediate nodes. The OriginData may contain a sub-set of the information that is contained within the message header, namely: Originator-Id, Destination-Id, Resource-Id, Type-of-Operation as well as the Session-Id.

Time: May be optional and provides the timestamp of when the original message was created Nonce: Random value associated with a time component and associated with a session and protects against a replay attack.

Sequence Number (Seq#): This is a unique number that identifies the message. In some cases, the Seq# may be the same as the Session-Id.

Session Layer: An E2E authentication by means of DTLS or TLS is used. This would by-pass Hop-by-Hop security mechanisms. The end Entities would be mutually authenticated and security association is established. This may be done between Entities in a truly E2E manner (Direct) or Delegated modes.

End-to-End Authentication Process

The E2E Authentication process may be performed in a truly E2E manner or in a delegated or partially delegated manner. Based on the scope that was provided or selected by the Entity, the E2E authentication process may be carried out using Symmetric Key: As described previously, the entity that requested for E2E authentication credential may be provisioned with a symmetric keys, scope and parameter that are to be used for performing E2E Authentication. The symmetric key may be used for Service Layer E2E or Session Layer E2E authentications in direct or delegated scenarios. As long as the scope and associated parameters are provided an entity may use the keys accordingly. The E2E authentication Keys (Ke2e_EntityA_EntityN_msg_auth) may be re-generated periodically. Similarly a Ke2e_EntityA_master may be generated periodically based on the lifetime associated with each of the credential.

Certificate-based/Public Key: Credentials that are provisioned may be based on Public Keys represented in the form of certificates or just public/private keys, identity based encryption or other mechanisms that are based on public-keying mechanisms. E2E authentication Keys (ke2e) for Session Layer authentication may be generated between the Entities using Authenticated Diffie-Hellman process using the certificates for authentication Delegated vs. Direct Security Mechanisms:

If an Entity requires a "High Integrity" or "Higher degree of Assurance" for authentication, then the processing requirements may be proportionately higher, and if the capabilities (e.g. memory/processing) of the Entity is limited, the Entity may opt to perform security functions in a delegated manner. The Entity may delegate authentication and other security functions to a trusted third entity (e.g. SEF 204) to perform the more complicated security functions (e.g. E2E authentication, secure storage, forward secrecy). The other advantage of performing a delegated authentication is that the delegated agent (e.g. SEF) may able to combine a number of E2E authentications together.

If an Entity is capable of performing E2E authentication and other secure operations on its own, the Entity may opt for performing a direct authentication on its own without the need for delegation. The SEF 204 may select the option for delegation on its own based on device capabilities or service requirements (e.g. reduce signaling or other operational overhead). A hybrid approach is used when part of the security functions are delegated whereas other security functions are performed directly.

Figure 3A:
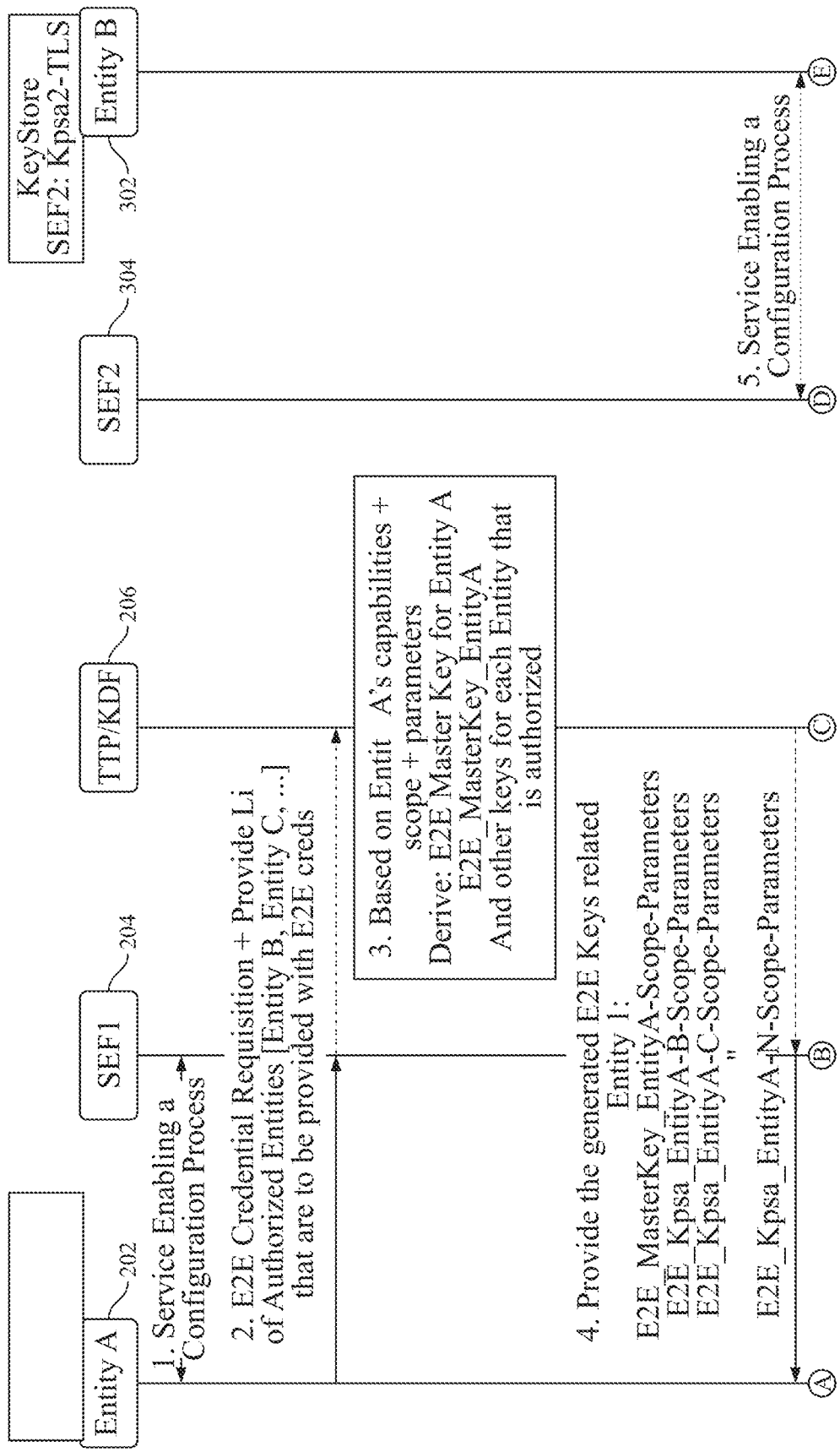
FIG. 3A-B is a diagram that illustrates example E2E operations between Entity A and Entity B.
Figure 3B:
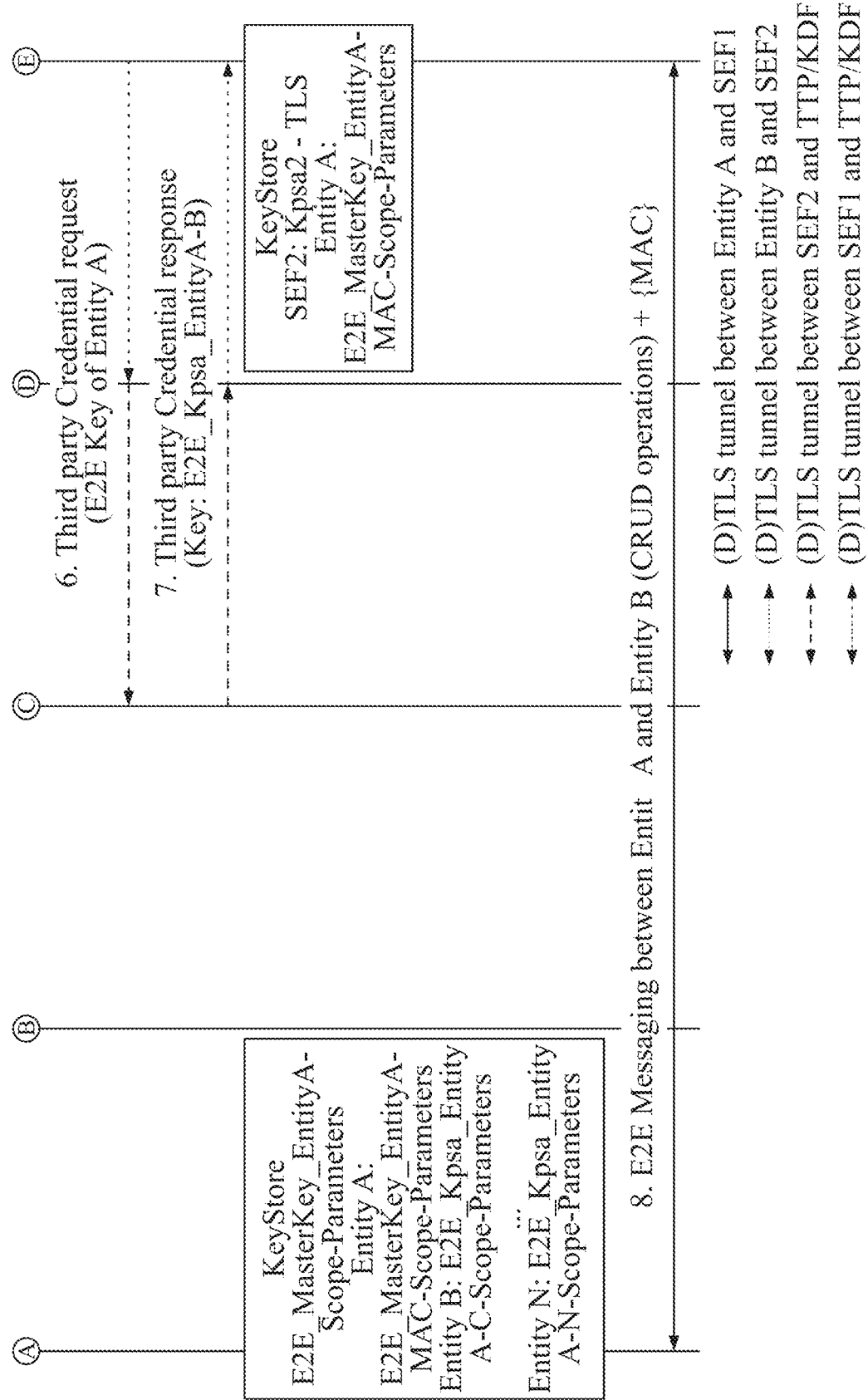

FIG. 3A-B is a diagram that illustrates example E2E operations between Entity A 202 and Entity B 302:

In step 1 of FIG. 3A-B, Entity A 202 and SEF1 204 (e.g. a first hop entity that has mutual trust provisioned beforehand), establishes a (D)TLS tunnel that is authenticated with secure communications enabled. Using the secure tunnel the Service Enabling Security Configuration (SESC) process occurs, wherein Entity A's profile is created and Security requirements are determined.

In step 2 of FIG. 3A-B, Entity A 202 may optionally request the establishment of E2E keys between itself and authorized list of Entities (E.g. Entity B 302, Entity C . . . Entity N). The request is sent by Entity A 202 to SEF1 204 and SEF1 204 may send the request to a TTP/KDF 206. Alternatively, the SEF1 204 may request the creation of E2E keys with the TTP 206, without the need for an explicit message from Entity A. In that scenario, the SEF1 204 would determine the authorized list of Entities that would be provided with E2E keys. Alternatively, the Entity A 202 may send the Key Requisition and authorized list of Entities directly to a TTP/KDF 206 if there is a trust relationship between Entity A 202 and TTP 206. It may be possible that Entity A 202 is provisioned with TTP's certificate or a shared secret between the TTP and Entity A 202 is pre-provisioned. It should be noted that the TTP 206 must have the credentials in order to authenticate the Entity A 202 directly without having to rely on the SEF1 204 for that scenario to work.

In step 3 of FIG. 3A-B, based on the capabilities of Entity A 202, scope, the TTP generates a Ke2e_EntityA_master and associated with Entity A 202 if the credential requisition originated from SEF1, then the master key generated may be Ke2e_SEF1_master and associated with SEF1 204. Additional parameters on how the Key may be used and a ContextID that identifies the Key and Key usage are also generated. Optionally, the TTP may generate E2E symmetric keys that are E2E Entity specific key using the MasterKey in the following manner:

a.         E.g:         Ke2e_EntityA_EntityB_master= (Ke2e_Entitiy_A_master, "Entity B ID||Parameters")

Wherein, Entity B ID refers to the identity of Entity B (e.g. URI of Entity B) is provided by Entity A 202 or SEF1

Ke2e_EntitiyA_EntityB-master: is the E2E symmetric key to be used to authenticate Entity A 202 to Entity B and vice-versa In step 4 of FIG. 3A-B, the TTP provides the keys including the EntityA's E2E master key and optionally a list of E2E Entity-specific symmetric keys to the SEF1 204. The SEF1 204 may forward the keys to the Entity A 202. Alternatively, if SEF1 204 had made the requisition, then the keys are stored at SEF1 204 and not forwarded to Entity A 202. This is applicable when the SEF1 204 performs Delegated Authentication on behalf of Entity A 202.

In step 5 of FIG. 3A-B, an Entity (e.g. Entity B 302), that performs a SESC process with SEF2 304. It is possible in some scenarios that SEF1 204 and SEF2, 304 may be same and if so, the E2E authentication process may be omitted or the Key requisition is simplified without having to involve a TTP.

In step 6 of FIG. 3A-B, Entity B 302 requests to the TTP in order to request the E2E symmetric key to be used for communicating with Entity A 202. Entity B 302 may be optionally authenticated with the TTP directly or alternatively, TTP trusts SEF2 304 based on (D)TLS connection. In an alternative embodiment, SEF2 304 may perform the request to the TTP on behalf of Entity B. In another embodiment, the SEF2 304 may request E2E Entity-specific for itself, in which case a more dynamic key generation mechanism may be used by the TTP.

In step 7 of FIG. 3A-B, the TTP determines that Entity B 302 has been authorized by Entity A 202 to be provisioned with Entity A's E2E key. The TTP 206 then forwards the E2E entity-specific key (Ke2e_EntitiyA_EntityB_master) to SEF2 304 which forwards it Entity B 302. The SEF2 304 may alternatively, store the key if SEF2 304 provides for delegated authentication. For delegated authentication the key provisioned by the TTP may be: Ke2e_EntityA_SEF2-master. Entity A 202 has not authorized SEF2 304, however, the TTP may generate a SEF2 specific key and provide appropriate information within the parameters to indicate that it was using delegated authentication. In such a scenario, the Entity A 202 would derive a SEF2-specific key using the Master Key that was provisioned to it along with the parameters that were provided In step 8 of FIG. 3A-B, any Messaging that may occur over the Session Layer and the corresponding operations that are carried out (e.g. Create, Retrieve, Update or Delete) may be protected using a MAC or JSON Web Signature (JWS) or any other means that is able prove message originator authentication based on the parameters and the E2E entity-specific key that were provided during the key provisioning process.

It is understood that the entities performing the steps illustrated in FIG. 3A-B are logical entities that may be implemented in the form of software (i.e., computer-executable instructions) stored in a memory of, and executing on a processor of, a network node or computer system such as those illustrated in FIG. 21C or FIG. 21D. That is, the method(s) illustrated in FIG. 3A-B may be implemented in the form of software (i.e., computer-executable instructions) stored in a memory of a network node, such as the node or computer system illustrated in FIG. 21C or FIG. 21D, which computer executable instructions, when executed by a processor of the node, perform the steps illustrated in FIG. 3A-B. It is also understood that any transmitting and receiving steps illustrated in FIG. 3A-B may be performed by communication circuitry of the node under control of the processor of the node and the computer-executable instructions (e.g., software) that it executes.

Embodiments

Mechanisms described in the disclosure are applicable to environments that involve Authentication and more particularly to E2E authentication of Entities that are considered to be constrained (e.g. IoT/M2M devices). However, it is not limited to just IoT devices and can be used where a trusted entity may determine appropriate security features, functions and credentials in order to relieve messaging overhead involved in the system as a whole in addition to relieving constrained devices from performing complex security functions. The embodiment described in the following subsections relate to the oneM2M specifications. Here, we propose to host the SEF 204 at the hosting CSE. The CSE in some cases may also provide TTP/KDF 206 support, but from a scalability perspective, TTP/KDF 206 may be hosted at the M2M Service Provider CSE or as Certificate Authority but with added functionality as described in this disclosure.

Figure 4A:
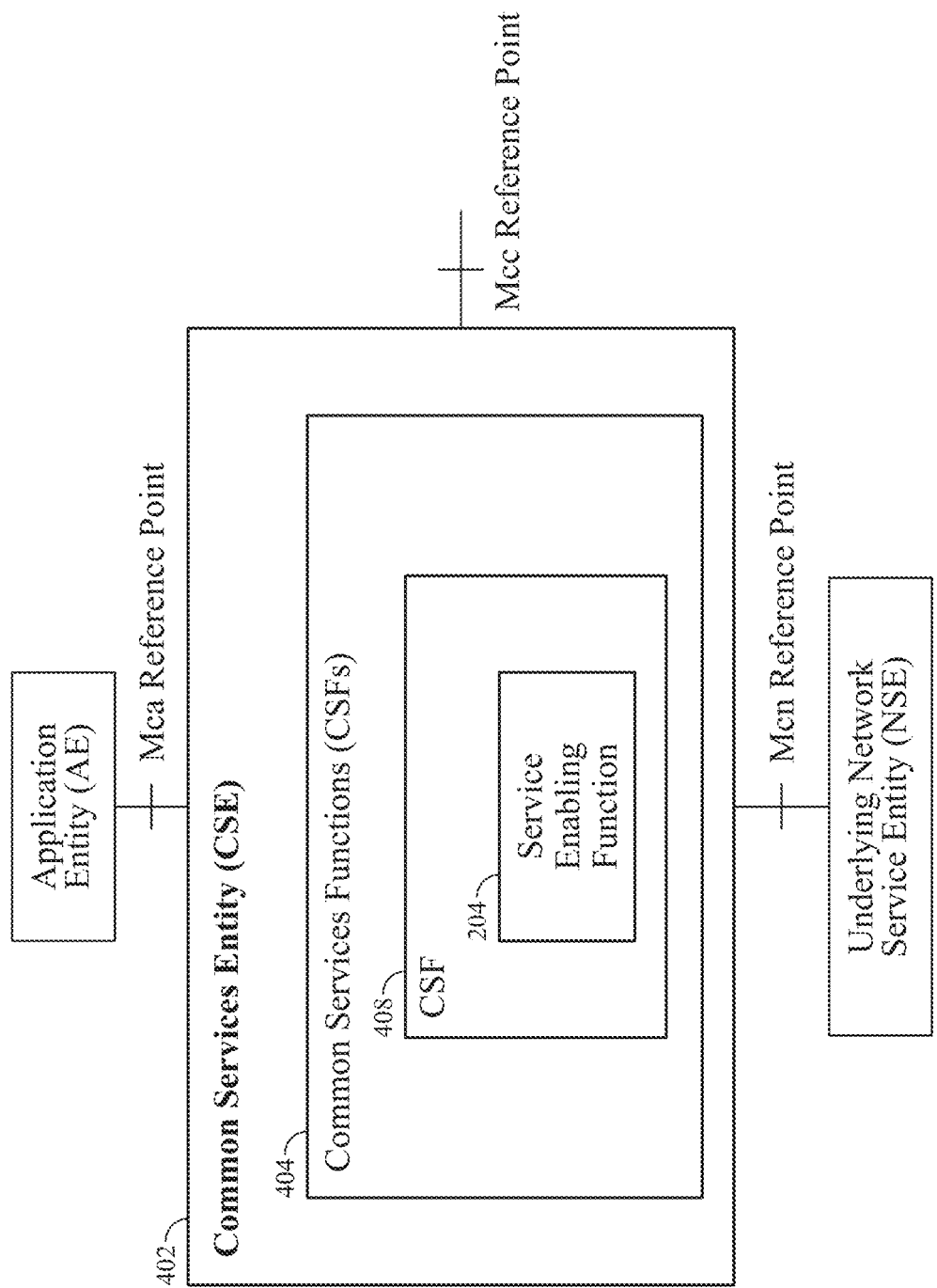
FIG. 4A-B are diagrams that illustrates a one M2M embodiment.
Figure 4B:
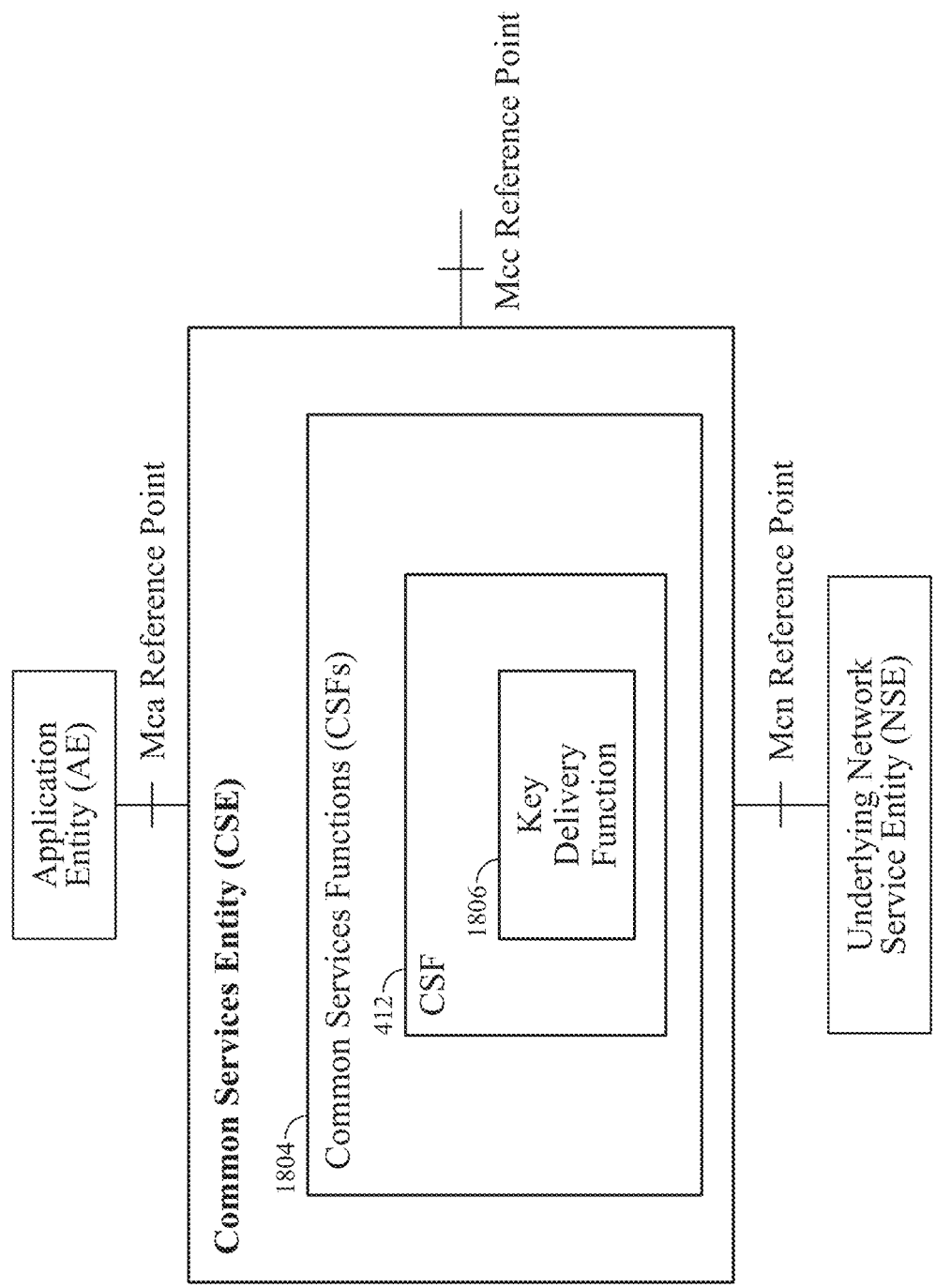

FIG. 4A-B are diagrams that illustrates a one M2M embodiment. oneM2M defines the capabilities supported by the oneM2M service layer, which are referred to as Capability Service Functions (CSFs 404). The oneM2M service layer is referred to as a Capability Services Entity (CSE 402). In one embodiment, as shown in FIG. 4A, the proposed Service Enabling Function 204 may be hosted in CSF 408 as a oneM2M CSF. As shown in FIG. 18B, the Key Delivery Function 206 may be hosted in CSF 412 as a oneM2M CSF.

Service Enablement and Security Configuration (SESC)

Figure 5A:
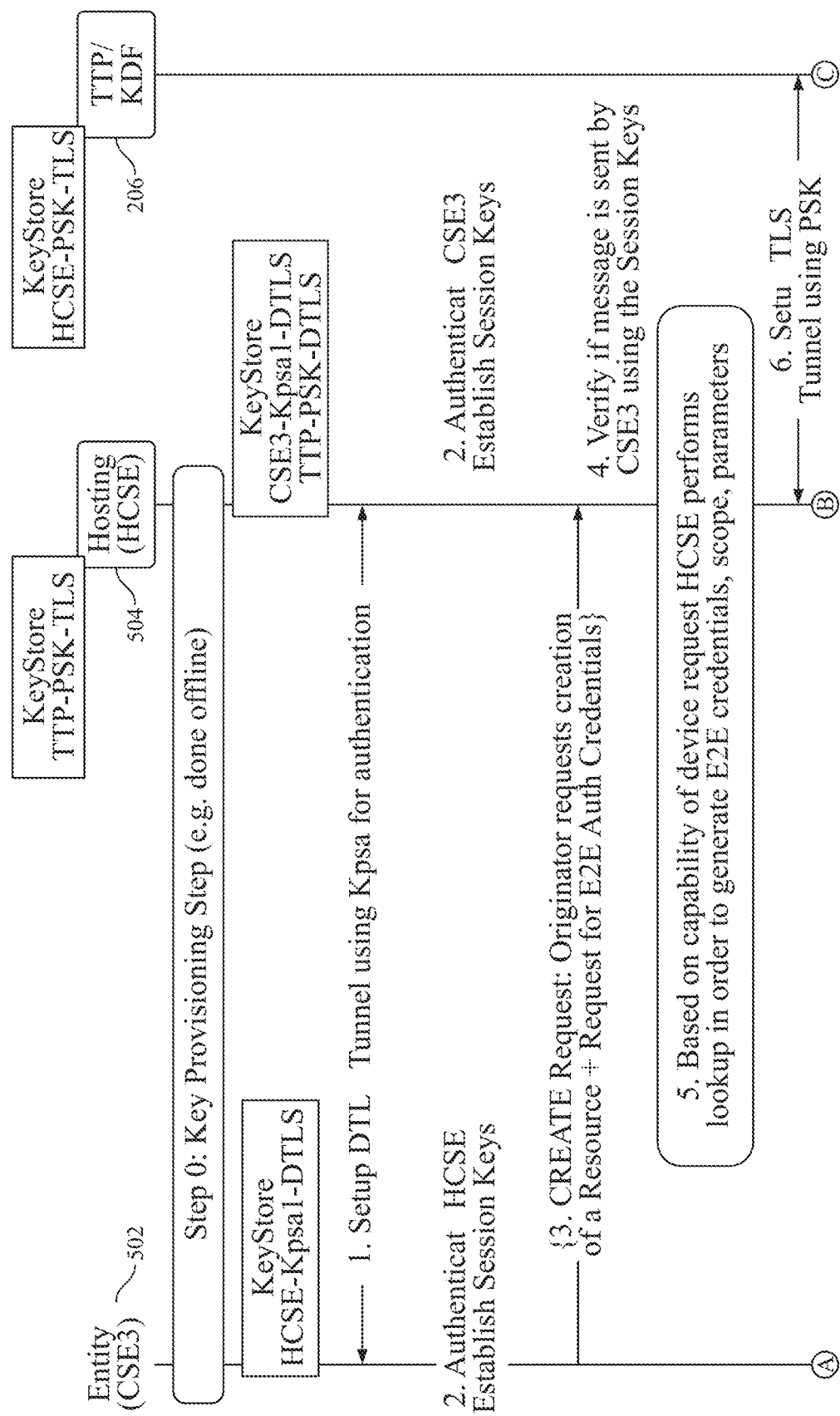
FIG. 5A-B is a diagram that illustrates a Security Credential Requisition and Provisioning (SCRP) Phase.
Figure 5B:
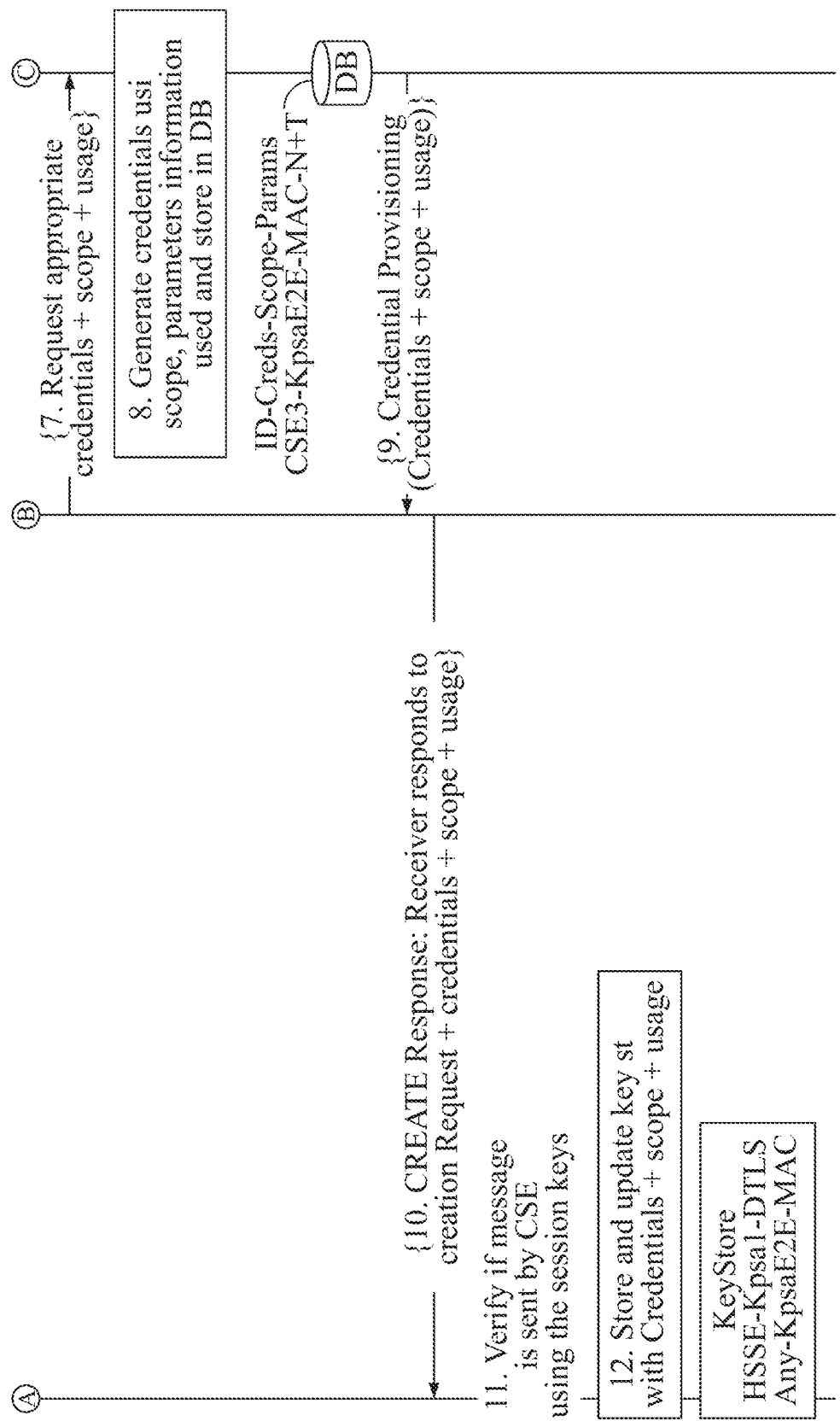

The SESC may include the Security Credential Requisition and Provisioning (SCRP) Phase illustrated in FIG. 5A-B, wherein, an Entity CSE3 502, requests for the setup of E2E Authentication credentials. The E2E credentials may be used by other Entities in order that an E2E authentication is carried out with CSE3 502. Messaging Details:

Step 0 of FIG. 5A-B is a Key Provisioning Step for setting up Hop-by-Hop authentication credentials. This step may be carried out based on current oneM2M specifications. This may be performed offline. As a result of the key provisioning step, the CSE3 502 and the Hosting CSE (HCSE) 504 are provisioned with a symmetric key (Kpsa1).

In step 1 of FIG. 5A-B, a CSE3 502 and HCSE 504 sets up a DTLS connection using Kpsa1 as the basis for authentication.

In step 2 of of FIG. 5A-B, as part of the DTLS authentication, session keys are established In step 3 of FIG. 5A-B, CSE3 502 sends a "Create Request" message indicating the need for creation of a oneM2M resource and also a request for the creation of E2E credentials. The CREATE Request message is protected by the DTLS session keys. The CSE3 502 provides a list of authorized entities that can use the E2E credentials.

In step 4 of FIG. 5A-B, HCSE 504 verifies if the origin of the message is indeed from AE1 by using the DTLS session keys In step 5 of FIG. 5A-B, HCSE 504, which is the hosting CSE for CSE3 502, creates a resource for CSE3 502 based on the mechanisms as specified in the oneM2M specifications. In addition, based on capabilities of CSE3 502, which may be inferred or obtained during the service enablement process as described in above, the HCSE 504 creates a request for E2E credentials that are appropriate based on the capabilities of the device. It also provides the scope for the usage of the security credentials and parameters that may be used. The scope may be Service Layer/Session Layer E2E authentication, parameters include information that may be used for replay protection, information that is used for Message Authentication (e.g. that identifies the true identity of the originator of the message or meta-data etc)

In step 6 of FIG. 5A-B, A TLS session is setup between the HCSE 504 and the TTP/KDF 206 using pre-established security credentials (PSK).

In step 7 of FIG. 5A-B, Request for credentials, scope, usage and parameters are sent from the HCSE 504 to the TTP using the secure TLS tunnel.

In step 8 of FIG. 5A-B, The TTP generates appropriate credentials as requested by the HCSE based on the device capability information provided by the HCSE 504. If the device capability is low, then the appropriate algorithm (e.g. HMAC-SHA1 or 3DES or other low resource requiring algorithm) is selected along with the right key size. The credentials along with the scope, parameters are stored in a database. The credentials generated maybe referred to as the "Ke2e_CSE3_master" Key and have an appropriate key handle/context ID associated with it. In cases, where CSE3 502 has a direct connection with a TTP, the Ke2e_CSE3_master key may be forwarded directly to the CSE3 502 by the TTP. Keys may be transported using (D)TLS connection established between CSE3 502 and the TTP.

In step 9 of FIG. 5A-B, the credentials are then forwarded to the HCSE 504 along with the necessary scope and parameters In step 10 of FIG. 5A-B, HCSE 504 forwards the credentials along with other relevant information to the CSE3 502.

In step 11 of FIG. 5A-B, Message is verified to have been received from the HCSE 504.

In step 12 of FIG. 5A-B, Store the credentials along with the scope and parameters in the Keystore.

It is understood that the entities performing the steps illustrated in FIG. 5A-B are logical entities that may be implemented in the form of software (i.e., computer-executable instructions) stored in a memory of, and executing on a processor of, a network node or computer system such as those illustrated in FIG. 21C or FIG. 21D. That is, the method(s) illustrated in FIG. 5A-B may be implemented in the form of software (i.e., computer-executable instructions) stored in a memory of a network node, such as the node or computer system illustrated in FIG. 21C or FIG. 21D, which computer executable instructions, when executed by a processor of the node, perform the steps illustrated in FIG. 5A-B. It is also understood that any transmitting and receiving steps illustrated in FIG. 5A-B may be performed by communication circuitry of the node under control of the processor of the node and the computer-executable instructions (e.g., software) that it executes.

Figure 20:
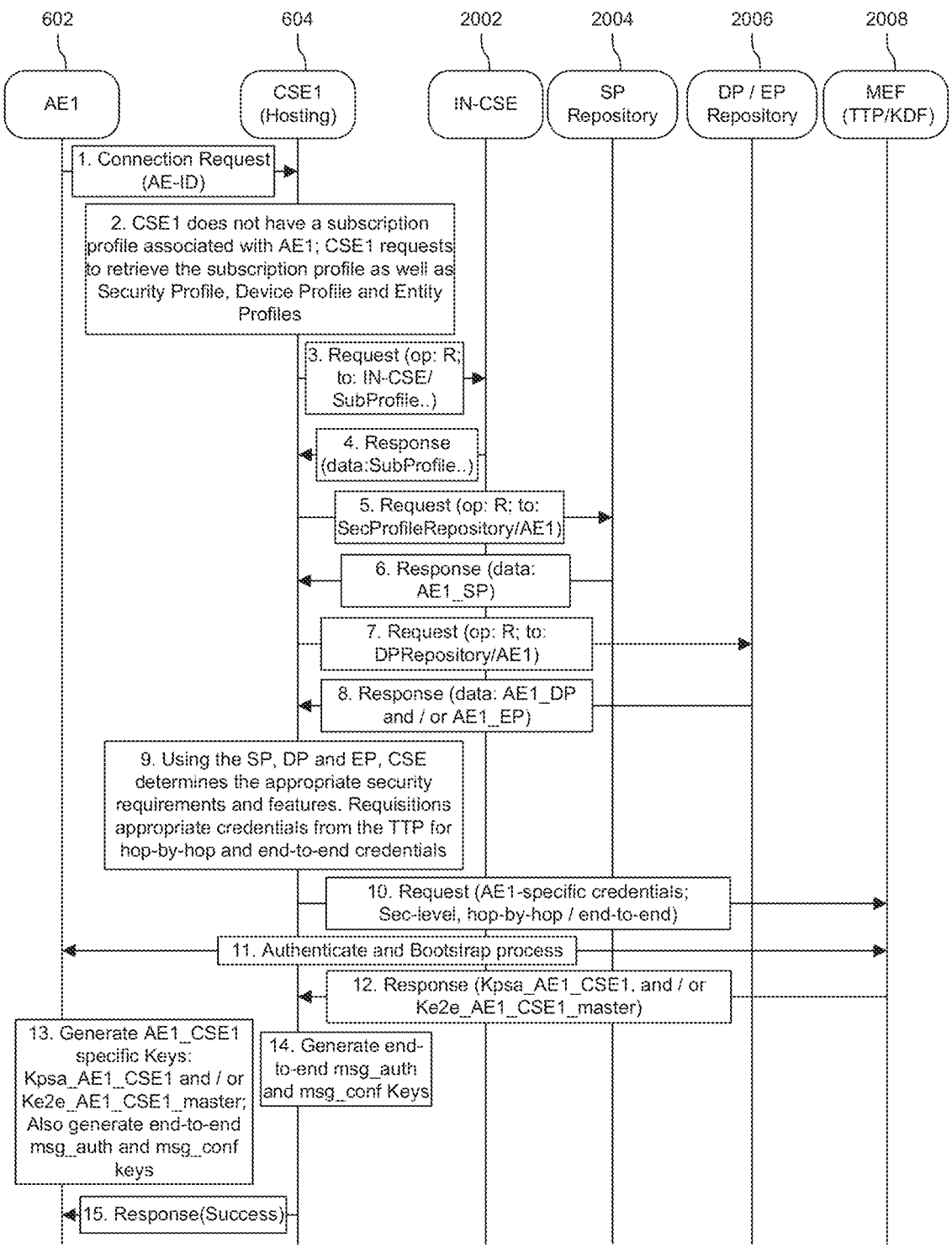
FIG. 20 is a diagram that illustrates an entity AE1 initiating a registration process with a CSE or service provide and including provisioning of appropriate security credentials for hop-by-hop and/or end-to-end security.

FIG. 20 illustrates an entity AE1 602 initiating a registration process with a CSE or service provide and including provisioning of appropriate security credentials for hop-by-hop and/or end-to-end security. Appropriate credentials may be determined based upon the DP, SP and/or EP associated with the AE1 602.

In step 1 of FIG. 20, AE1 602 initiates a connection request with a CSE1 604. The connection request may be a Registration request.

In step 2 of FIG. 20, the CSE1 604 does not have a profile, parameters associated with AE1 602 and therefore requests a subscription profile from an IN-CSE 2002 in step 3.

In step 4 of FIG. 20, the IN-CSE 2002 sends an M2M-Subscription Profile associated with the AE1 602 to the CSE1 604.

In step 5 of FIG. 20, the CSE1 604 may request an SP with a SP Repository 2004 that may be located outside the service or network provider network. A response containing the AE1_SP associated with AE1 602 is sent to the CSE1 604 in step 6 of FIG. 20.

In step 7 of FIG. 20, the CSE1 604 may request a AE1 DP, a DP that associated with AE1 602 and/or AE1_EP, a EP or AP associated with AE1 602 from a DP/EP repository 2006. A response containing AE1_DP and/or AE1_EP is sent to the CSE1 604 in step 8.

In step 9 of FIG. 20, based on the SP, DP and/or EP, the CSE1 604 determines the right set of security requirements and therefore the associated security features and parameters for securing communications with AE1 602.

In step 10 of FIG. 20, CSE1 604 requests appropriate security credentials with an M2M Enrollment Function (TTP/KDF) based on the assessment performed by CSE1 604. The credential request may be explicit or implicit and may provide either granular security requirement or less granular requirement.

In step 11 of FIG. 20, the M2M Enrollment Function (MEF) 2008 initiates bootstrapping process with AE1 602 and generates appropriate bootstrapped session credentials.

In step 12 of FIG. 20, the MEF 2008, generates the CSE1-specific end-to-end credentials (Ke2e_AE1_CSE1_master) associated with AE1 602 and provisions it to the CSE1 604. The MEF 2008 may alternatively generate Kpsa_AE1_CSE1 and provisions it to CSE1 604. In addition, the MEF 2008 may also provision UsageInfo and ContextInfo associated with credentials.

In step 13 of FIG. 20, AE1 602 generates the CSE1-specific end-to-end credentials: Ke2e_AE1_CSE1_master and associated Ke2e_AE1_CSE1_msg_auth and/or Ke2e_AE1_CSE1_msg_conf credentials may be generated as well depending upon the policies and UsageInfo and ContextInfo. The AE1 602 may alternatively generate Kpsa_AE1_CSE1 that is used for hop-by-hop security.

In step 14 of FIG. 20, the CSE1 604 generates the Ke2e_AE1_CSE1_msg_auth and/or Ke2e_AE1_CSE1_msg_conf if it was not provisioned with the Ke2e credentials by the MEF 2008 and was only provisioned with the Ke2e_AE1_CSE1_master as well as the seeding material required for generation of the end-to-end credentials.

It is understood that the entities performing the steps illustrated in FIG. 20 are logical entities that may be implemented in the form of software (i.e., computer-executable instructions) stored in a memory of, and executing on a processor of, a network node or computer system such as those illustrated in FIG. 21C or FIG. 21D. That is, the method(s) illustrated in FIG. 20 may be implemented in the form of software (i.e., computer-executable instructions) stored in a memory of a network node, such as the node or computer system illustrated in FIG. 21C or FIG. 21D, which computer executable instructions, when executed by a processor of the node, perform the steps illustrated in FIG. 20. It is also understood that any transmitting and receiving steps illustrated in FIG. 20 may be performed by communication circuitry of the node under control of the processor of the node and the computer-executable instructions (e.g., software) that it executes.

Third-Party Credential Requisition Phase

Figure 6A:
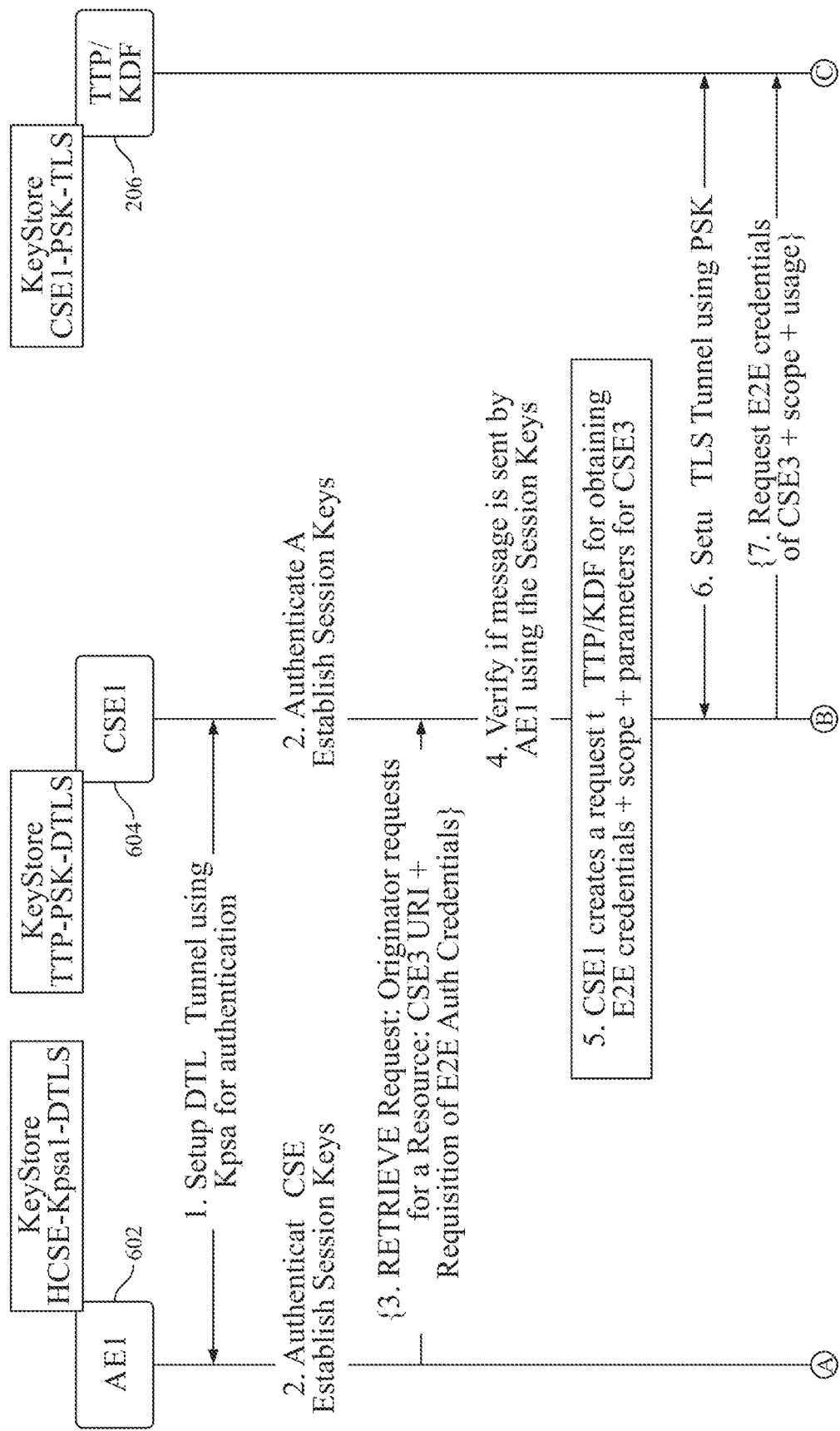
FIG. 6A-B is a diagram that illustrates a Third-party credential requesting phase
Figure 6B:
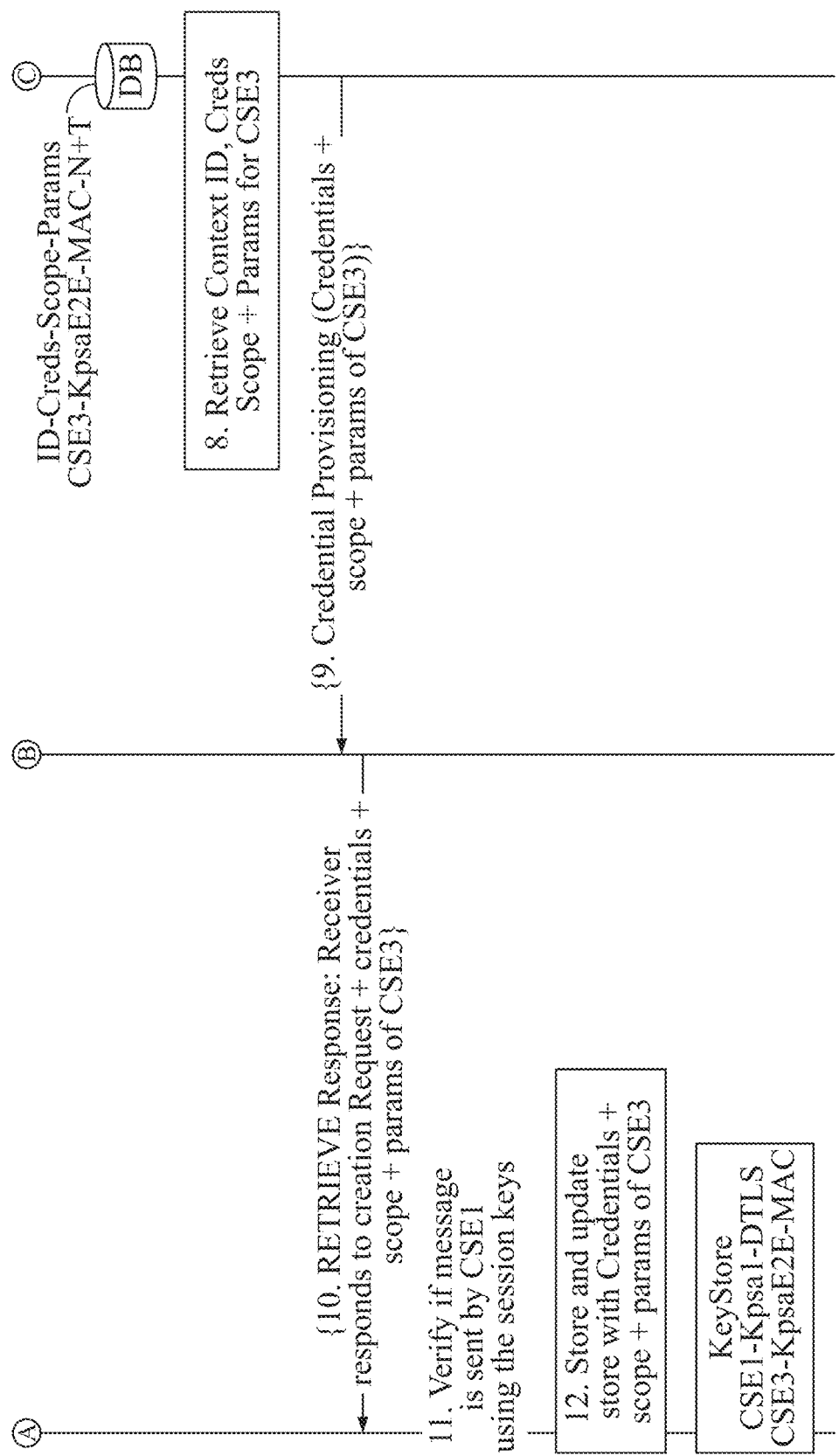

An embodiment wherein an entity (e.g. AE1 602) that wants to retrieve a resource hosted by another entity (e.g. CSE3 502) and would like to request for the other entity's E2E credential is illustrated in following figure. FIG. 6A-B is a diagram that illustrates a Third-party credential requesting phase It is assumed that the AE1 602 and CSE1 604 and TTP 206 are all pre-provisioned with symmetric keys stored within the keystores as specified by oneM2M specs at each of the entities. It may also be possible to envision that the AE1 602 is only pre-provisioned with E2E credentials of a TTP 206, which is then used to obtain credentials for setting up hop-by-hop association between AE and hosting CSE. Messaging details:

In step 1 of FIG. 6A-B, the AE1 602 sets up a DTLS security association using Kpsa1 with CSE1 604.

In step 2 of FIG. 6A-B, each entity authenticates one another and sets up session keys In step 3 of FIG. 6A-B, AE1 602 sends a "RETRIEVE Request" message targeting a resource hosted by CSE3 502 along with an optional E2E credential request message. The E2E credential request may be optional since the CSE1 604 may make a determination if an E2E authentication credentials are required.

In step 4 of FIG. 6A-B, The RETRIEVE Request message is forwarded within the DTLS tunnel and the origin of the message is verified by the CSE1 604

In step 5 of FIG. 6A-B, CSE1 604 based on the capabilities of the AE1 602 creates a requests for credentials, scope and parameters for CSE3 502

In step 6 of FIG. 6A-B, CSE1 604 sets up TLS connection with TTP using PSK

In step 7 of FIG. 6A-B, request for CSE3's credentials, scope, parameters and optionally AE1's preferred security capabilities may also be provided In step 8 of FIG. 6A-B, if AE1 602 has been authorized by the Entity CSE3 502 during the SCRP phase, and is in the list of authorized entities then based on the request for CSE3 credentials, the TTP retrieves credentials associated with CSE3 604

In step 9 of FIG. 6A-B, credentials of CSE3 604 along with other relevant information such as scope, parameters are sent using the TLS tunnel to the CSE1. CSE1 may optionally store the credentials in case, a delegated authentication is being carried out In step 10 of FIG. 6A-B, the CSE1 sends a RETRIVE Response message to the AE1 along with CSE3's credentials and associated information In step 11 of FIG. 6A-B, the message is verified by AE1

In step 12 of FIG. 6A-B, AE1 602 stores the CSE3's credentials and associated parameters within the keystore.

It is understood that the entities performing the steps illustrated in FIG. 6A-B are logical entities that may be implemented in the form of software (i.e., computer-executable instructions) stored in a memory of, and executing on a processor of, a network node or computer system such as those illustrated in FIG. 21C or FIG. 21D. That is, the method(s) illustrated in FIG. 6A-B may be implemented in the form of software (i.e., computer-executable instructions) stored in a memory of a network node, such as the node or computer system illustrated in FIG. 21C or FIG. 21D, which computer executable instructions, when executed by a processor of the node, perform the steps illustrated in FIG. 6A-B. It is also understood that any transmitting and receiving steps illustrated in FIG. 6A-B may be performed by communication circuitry of the node under control of the processor of the node and the computer-executable instructions (e.g., software) that it executes.

Figure 14:
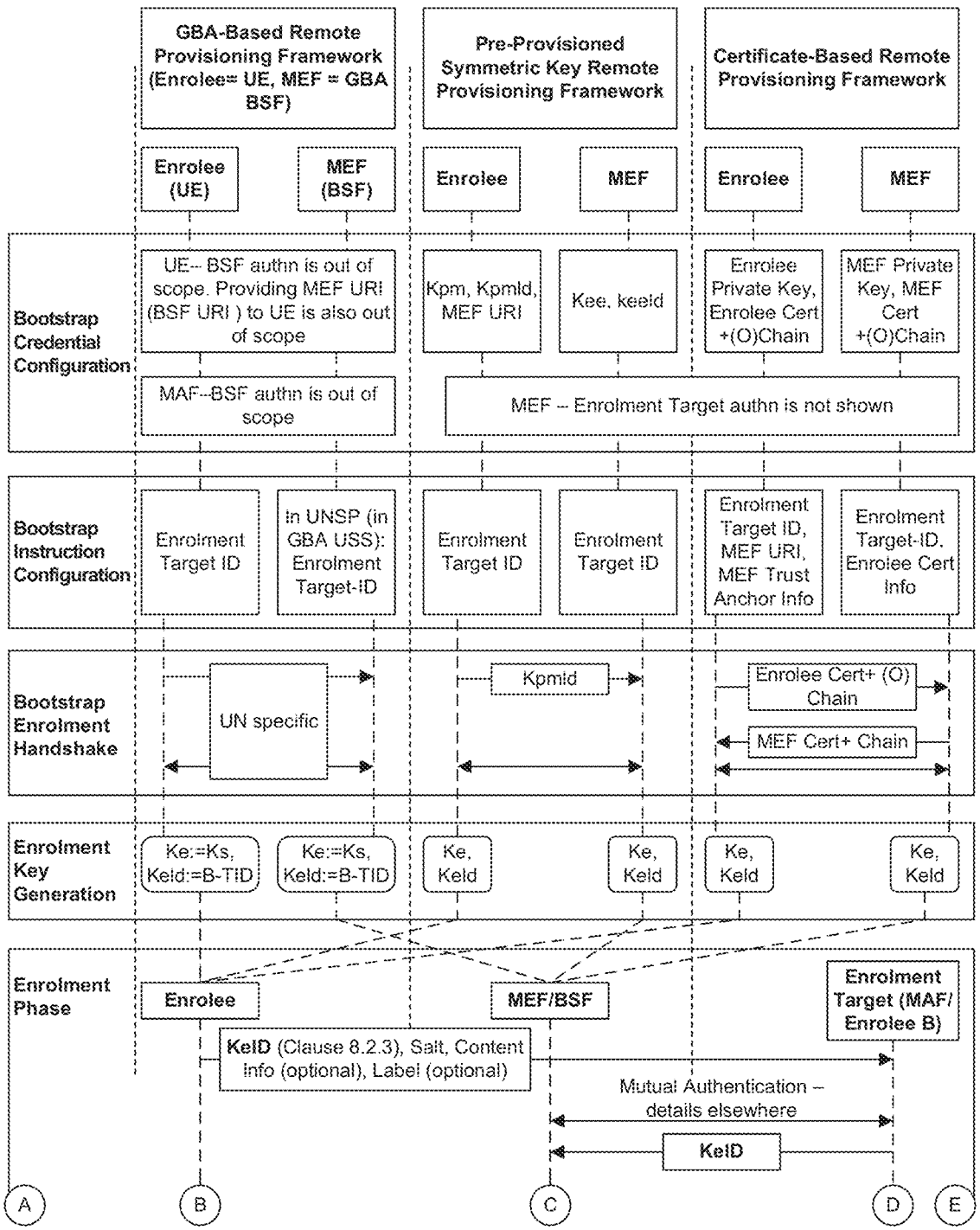
FIG. 14 is a diagram that illustrates bootstrapping process of one embodiment.
Figure 14:
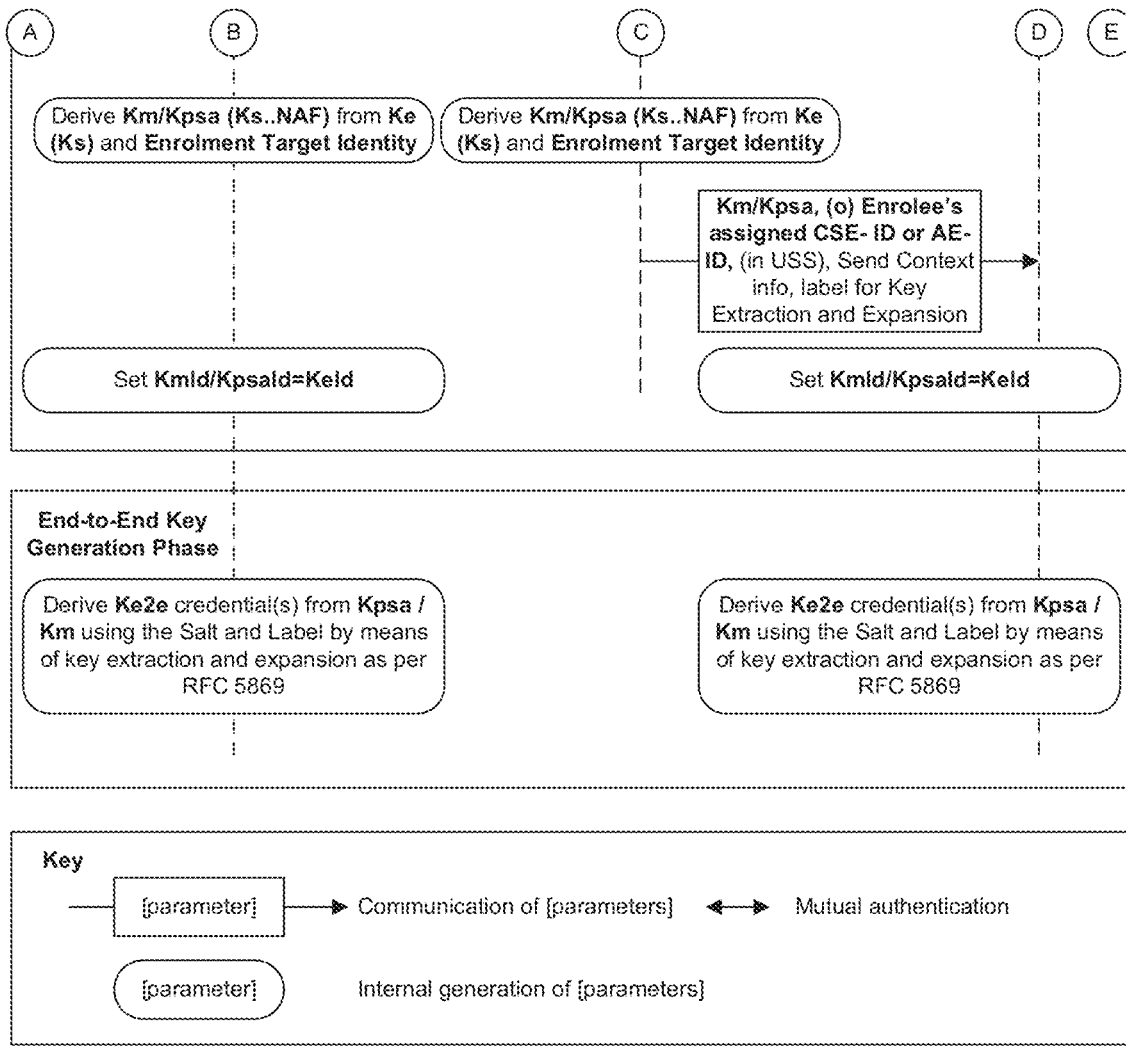

An embodiment based upon bootstrapping process is illustrated in FIG. 14 and described here. An AE or CSE that requires remote provisioning of a Master Credential and Master Credential Identifier or a Provisioned Secure Connection Key (Kpsa) and Provisioned Secure Connection Key Identifier (KpsaId) is called an Enrollee. The The AE or CSE with whom the Enrollee is to establish a security association is called Enrollee B. The AE or CSE or M2M Authentication Function (MAF) with whom the Enrollee is to establish a shared key is called an Enrolment Target. The oneM2M system supports pre-provisioned symmetric Enrollee key, which is a symmetric key is pre-provisioned to the Enrollee and the M2M Enrollment Function (MEF) for the mutually authentication of those entities. Similarly, a certificate based mechanism or raw public key may be provisioned at the Enrollee and at the MEF. The Enrollee and the MEF shall validate each other's Certificate before trusting the Public Verification Keys in the Certificate. Within the Security Handshake, the M2M Enrolment Function creates a digital signature of the session parameters using its private signing key and the Enrollee verifies the digital signature using the M2M Enrolment Function's public verification key. Then the roles are reversed: the Enrollee creates a digital signature and the M2M Enrolment Function verifies it. Alternatively, a GBA-based provisioning mechanism is used. In this case, the role of the MEF is performed by a GBA Bootstrap Server Function (BSF). This framework uses 3GPP or 3GPP2 symmetric keys to authenticate the Enrollee and the MEF (which is also a GBA BSF). The details are specified by 3GPP TS 33.220 and 3GPP2 S.S0109-A The Enrollee and M2M Enrolment Function are pre-provisioned with the Bootstrap Credential that the entity will use to authenticate itself to the other entity. The mechanisms for this pre-provisioning may be performed by an administrator, automated at the factory, using a device manager function or using mechanisms such as a Trusted Service Manager (TSM) as specified by Global Platform. The process of establishing the "provisioned credential for M2M security establishment", referred to as the Kpsa and its associated identifier, the KpsaId and the "master credential", referred to as the Km and its associated "master credential identifier" KmId, follows the mechanisms as described in section 8.3.1.2 within the TS-0003 specification for oneM2M. Once the Km and/or the Kpsa has been generated then they may be used the "master credential" in order to generate the E2E credentials. The specifications describes mechanisms to perform the following: Bootstrap credential Configuration, Bootstrap Instruction Configuration, Bootstrap Enrolment Handshake, Enrolment Key Generation and Integration to Association Security Handshake procedures. In this disclosure we are proposing to add an additional process, called the "Generation of End-to-End Credentials".

We are proposing to enhance the "Enrollment Phase" with the mechanism to provide the Enrolment Target or the MAF with the ability to generate End-to-End credentials, by providing at least the following parameters: Content Info, Label and Salt. The Content Info provides the Enrollment Target with enough information about the type of Credentials that are to be generated, the mechanisms or standards to follow in order to be able to generate the End-to-End credentials etc. Example type of Credentials may be End-to-End Message Authentication Credentials, End-to-End Data Security Credentials, information on whether the credentials may be public or symmetric keys, the length of the keys, the algorithms/protocols to be followed etc. The Label provides the necessary information used for generation of those credentials based on the usage as described by RFC 5809 or RFC 5246 or RFC 5705 or any other standardized Key Derivation Functions and Key Expansion. The Context Info and the Label may be provided directly by the Enrollee or provided by the MEF to the Enrolment Target. The Salt is a random value that is used as part of the key generation mechanism. The preferred approach is for the Enrollee to provide the Salt to the Enrolment Target during the initial message as part of the Enrolment Phase. The Salt may also be a hash value that is computed based on the initial communications between the Enrollee and the Enrollment Target.

As part of the "Generation of End-to-End Credentials" process, the enrollee and the enrollment target generates End-to-End credentials using the Kpsa_AE_CSE as the master key in order to generate the End-to-End master key, Ke2e_AE_CSE_master. Alternatively, if the target is a MAF, then the Km would be used as the master key for the generating the End-to-End master key. An Example of End-to-End Key Generation using RFC 5809 is provided below:

Ke2e_AE_CSE_master=HMAC-Hash (Salt, Kpsa_AE_CSE)

T(0)=empty string (zero length)

Ke2e_AE_CSE_msg_auth=T(1)=HMAC-Hash (Ke2e_AE_CSE_master, T(0) |"E2E Message Authentication Key"|0x01)

Ke2e_AE_CSE_message_confidentialtiy=T(2)=HMAC-Hash (Ke2e_AE_CSE_master, T(1)|"E2E Message Confidentiality Key"|0x02)

Similarly data confidentiality and data integrity keys are generated by the Enrolment Target and Enrollee. This process is repeated by each Enrollee and associated Enrolment Target based on a unique Enrollee-EnrollmentTarget_Ke2e_master that is shared between the Enrollee and the Enrolment Target (e.g. AE and CSE specific end-to-end keys). In some cases, only a Ke2e_master is generated for an Enrollee that may be shared by multiple Enrolment Targets and provisioned by the MEF to the Enrolment Targets, which may then generate unique End-to-End keys for each of the end entities.

In certain cases, the Kpsa/Km may be used as the Ke2e_master, and the process described above is used to generate unique keys for each end-to-end security protection, namely, message authentication, message integrity, data integrity and data confidentiality.

In certain other cases, only a single key, Kpsa or the Km is used for message authentication, message, message confidentiality, data integrity, data confidentiality, key generation key, etc.

In certain other cases, a session key is generated from the Kpsa or Km, which is then used for generating unique keys for each of the end-to-end security protection mechanisms, namely, message authentication, message confidentiality, data integrity and data confidentiality.

In certain other cases, only a single session key that is generated from Kpsa or Kpm is used for providing end-to-end message authentication, confidentiality, data integrity and data confidentiality.

In certain other cases, the MEF may provision either Ke2e_master or a set or subset of the following keys to the Enrolment Target or MAF, namely, Ke2e_AE_CSE_msg_auth, Ke2e_AE_CSE_msg_conf, Ke2e_AE_CSE_data_auth, Ke2e_AE_CSE_data_conf as well as Ke2e_key_generation.

Figure 15A:
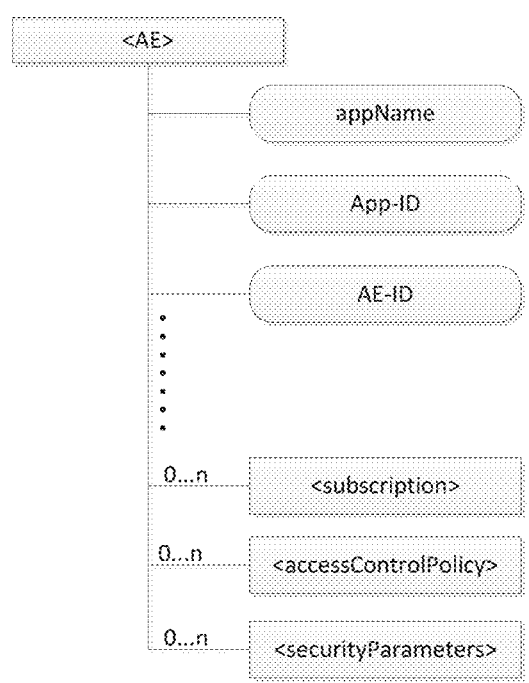
FIG. 15A-B are diagrams that illustrate a resource representation association with an AE and the <securityParameters> resource structure having attributes: hop-by-hop security credential as well as end-to-end credential.
Figure 15B:
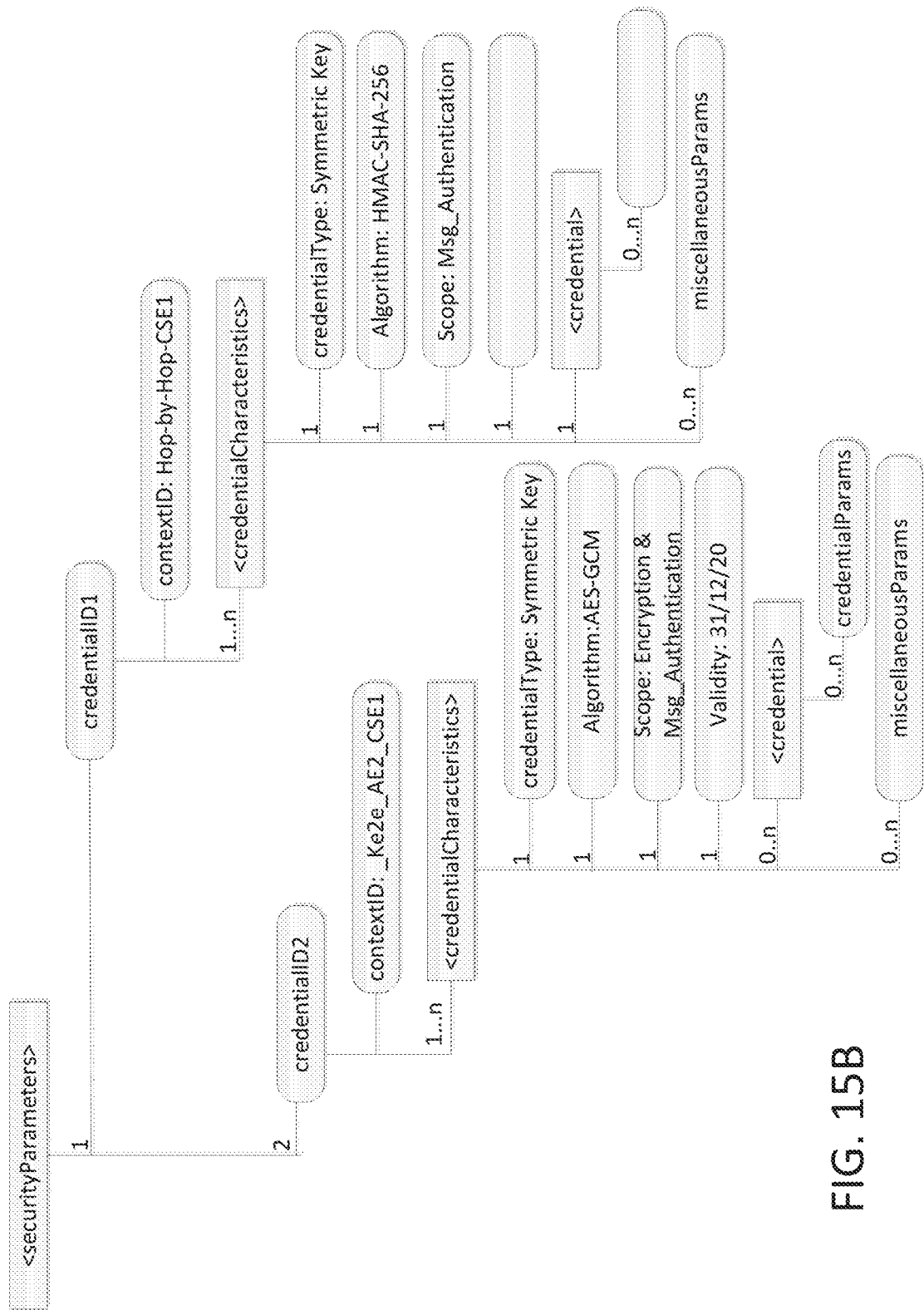
Figures 16A, 16B:
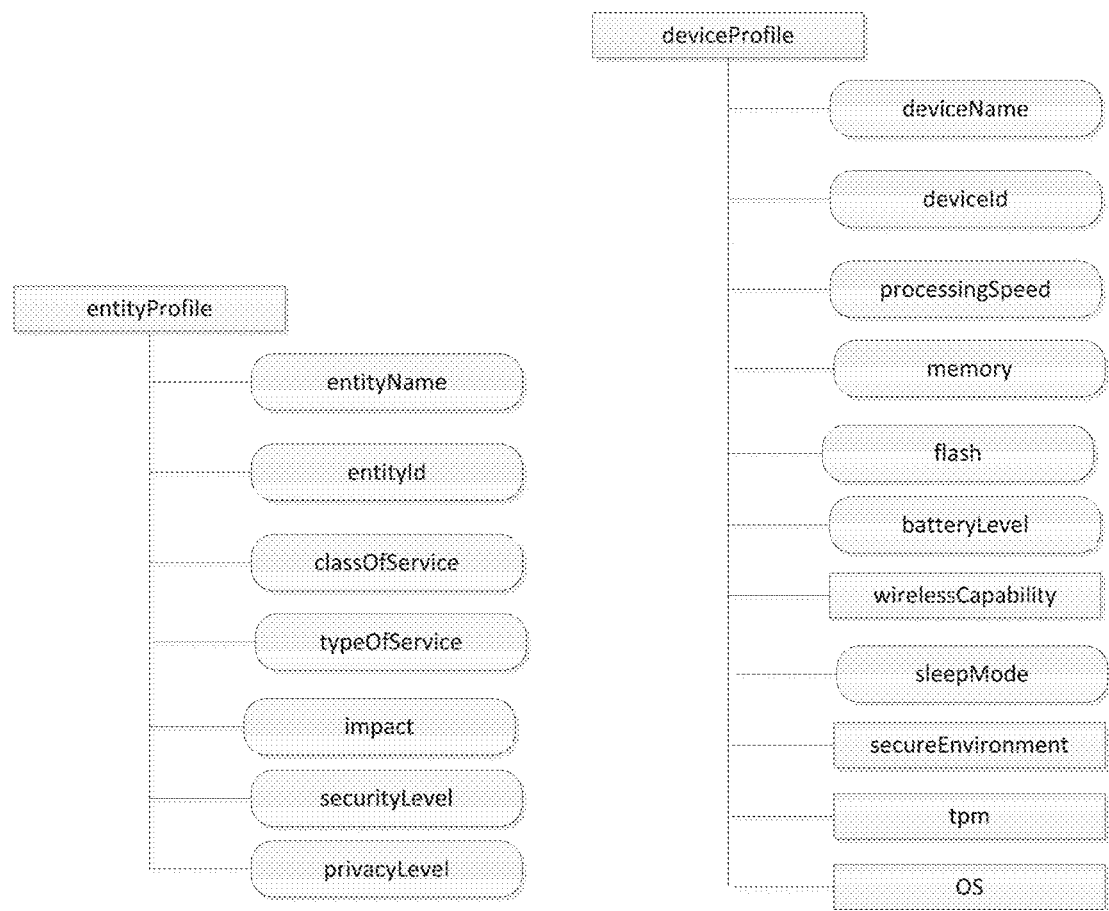
FIGS. 16A-C are diagrams that illustrate resource representations of Entity Profile, Device Profile and Security Profiles.
Figure 16C:
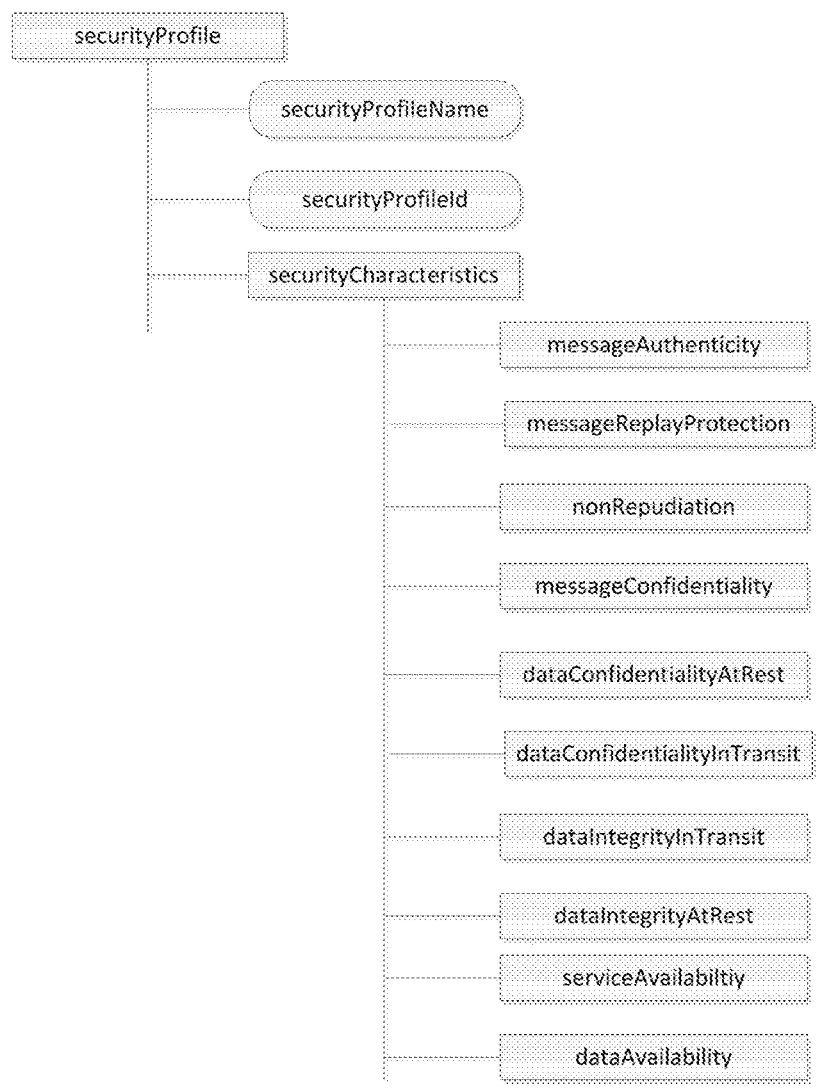

FIGS. 15 A-B provides a resource representation association with an AE and the <securityParameters> resource structure having attributes: hop-by-hop security credential as well as end-to-end credential respectively. FIGS. 16A-C depicts resource representations of Entity Profile, Device Profile and Security Profiles that were described earlier.

E2E Authentication Phase

During the E2E authentication phase, based on scope that was determined earlier during the Key Generation phase, the authentication may be performed at the Application, Service, Session or at other layers. Also, the authentication may be performed in Direct mode or using Delegated mode.

E2E Authentication at Service Layer using Direct Mode

Figure 7A:
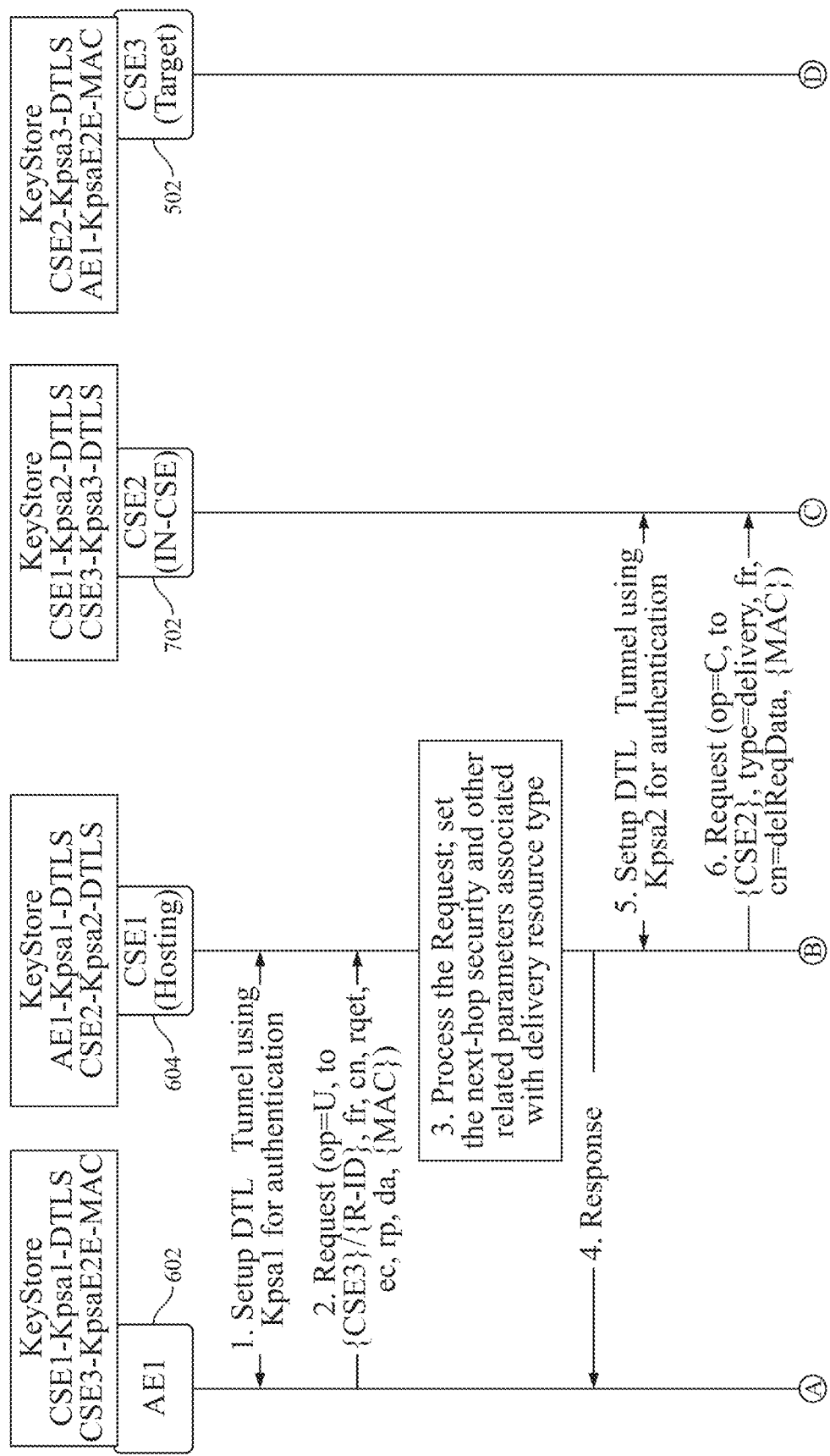
FIG. 7A-B illustrates an E2E Authentication wherein AE1 requests an Update operation to a remote resource hosted on CSE3
Figure 7B:
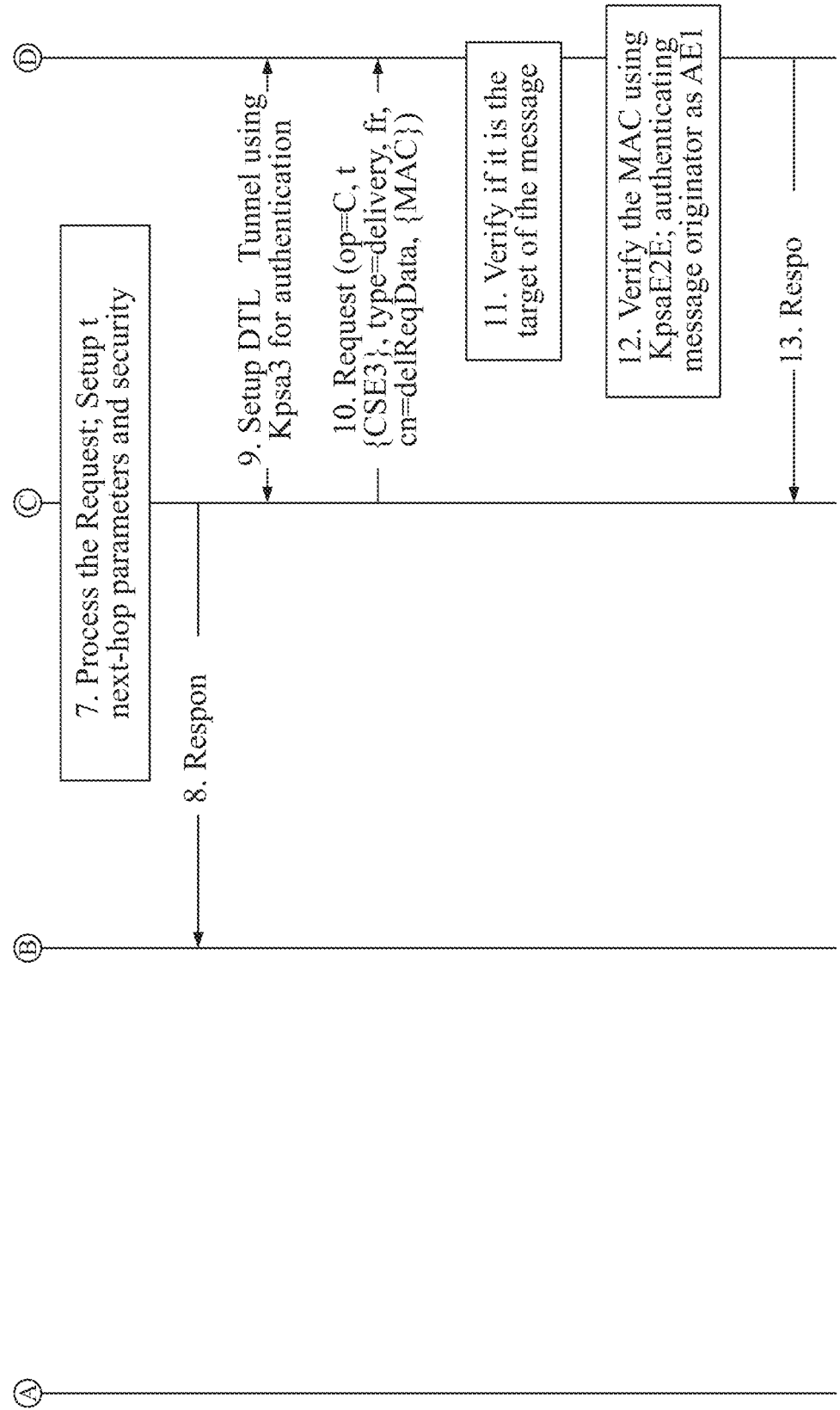

FIG. 7A-B illustrates an E2E Authentication wherein AE1 602 requests an Update operation to a remote resource hosted on CSE3 502. The figure illustrates Service Layer E2E authentication using Direct mode. The mechanism illustrated follows very closely to the oneM2M specifications. Messaging details:

In step 1 of FIG. 7A-B, AE1 602 sets up a DTLS connection with CSE1 604 using Kpsa1

In step 2 of FIG. 7A-B, AE1 602 sends the Request to perform UPDATE operation on the resource hosted on CSE3 502. AE1 602 creates a Message Authentication Code (MAC) using the previously obtained E2E authentication key (Ke2e_CSE3_AE1_msg_auth) during the Third-party credential requisition phase as described above. A MAC is created based on the scope that was provided which includes the algorithm to be used, the parameters to be used to provide for origin authentication, replay protection etc. The MAC is provided as part of the Request message and protected using the DTLS tunnel.

In step 3 of FIG. 7A-B, Process the request using the mechanisms specified by oneM2M specs In step 4 of FIG. 7A-B, once the request is processed a response is sent to the AE1

In step 5 of FIG. 7A-B, CSE1 604 creates DTLS connection with the next-hop CSE2 702 using Kpsa2

In step 6 of FIG. 7A-B, CSE1 604 creates a delivery resource request message and forwards it to the next hop CSE2 702, along with the MAC that was included by AE1 602.

In step 7 of FIG. 7A-B, Process the request at CSE2. CSE2 processes the delivery Req Data to fie the URI of the CSE3 and other relevant information In step 8 of FIG. 7A-B, Send a response to CSE1 604.

In step 9 of FIG. 7A-B, CSE2 702 sets up DTLS connection with CSE3 502 using Kpsa3.

In step 10 of FIG. 7A-B, CSE2 702 creates a delivery resource request message and forwards it to the next hop CSE3, along with the MAC that was included by AE1

In step 11 of FIG. 7A-B, CSE3 502 verifies the message origination

In step 12 of FIG. 7A-B, CSE3 502 verifies the MAC that was included in the message that was associated with AE1 602. If the CSE3 502 did not have the E2E credentials (KpsaE2E) the CSE3 502, may obtain the master keys from the TTP and then generate the E2E key based on AE1's identity. CSE3 502 also verifies that the message has not been replayed using the parameters (e.g. Nonce/Time stamp) and that AE1 602 has been verified as the originator of the original message and that the MAC was indeed computed and inserted by AE1.

In step 13 of FIG. 7A-B, Response to the Request is provided back to CSE2 702 by CSE3 502.

Alternatively, the messages of steps 4 and 8 may be sent out after the steps until 13 have been carried out. Once CSE2 702 receives the response from CSE3 502 (Message 13), the CSE 2 sends a response to CSE1 604 (Message of step 8) and then CSE 1 sends a response to Entity (Message of step 4).

It is understood that the entities performing the steps illustrated in FIG. 7A-B are logical entities that may be implemented in the form of software (i.e., computer-executable instructions) stored in a memory of, and executing on a processor of, a network node or computer system such as those illustrated in FIG. 21C or FIG. 21D. That is, the method(s) illustrated in FIG. 7A-B may be implemented in the form of software (i.e., computer-executable instructions) stored in a memory of a network node, such as the node or computer system illustrated in FIG. 21C or FIG. 21D, which computer executable instructions, when executed by a processor of the node, perform the steps illustrated in FIG. 7A-B. It is also understood that any transmitting and receiving steps illustrated in FIG. 7A-B may be performed by communication circuitry of the node under control of the processor of the node and the computer-executable instructions (e.g., software) that it executes.

E2E Authentication at the Service Layer Using Delegated Mode

Figure 8A:
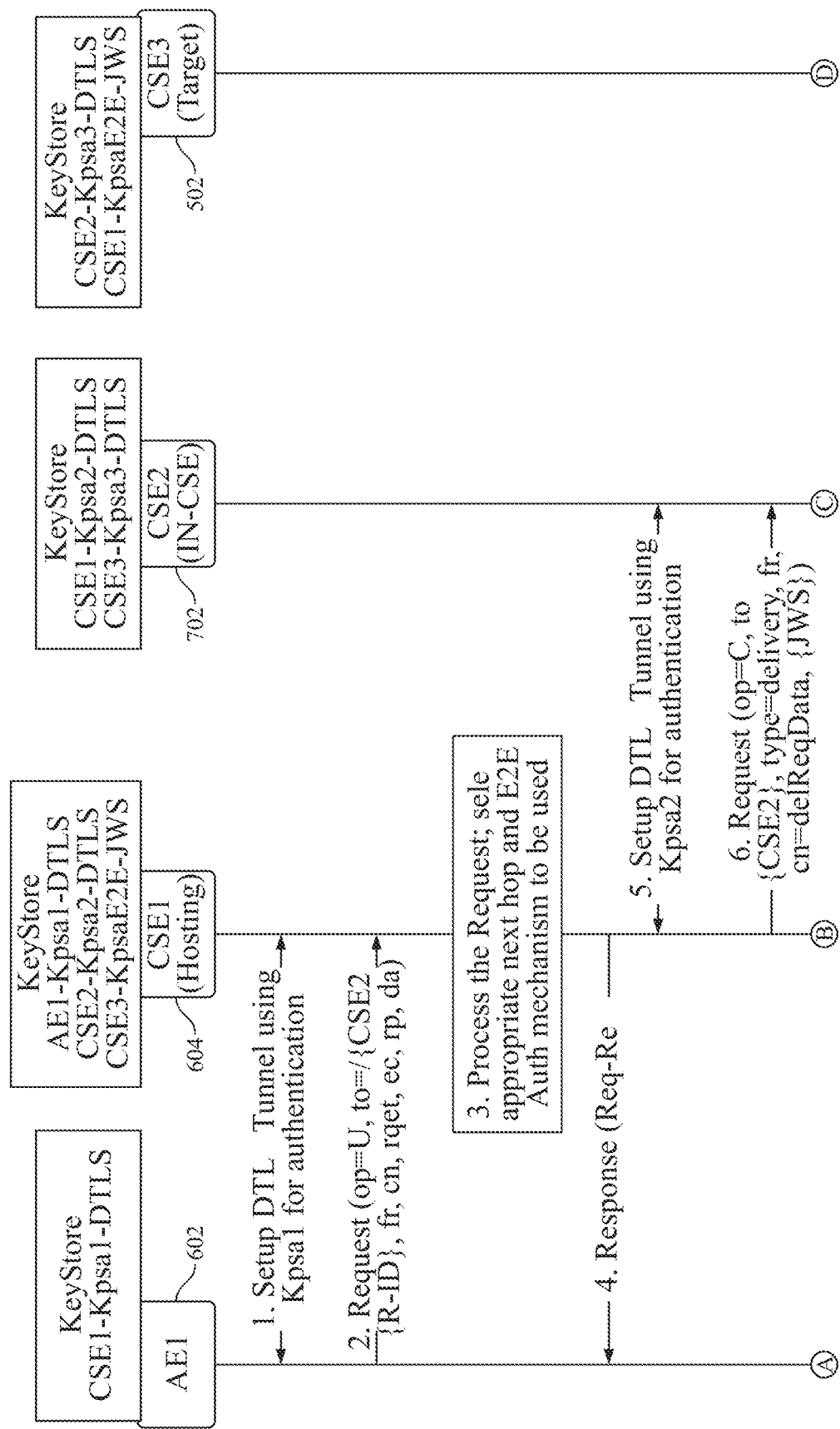
FIG. 8A-B is a diagram that illustrates an E2E authentication at the Service Layer using a delegate mode approach.
Figure 8B:
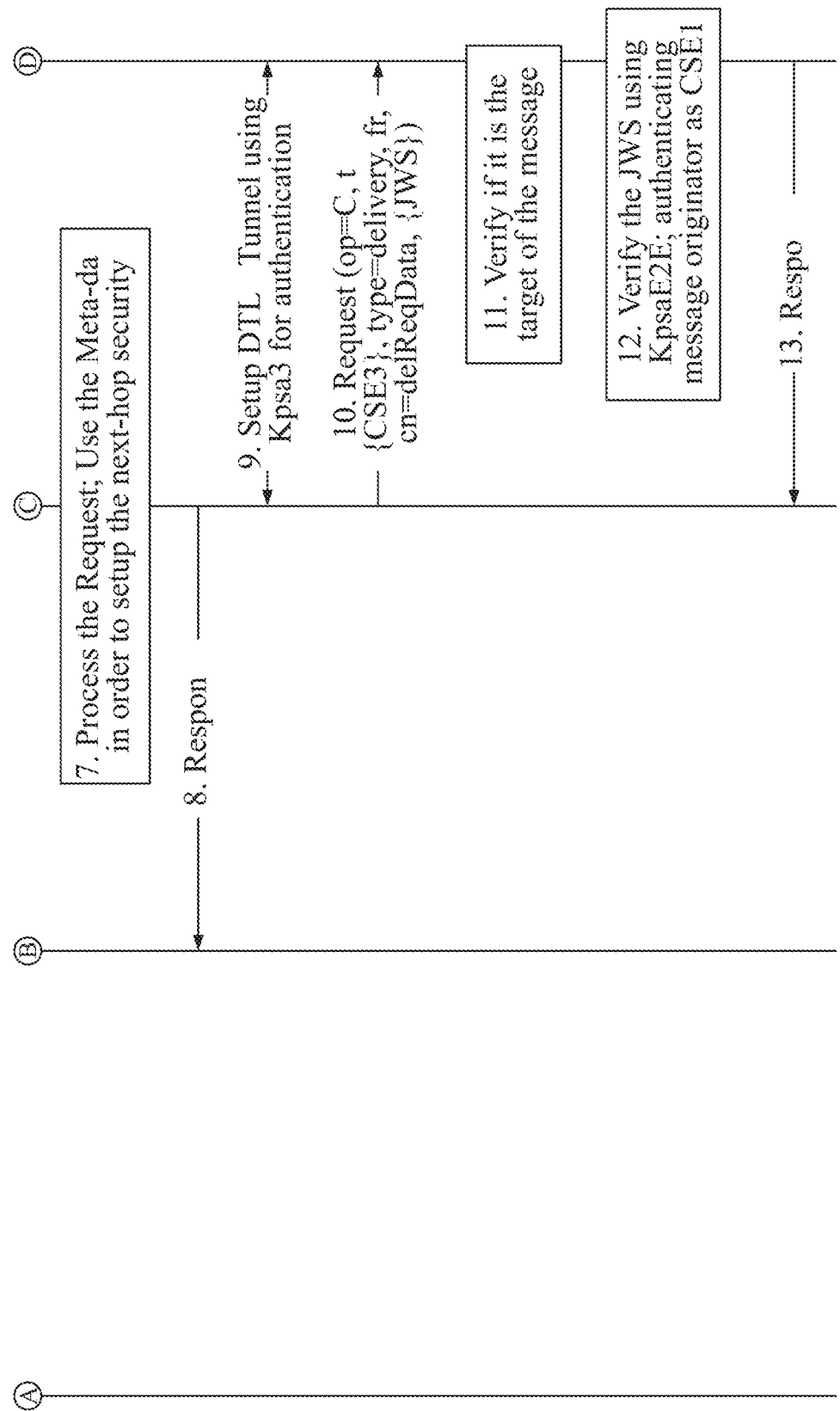

FIG. 8A-B illustrates an E2E authentication at the Service Layer using a delegate mode approach. The main difference between the direct mode as described with respect to FIG. 7A-B and the approach described here is that the CSE1 604 (Hosting CSE) performs the E2E authentication on behalf of the AE1 602. The CSE1 604 performs the Third-party credential requisition process described above, on-behalf of AE1 602. Also a slight variant embodiment is that the scope information suggests the use of JSON Web Signing (JWS)/JSON Web Token representation instead of a MAC. The parameters used may be similar to those used for MAC computation, the representation is based on JWT and agreed upon during Security provisioning process described above. Messaging details are very similar to those described with respect to FIG. 7A-B, except the following messages:

In step 1 of FIG. 8A-B, The Request message does not contain the MAC and therefore AE1 602 cannot be authenticated in E2E manner.

Step 3-5 of FIG. 8A-B are similar to previously described scenarios

In step 6 of FIG. 8A-B, CSE1 604 creates a JWS similar to a MAC in order that the end entity CSE3 502 is able to authenticate the CSE1 604. Here, CSE1 604 is delegated in performing authentication on-behalf of AE1 602. The JWS is incorporated within the Request message. The JWS may be computed using Ke2e_AE1_CSE1_msg-auth that was obtained from TTP Steps 7-9 of FIG. 8A-B are similar to previously described scenarios In step 10 of FIG. 8A-B, the Request message containing the JWS is forwarded in a hop-by-hop manner to the CSE3 502.

In step 11 of FIG. 8A-B, CSE3 502 verifies that it is the target of the message.

In step 12 of FIG. 8A-B, CSE3 502 verifies that the original Request was sent by the CSE1 604 on behalf of AE1 602. Verifies the originator was indeed CSE1 604 by verifying the JWS and that it was not replayed.

It is understood that the entities performing the steps illustrated in FIG. 8A-B are logical entities that may be implemented in the form of software (i.e., computer-executable instructions) stored in a memory of, and executing on a processor of, a network node or computer system such as those illustrated in FIG. 21C or FIG. 21D. That is, the method(s) illustrated in FIG. 8A-B may be implemented in the form of software (i.e., computer-executable instructions) stored in a memory of a network node, such as the node or computer system illustrated in FIG. 21C or FIG. 21D, which computer executable instructions, when executed by a processor of the node, perform the steps illustrated in FIG. 8A-B. It is also understood that any transmitting and receiving steps illustrated in FIG. 8A-B may be performed by communication circuitry of the node under control of the processor of the node and the computer-executable instructions (e.g., software) that it executes.

Figure 17:
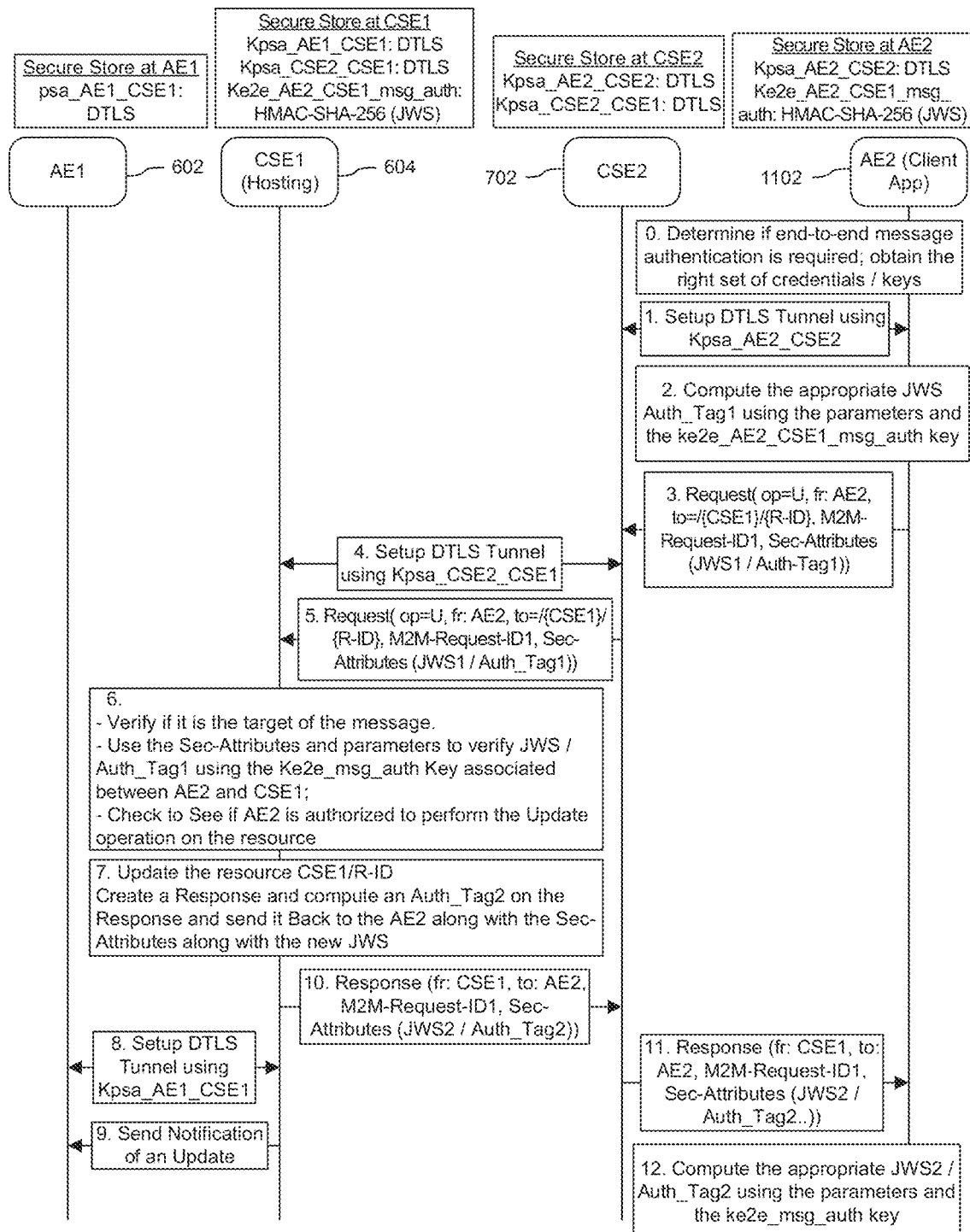
FIG. 17 is a diagram that illustrates end-to-end message authentication and integrity check by means of a symmetric key.

FIG. 17 describes an embodiment that illustrates end-to-end message authentication and integrity check by means of symmetric key mechanism between two entities AE2 and CSE1 604 that are multiple service-layer hops away from each other, traversing through trusted or less-trustworthy or even un-trustworthy intermediate hops. A client application (AE2) that would like to perform an update operation on another application entity (AE1 602)'s resource. Since the resource is hosted on a hosting CSE (CSE1 604), the AE2 which has been pre-provisioned with the location of the resource or uses a discovery service in order to discover the resource location (/CSE1/R-ID). CSE1 604 would like to ensure that only authorized entities are able to perform any of the Create, Retrieve, Update, Delete or Notify operations on the AE1 resource. In order for the CSE1 604 to be able to ensure that only authorized entities are able to perform CRUD operations, CSE1 604 may require that the source of the messages are authenticated and that the messages are integrity protected by verifying the possession of key by the originator of the message. In preparation of creating the message, AE2 has to obtain the appropriate message authentication key, Ke2e_AE2_CSE1_msg_auth either from a TTP or generate the keys from an end-to-end master key, Ke2e_AE2_CSE1_master that was provisioned to it or generated using a bootstrapping process using the above described "Third-party Credential Requisition process". In addition to key, the Context Info, Usage Info and Label that is required in order that the AE2 is able to generate the right authentication tag that can be used by CSE1 604 in order verify the authenticity and integrity of AE2's message is obtained, generated or provisioned to the AE2. AE2 selects the appropriate credentials from the key store for performing end-to-end message authentication.

At step 1 of FIG. 17, AE2 uses the Kpsa_AE2_CSE2 in order to setup a (D)TLS connection between itself and the CSE2 702. The connection establishment process follows the mechanisms described in the TS-0003 oneM2M specifications for Release 1.

At step 2 of FIG. 17, AE1 602 generates a oneM2M "Request" message that is used to perform an "Update" operation on a AE1's resource (identified as/CSE/R-ID) that is hosted on CSE1 604. The Request message is uniquely identified by an M2M-Request-ID1. AE2 generates an authentication tag (Auth_Tag) or Message Authentication Code (MAC) using the message header information, also referred to as the OriginData. Alternatively, the entire message is used as input in order to create the Auth_Tag. The following information may be used as part of the Auth_Tag generation:

Auth_Tag=HMAC-SHA-256 (Ke2e_AE2_CSE1_msg_auth, "Message Header"|Nonce-|Time)

Alternatively, Auth_Tag=HMAC-SHA-256 (Ke2e_AE2_CSE1_msg_auth, "Entire Message"|Nonce|Time)

Either Nonce, Time or both may be included in the generation of the Auth_Tag. In certain cases, both of them may be excluded since M2M-Request-ID which is considered to be unique for each session is included with each message. Using the entire message to be used for computing the Auth_Tag is preferred, alternatively, the message header may be used for generating the Auth_Tag. However, if certain components within the message may be changed by intermediate entities such as CSE2 702, then only those components of the message that can be used to vouch for the authenticity and the intention of the message may be used. The absolute essential components of the message that has to be integrity protected would be: the from field, "fr", the to field, "to", the operation field, "op", the resource id, "res-id", if different from the "to" field and the session identifier, "M2M-Request-ID". If there is "data" included in the message, then it may be integrity protected as well. As previously stated, the preferred approach is to integrity protect the entire message, however, in certain implementations, some of the components may be legitimately changed by intermediate entities for routing purposes, in such cases, it has to be ensured that only those components where the components are not changed by the intermediate entities but at the same time is able to provide the authenticity as well as integrity of AE2's request.

At step 3 of FIG. 17, AE2 creates a JSON-based representation, JSON Web Signature that may be modified for oneM2M messaging, for carrying the Auth_Tag along with security attributes that were used to create the Auth_Tag. The JWS would include the following security attributes: a "cred-id", it is the Credential-ID, that is used for identifying a credential or key, which in this case is the Ke2e_AE2_CSE1_msg_auth-ID, the algorithm, "alg" used for computing the Auth_Tag, "HMAC-SHA-256", the payload, "payload", which includes the message or message header along with the data and the signature, "sig", which is the Auth_Tag/MAC. Alternatively, a Concise Binary Object Representation (CBOR)-based representation instead of Base64 may be used by mechanism described in CBOR Object Signing and Encryption standards. A oneM2M message "Request"

At step 4 of FIG. 17, if an existing (D)TLS connection does not exist between CSE1 604 and CSE2 702, then a (D)TLS connection is established between CSE1 604 and CSE2 702 as per oneM2M specifications using Kpsa_CSE2_CSE1 as the symmetric key.

At step 5 of FIG. 17, the message created by AE2 is forwarded to CSE1 604. If the algorithm used for signing was a public key based mechanism then the CSE2 702 may be able to authenticate the message before forwarding it to CSE1 604, but here, where symmetric keys are used, the authentication of the message is implied based on trust that exists between AE2 and CSE2 702 and based on the security association that was established based on (D)TLS connection, the message is expected to arrive from a trustworthy AE2. CSE2 702 forwards the message to CSE1 604 without modifying the main message header. In cases, the message header is changed by the CSE2 702, then the CSE2 702 makes a copy of the message header and is included as part of the data along with the Sec-Attributes. In case the AE2 had used the whole message in order to create the Sec-Attributes (JWS), then the CSE2 702 copies the entire message along with the header and the Sec-Attributes (JWS) into the data payload portion before forwarding it to CSE1 604. This message is sent by the CSE2 702 to CSE1 604 over the secure (D)TLS connection that was setup in step 4.

At step 6 of FIG. 17, the CSE1 604 verifies if it were the target of the message. Using the Sec-Attributes (JWS), uses the Credential-ID (cred-id) in order to identify the right credential and fetch it from a secure keystore (e.g. secure element such as SIM card), determine the appropriate context info and usage parameters. Verifies if the message has the right set of characteristics based on the context info, which determines the type of security (signing), the entities involved etc and the usage (algorithms, availability of nonce etc.) and then uses the Ke2e_AE2_CSE1_msg_auth key along with the message, which may be the entire message that was originally sent by AE2 1102, or the message header or meta-data of the message and uses a nonce that may be present along with context info and provides the parameters as input into the "alg" identified within the JWS, which happens to be HMAC-SHA-256 in this case and generates a Generated_Auth_Tag. The CSE1 604 verifies if the Generated_Auth_Tag is the same as the Auth_Tag contained within the JWS and if so, the AE2's message has been authenticated. The CSE1 604 then checks to see if AE2 1102 has been authorized to perform an "Update" operation on AE1 resource.

At step 7 of FIG. 17, if AE2 1102 is authorized to perform the "Update" operation then the CSE1 604 updates the AE1 resource identified by R-ID. The CSE1 604 creates a response message and uses the process that is similar to the procedure used by AE 2 in step 2 of FIG. 17 in order to generate a different Auth_Tag2. It is recommended to use a new Nonce each time and include it as part of the JWS and not re-use an existing Nonce. All the Sec-Attributes (e.g. Nonce, Auth-Tag2, Credential-ID, message or message header or meta-data of the message are included in order to create a JWS2.

At step 8 of FIG. 17, If an existing (D)TLS connection does not exist between the AE1 602 and CSE1 604, then a new one is created by using the shared symmetric key Kpsa_AE1_CSE1 based on the oneM2M technical specifications TS-0003 Release 1.

At step 9 of FIG. 17, the CSE1 604 sends a "Notify" message to AE1 602 indicating of an "Update" to AE1's resource "R-ID". This message is sent over the secure (D)TLS connection that was setup in step 8 of FIG. 17.

At step 10 of FIG. 17, after creating the response message that was created as described in step 7 of FIG. 17, the CSE1 604 sends the message CSE2 702 over the secure (D)TLS connection that was established in step 4. If such a connection does not exist then a new (D)TLS connection may have to be created, similar to the one created in step 4 of FIG. 17. Message 10 may be sent in parallel to step 8 of FIG. 17, however in certain critical cases, step 8 is performed earlier than step 10 of FIG. 17.

At step 11 of FIG. 17, the CSE2 702 may verify the message received from CSE1 604 for authenticity/integrity if public key mechanisms were used for generating the JWS, by validating the digital signature within the JWS. Since symmetric keying has been used, CSE2 702 uses implied trust because the message was received over a secure (D)TLS connection and forwards the message to the AE2 1102 over a secure (D)TLS connection that was setup in step 1 of FIG. 17. As described above if a valid (D)TLS connection does not exist then a new (D)TLS connection has to be established between the CSE2 702 and AE2 1102 using the Kpsa_AE2_CSE2 symmetric key and using mechanisms described in oneM2M Technical Specification TS-0003 Release 1.

At step 12 of FIG. 17, AE2 1102 verifies the Auth_Tag2 within the JWS and authenticates the message using similar mechanisms as described in step 6 of FIG. 17. The security attributes used would be different than those in step 6 however the process would be the same.

It is understood that the entities performing the steps illustrated in FIG. 17 are logical entities that may be implemented in the form of software (i.e., computer-executable instructions) stored in a memory of, and executing on a processor of, a network node or computer system such as those illustrated in FIG. 21C or FIG. 21D. That is, the method(s) illustrated in FIG. 17 may be implemented in the form of software (i.e., computer-executable instructions) stored in a memory of a network node, such as the node or computer system illustrated in FIG. 21C or FIG. 21D, which computer executable instructions, when executed by a processor of the node, perform the steps illustrated in FIG. 17. It is also understood that any transmitting and receiving steps illustrated in FIG. 17 may be performed by communication circuitry of the node under control of the processor of the node and the computer-executable instructions (e.g., software) that it executes.

Figure 18:
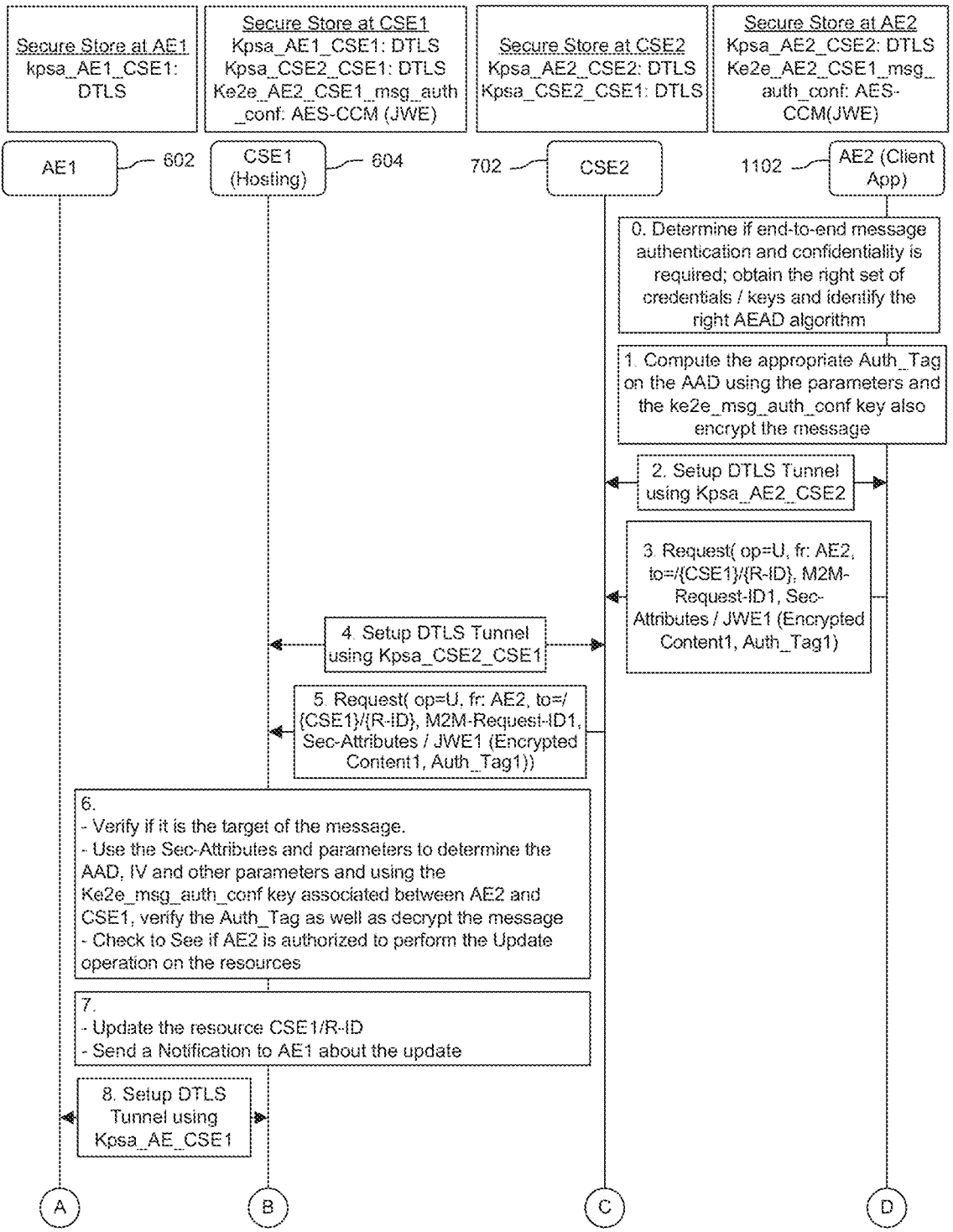
FIG. 18 is a diagram that illustrates both end-to-end message authentication and integrity check and also message confidentiality by means of symmetric key mechanism between two entities AE2 and CSE1 that are multiple service-layer hops away from each other.
Figure 18:
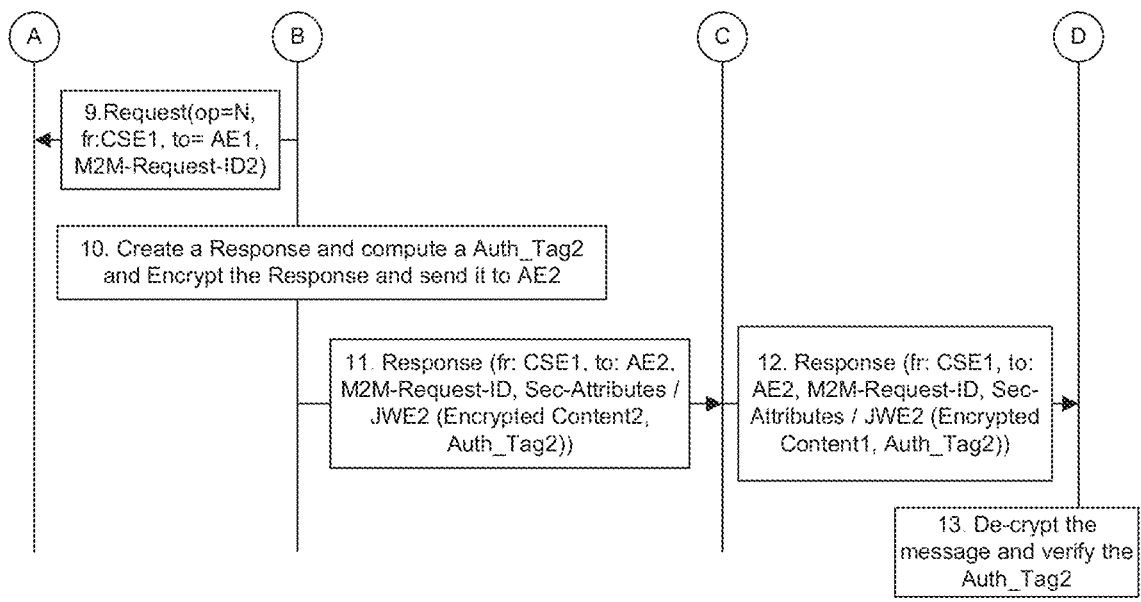

FIG. 18 describes an embodiment that illustrates both end-to-end message authentication and integrity check and also message confidentiality by means of symmetric key mechanism between two entities AE2 1102 and CSE1 604 that are multiple service-layer hops away from each other, traversing through trusted or less-trustworthy or even untrustworthy intermediate hops. A client application (AE2 1102) that would like to perform an update operation on another application entity (AE1 602)'s resource. Since the resource is hosted on a hosting CSE (CSE1 604), the AE2 1102 which has been pre-provisioned with the location of the resource or uses a discovery service in order to discover the resource location (/CSE1/R-ID). CSE1 604 would like to ensure that only authorized entities are able to perform any of the Create, Retrieve, Update, Delete or Notify operations on the AE1 resource. In order for the CSE1 604 to be able to ensure that only authorized entities are able to perform CRUD operations, CSE1 604 may require that the source of the messages are authenticated and that the messages are integrity protected by verifying the possession of key by the originator of the message. In addition, the data and messaging are required to be confidentiality protected. In preparation of creating the message, AE2 1102 has to obtain the appropriate message authentication and the message confidentiality key, Ke2e_AE2_CSE1_msg_auth and Ke2e_AE2_CSE1_msg_conf respectively either from a TTP or generate the keys from an end-to-end master key, Ke2e_AE2_CSE1_master that was provisioned to it or generated using a bootstrapping process using the above described "Third-party Credential Requisition process". Alternatively, a single Ke2e_AE2_CSE1_msg_auth_conf may be used for both message authentication as well as for message confidentiality and using an Authenticated Encryption and Associated Data (AEAD)-based cryptography mechanism (e.g. AES-CCM, AES-GCM). In addition to the key, the Context Info, Usage Info and Label that is required in order that the AE2 1102 is able to generate the right authentication tag that can be used by CSE1 604 in order verify the authenticity and integrity of AE2's message is obtained, generated or provisioned to the AE2 1102. And for confidentiality to determine the appropriate algorithm, the mode to be operating on as well as the requirement of an Initialization Vector (IV) etc. AE2 1102 selects the appropriate credentials from the key store for performing end-to-end message authentication and message confidentiality, the Ke2e_AE2_CSE1_msg_auth_conf key is therefore selected.

At step 1 of FIG. 18 AE2 1102 uses the Kpsa_AE2_CSE2 in order to setup a (D)TLS connection between itself and the CSE2 702. The connection establishment process follows the mechanisms described in the TS-0003 oneM2M specifications for Release 1.

At step 2 of FIG. 18, AE1 602 generates a oneM2M "Request" message that is used to perform an "Update" operation on a AE1's resource (identified as/CSE/R-ID) that is hosted on CSE1 604. The Request message is uniquely identified by an M2M-Request-ID1. AE2 1102 generates an authentication tag (Auth_Tag) or Message Authentication Code (MAC) using the message header information, also referred to as the OriginData. Alternatively, the entire message is used as input in order to create the Auth_Tag. As previously stated, the preferred approach is to integrity protect the entire message, however, in certain implementations, some of the components may be legitimately changed by intermediate entities for routing purposes, in such cases, it has to be ensured that only those components where the components are not changed by the intermediate entities but at the same time is able to provide the authenticity as well as integrity of AE2's request. The message or the message header or the meta that has to be used for oneM2M layer routing is not encrypted and is classified as the Associate Data (AAD). The AAD may be integrity protected. The message header or the meta-data are good candidates for being assigned the "AAD" value.

Auth_Tag=HMAC-SHA-256
(Ke2e_AE2_CSE1_msg_auth_conf, AAD|Nonce|Time)

The AAD may be assigned the entire Message Header or alternatively, the AAD may be assigned as subset of the Message Header or the meta-data of the message.

Either Nonce, Time or both may be included in the generation of the Auth_Tag. In certain cases, both of them may be excluded since M2M-Request-ID which is considered to be unique for each session is included with each message. Using the entire message to be used for computing the Auth_Tag is preferred, alternatively, the message header may be used for generating the Auth_Tag. However, if certain components within the message may be changed by intermediate entities such as CSE2 702, then only those components of the message that can be used to vouch for the authenticity and the intention of the message may be used. The absolute essential components of the message that has to be integrity protected would be: the from field, "fr", the to field, "to", the operation field, "op", the resource id, "res-id", if different from the "to" field and the session identifier, "M2M-Request-ID". The rest of the message including the data payload may be encrypted as per the ContextInfo and Usage parameters (e.g. encryption algorithm, mode of encryption and IV.).

At step 3, AE2 1102 creates a JSON-based representation, JSON Web Encryption representation (JWE) that may be modified and tailored for oneM2M messaging, for carrying the Auth_Tag along with security attributes that were used to create the Auth_Tag as well as the encrypted message and data. The JWE would include the following security attributes: "cred-id", it is the Credential-ID, that is used for identifying a credential or key, which in this case is the Ke2e_AE2_CSE1_msg_auth-ID. Alternatively, if a separate message authentication key as well as separate message confidentiality keys are used then both the associated Credential-IDs should be sent. The algorithm, "alg" used, "AES-CCM" (as an example), the payload, "payload", which includes the message or message header along with the data and the signature, "sig", which is the Auth_Tag/MAC. In addition, the "iv", the initialization vector used and "ciphertext", the generated cipher text based on the encryption process are also included as part of the JWE. Alternatively, a Concise Binary Object Representation (CBOR)-based representation instead of Base64 may be used by mechanism described in CBOR Object Signing and Encryption standards. A oneM2M message "Request" containing the message header as well as the Sec-Attributes represented as JWE is generated.

At step 4 of FIG. 18, if an existing (D)TLS connection does not exist between CSE1 604 and CSE2 702, then a (D)TLS connection is established between CSE1 604 and CSE2 702 as per oneM2M specifications using Kpsa_CSE2_CSE1 as the symmetric key.

At step 5 of FIG. 18, the message created by AE2 1102 is forwarded to CSE1 604. If the algorithm used for signing was a public key based mechanism then the CSE2 702 may be able to authenticate the message before forwarding it to CSE1 604, but here, since symmetric keys are used, the authentication of the message is implied based on trust that exists between AE2 1102 and CSE2 702 and based on the security association that was established based on (D)TLS connection, the message is expected to arrive from a trustworthy AE2 1102. CSE2 702 forwards the message to CSE1 604 without modifying the main message header. In cases, the message header is changed by the CSE2 702, then the CSE2 702 makes a copy of the message header and is included as part of the data along with the Sec-Attributes. In case the AE2 1102 had used the whole message in order to create the Sec-Attributes (JWE), then the CSE2 702 copies the entire message along with the header and the Sec-Attributes (JWE) into the data payload portion before forwarding it to CSE1 604, in order that all the necessary message header information is preserved so that the Auth_Tag1 can be properly constructed by a recipient (e.g. CSE1). This message is sent by the CSE2 702 to CSE1 over the secure (D)TLS connection that was setup in step 4 of FIG. 18.

At step 6 of FIG. 18, the CSE1 604 verifies if it were the target of the message. Using the Sec-Attributes (JWE), the CSE1 604 uses the Credential-ID(s) in order to identify the right credential(s) and fetch them from a secure keystore (e.g. secure element such as SIM card), determine the appropriate context info and usage parameters. In case, where separate keys are used for both message authentication as well as message confidentiality both the keys will have to be fetched from the keystore. Using the JWE info "alg", as well the "cred-id", CSE1 604 is able to determine if an AEAD is used for security protection, and if so, only a single associated credential identified by the cred-id may be retrieved. Verifies if the message has the right set of characteristics based on the context info, which determines the type of security (signing, encryption), the entities involved etc and the usage (algorithms, availability of nonce etc.), identifies the AAD, IV, nonces and other parameters and uses the Ke2e_AE2_CSE1_msg_auth_conf key in order to decrypt the "ciphertext" and extract the "plaintext", which may contain the message as well as the data payload. CSE1 604 uses the message or the message header or the meta-data of the message or uses the information that has been identified as the AAD in order to compute the Generated_Auth_Tag. In some cases the entire message that was originally sent by AE2 1102, or the message header or meta-data of the message and uses the nonce that may be present along with context info that provides the parameters as input into the "alg" identified within the JWE, which happens to be AES-CCM in this case and generates a Generated_Auth_Tag. The CSE1 604 verifies if the Generated_Auth_Tag is the same as the Auth_Tag contained within the JWE and if so, the AE2's message has been authenticated. The CSE1 604 then checks to see if AE2 1102 has been authorized to perform an "Update" operation on AE1 602 resource.

At step 7 of FIG. 18, if AE2 1102 is authorized to perform the "Update" operation then the CSE1 604 updates the AE1 resource identified by R-ID.

At step 8v, If an existing (D)TLS connection does not exist between the AE1 602 and CSE1 604, then a new one is created by using the shared symmetric key Kpsa_AE1_CSE1 based on the oneM2M technical specifications TS-0003 Release 1.

At step 9 of FIG. 18, the CSE1 604 sends a "Notify" message to AE1 602 indicating of an "Update" to AE1's resource "R-ID". This message is sent over the secure (D)TLS connection that was setup in step 8.

At step 10 of FIG. 18, the CSE1 604 creates a response message and uses the process that is similar to the procedure used by AE2 1102 in step 2 of FIG. 18 in order to generate a different Auth_Tag2, encrypted message and a JWE. It is recommended to use a new Nonce and IV each time and include it as part of the JWE and not re-use an existing Nonce. All the Sec-Attributes (e.g. Nonce, Auth-Tag2, Credential-ID, message or message header or meta-data of the message identified as the AAD, the IV and the ciphertext) may be included in order to create a JWE2.

At step 11 of FIG. 18, the CSE1 604 sends the message CSE2 702 over the secure (D)TLS connection that was established in step 4. If such a connection does not exist then a new (D)TLS connection may have to be created, similar to the one created in step 4 of FIG. 18. Message 10 may be sent in parallel to step 8, however in certain critical cases, step 8 of FIG. 18 is performed earlier than step 10 of FIG. 18.

At step 12 of FIG. 18, the CSE2 702 may verify the message received from CSE1 604 for authenticity/integrity if public key mechanisms were used for generating the JWE, by validating the digital signature within the JWS. Since symmetric keying has been used here, CSE2 702 uses implied trust because the message was received over a secure (D)TLS connection and forwards the message to the AE2 1102 over a secure (D)TLS connection that was setup in step 1. As described above if a valid (D)TLS connection does not exist then a new (D)TLS connection has to be established between the CSE2 702 and AE2 1102 using the Kpsa_AE2_CSE2 702 symmetric key and using mechanisms described in oneM2M Technical Specification TS-0003 Release 1.

At step 13 of FIG. 18, AE2 1102 verifies the Auth_Tag2 within the JWE after decrypting the message using similar mechanisms as described in step 6 of FIG. 18. The security attributes used would be different than those in step 6 of FIG. 18 however the process would be the same.

Figure 19:
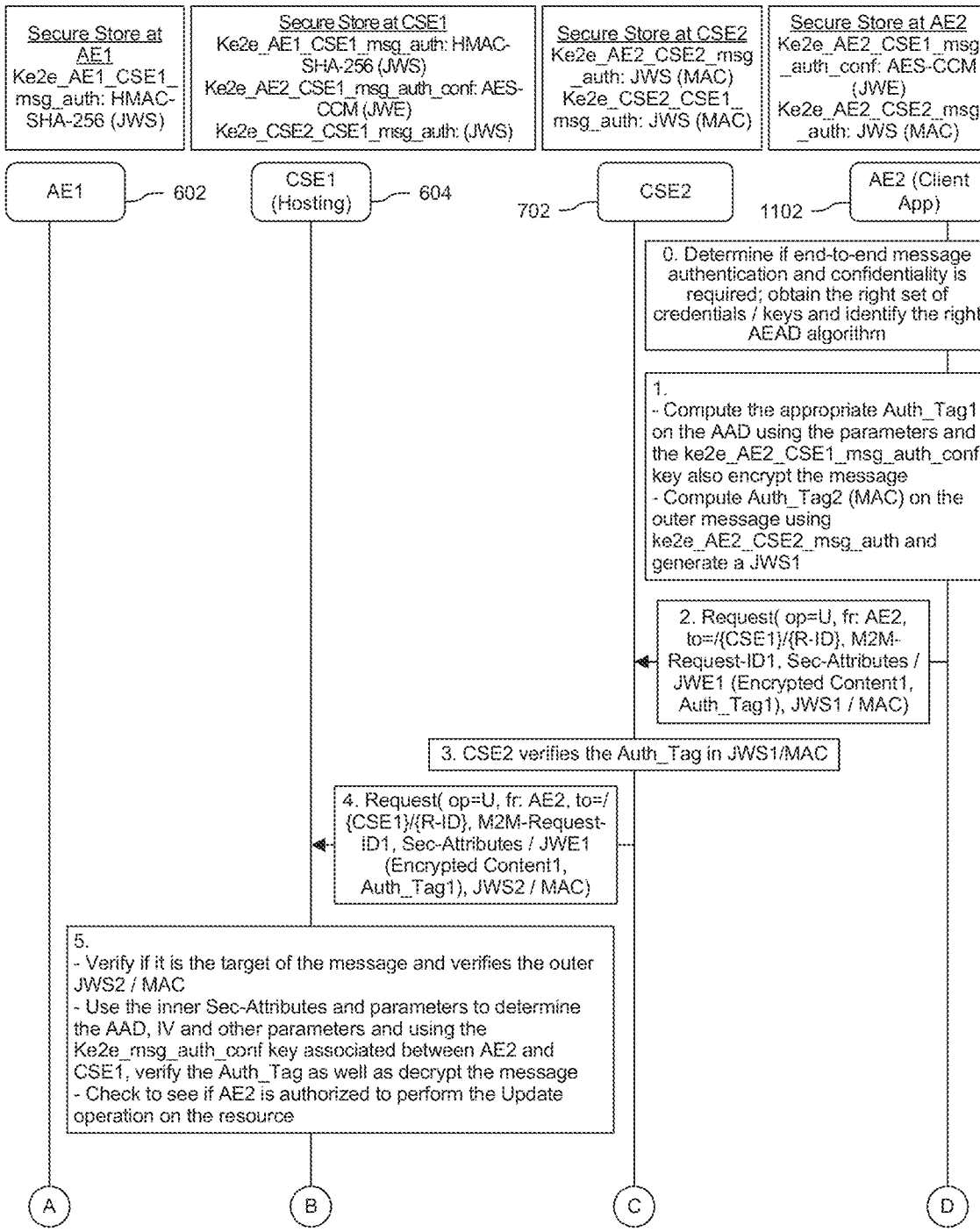
FIG. 19 is a diagram that illustrates illustrates both end-to-end message authentication and integrity check and also message confidentiality by means of symmetric key mechanism between two entities AE2 and CSE1 that are multiple service-layer hops away from each other, traversing through trusted or less-trustworthy or even un-trustworthy intermediate hops.
Figure 19:
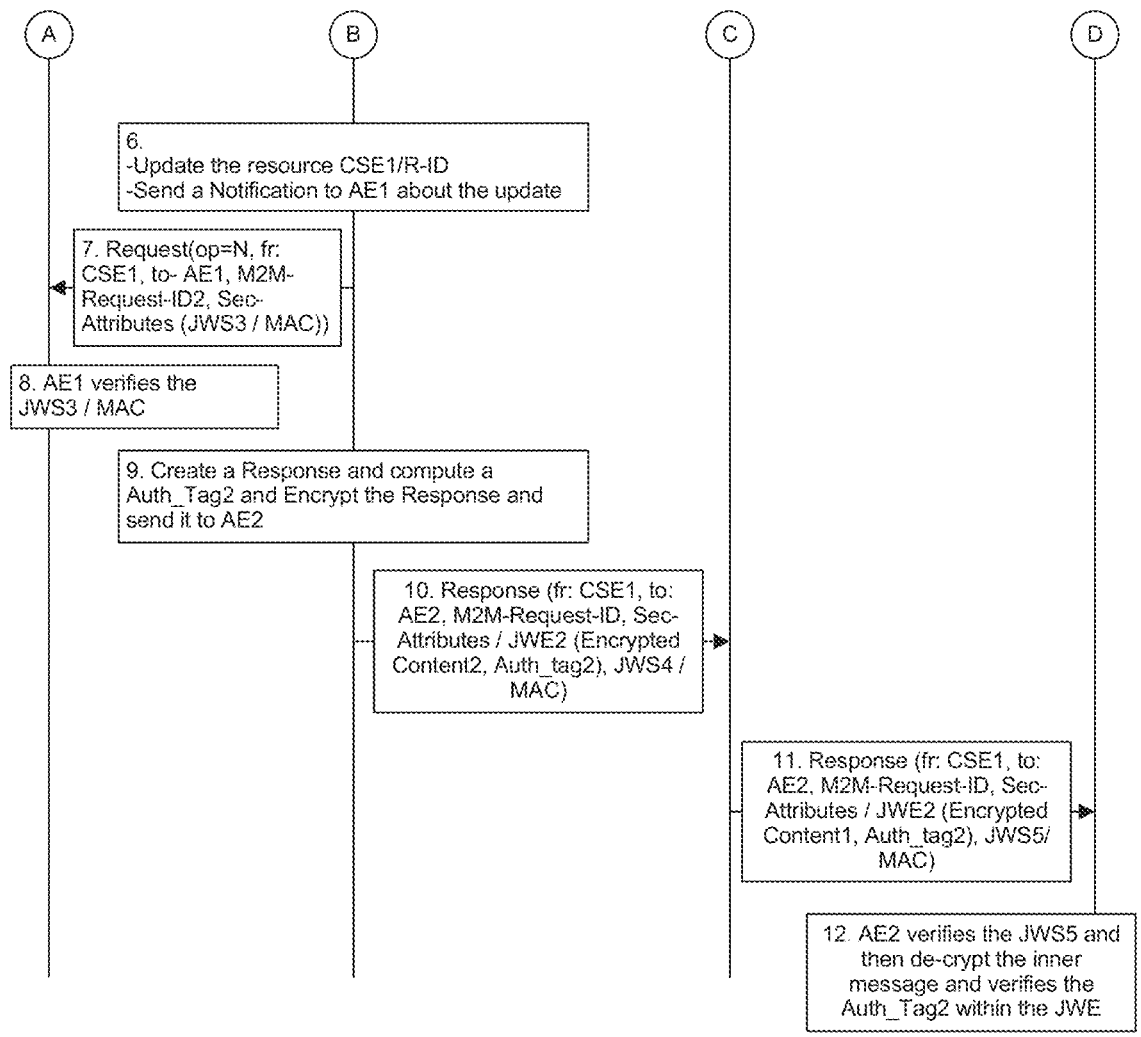

FIG. 19 describes an embodiment that illustrates both end-to-end message authentication and integrity check and also message confidentiality by means of symmetric key mechanism between two entities AE2 1102 and CSE1 604 that are multiple service-layer hops away from each other, traversing through trusted or less-trustworthy or even untrustworthy intermediate hops. A client application (AE2 1102) that would like to perform an update operation on another application entity (AE1 602)'s resource. Since the resource is hosted on a hosting CSE (CSE1 604), the AE2 1102 which has been pre-provisioned with the location of the resource or uses a discovery service in order to discover the resource location (/CSE1/R-ID). CSE1 604 would like to ensure that only authorized entities are able to perform any of the Create, Retrieve, Update, Delete or Notify operations on the AE1 602 resource. In order for the CSE1 604 to be able to ensure that only authorized entities are able to perform CRUD operations, CSE1 604 may require that the source of the messages are authenticated and that the messages are integrity protected by verifying the possession of key by the originator of the message. In addition, the data and messaging are required to be confidentiality protected. In preparation of creating the message, AE2 1102 has to obtain the appropriate message authentication and the message confidentiality key, Ke2e_AE2_CSE1_msg_auth and Ke2e_AE2_CSE1_msg_conf respectively either from a TTP or generate the keys from an end-to-end master key, Ke2e_AE2_CSE1_master that was provisioned to it or generated using a bootstrapping process using the above described "Third-party Credential Requisition process". Alternatively, a single Ke2e_AE2_CSE1_msg_auth_conf may be used for both message authentication as well as for message confidentiality and using an Authenticated Encryption and Associated Data (AEAD)-based cryptography mechanism (e.g. AES-CCM, AES-GCM). In addition to the key, the Context Info, Usage Info and Label that is required in order that the AE2 1102 is able to generate the right authentication tag that can be used by CSE1 604 in order verify the authenticity and integrity of AE2's message is obtained, generated or provisioned to the AE2 1102. And for confidentiality to determine the appropriate algorithm, the mode to be operating on as well as the requirement of an Initialization Vector (IV) etc. AE2 1102 selects the appropriate credentials from the key store for performing end-to-end message authentication and message confidentiality, the Ke2e_AE2_CSE1_msg_auth_conf key is therefore selected.

Unlike the previous scenario there does not exist a key for performing (D)TLS-based secure connection establishment between AE2 1102 and CSE2 702, instead the credential which is available is used for providing message authentication between AE2 1102 and CSE2 702 at the service layer using object-based security model. The Ke2e_AE2_CSE2_msg_auth may either be referred to as an end-to-end key or hop-by-hop credential, either way it does not matter, the usage and context of the credential is important. The usage and context info provides guidance on how the credential is to be used. The usage and context info may be obtained or provisioned during the third-party credential requisition process, from a TTP. The TTP may obtain or infer the appropriate usage and context info and the associated security requirements and features based on the SP, DP and/or EP that was in turn obtained from the service provider or the entity during the entity registration process. A mechanism is to obtain the SP, DP and/or EP from IN-CSE 2002 by using the reference links contained within an M2M-Subscription-Profile.

It is understood that the entities performing the steps illustrated in FIG. 18 are logical entities that may be implemented in the form of software (i.e., computer-executable instructions) stored in a memory of, and executing on a processor of, a network node or computer system such as those illustrated in FIG. 21C or FIG. 21D. That is, the method(s) illustrated in FIG. 18 may be implemented in the form of software (i.e., computer-executable instructions) stored in a memory of a network node, such as the node or computer system illustrated in FIG. 21C or FIG. 21D, which computer executable instructions, when executed by a processor of the node, perform the steps illustrated in FIG. 18. It is also understood that any transmitting and receiving steps illustrated in FIG. 18 may be performed by communication circuitry of the node under control of the processor of the node and the computer-executable instructions (e.g., software) that it executes.

At step 1 of FIG. 19, AE2 1102 does not use the hop-by-hop authentication and secure communications establishment mechanisms. AE1 602 generates a oneM2M "Request" message that is used to perform an "Update" operation on a AE1's resource (identified as/CSE/R-ID) that is hosted on CSE1 604. The Request message is uniquely identified by an M2M-Request-ID1. AE2 1102 generates an authentication tag (Auth_Tag) or Message Authentication Code (MAC) using the message header information, also referred to as the OriginData. Alternatively, the entire message is used as input in order to create the Auth_Tag. As previously stated, the preferred approach is to integrity protect the entire message, however, in certain implementations, some of the components may be legitimately changed by intermediate entities for routing purposes, in such cases, it has to be ensured that only those components where the components are not changed by the intermediate entities but at the same time is able to provide the authenticity as well as integrity of AE2's request. The message or the message header or the meta-data that has to be used for oneM2M layer routing is not encrypted and is classified as the Associate Data (AAD). The AAD may be integrity protected. The message header or the meta-data are good candidates for being assigned the "AAD" value.

Auth_Tag=HMAC-SHA-256 (Ke2e_AE2_CSE1_msg_auth_conf, AAD|Nonce|Time)

The AAD may be assigned the entire Message Header or alternatively, the AAD may be assigned as subset of the Message Header or the meta-data of the message.

Either Nonce, Time or both may be included in the generation of the Auth_Tag. In certain cases, both of them may be excluded since M2M-Request-ID which is considered to be unique for each session is included with each message. Using the entire message to be used for computing the Auth_Tag is preferred, alternatively, the message header may be used for generating the Auth_Tag. However, if certain components within the message may be changed by intermediate entities such as CSE2 702, then only those components of the message that can be used to vouch for the authenticity and the intention of the message may be used. The absolute essential components of the message that has to be integrity protected would be: the from field, "fr", the to field, "to", the operation field, "op", the resource id, "res-id", if different from the "to" field and the session identifier, "M2M-Request-ID". The rest of the message including the data payload may be encrypted as per the ContextInfo and Usage parameters (e.g. encryption algorithm, mode of encryption and IV.).

At step 2 of FIG. 19, AE2 1102 creates a JSON-based representation, JSON Web Encryption representation (JWE) that may be modified and tailored for oneM2M messaging, for carrying the Auth_Tag along with security attributes that were used to create the Auth_Tag as well as the encrypted message and data. The JWE would include the following security attributes: "cred-id", it is the Credential-ID, that is used for identifying a credential or key, which in this case is the Ke2e_AE2_CSE1_msg_auth-ID. Alternatively, if a separate message authentication key as well as separate message confidentiality keys are used then both the associated Credential-IDs should be sent. The algorithm, "alg" used, "AES-CCM" (as an example), the payload, "payload", which includes the message or message header along with the data and the signature, "sig", which is the Auth_Tag/MAC. In addition, the "iv", the initialization vector used and "ciphertext", the generated cipher text based on the encryption process are also included as part of the JWE. Alternatively, a Concise Binary Object Representation (CBOR)-based representation instead of Base64 may be used by mechanism described in CBOR Object Signing and Encryption standards. A oneM2M message "Request" containing the message header as well as the Sec-Attributes represented as JWE1 is generated.

In addition, AE1 602 uses the Ke2e_AE2_CSE2_msg_auth and generates a new Nonce and generates an Auth_Tag2 on the Request message that includes the inner Sec-Attributes/JWE1 parameters. The outer Auth_Tag2 is used for authentication with the CSE2 702. The AE2 1102 generates a JWS1 that contains the Auth_Tag2 (MAC), based on the guidance provided in the ContextInfo and UsageInfo provided with the associated credential Ke2e_AE2_CSE2_msg_auth identifiable by its credential-ID Ke2e_AE2_CSE2_msg_auth-ID. The message created by AE2 1102 is forwarded to CSE1 604.

At step 3 of FIG. 19, The CSE2 702 uses the JWS1 information contained within the received message to obtain the associated credential based on the Credential-ID from the keystore along with the UsageInfo and ContextInfo. The CSE2 702 generates and Auth_Tag using the Nonce, Ke2e_AE2_CSE2_msg_auth and the message/message header and compares it to the Auth_Tag contained within the JWS1 and if they matched implies that the AE2's message has been authenticated and if AE2 1102 has been authorized to send such a message then CSE2 702 processes the Request message. CSE2 702 strips the outer JWS1/MAC from the message.

At step 4 of FIG. 19, the CSE2 702 generates a JWS2 or MAC and appends it to the Request message. The Auth_Tag within the JWS2 is generated using the Ke2e_CSE2_CSE1_msg_auth key, along with a newly generated nonce, message or message header or meta-data and based on the ContextInfo and UsageInfo associated with the credential/key. The CSE2 702 appends the JWS2/MAC to the Request message and sends it to CSE1 604. It must be noted that in case, there is a hop-by-hop security association created by means of a (D)TLS connection that is still active, then the Request message may be sent over that secure connection instead of generating a JWS2/MAC. The use of (D)TLS instead of Object Security (e.g. using JWS) may be determined based on service provider policies, device capabilities etc. In cases, where message confidentiality is not required, then using Object Security may be preferred. In certain cases, even if message and data confidentiality may be required the policies may dictate the usage of JWE instead of (D)TLS since the service layer may be able to provide the security services instead of relying upon lower layer security or for performance reasons where (D)TLS may be computationally and/or spatially more intensive.

At step 5 of FIG. 19, the CSE1 604 verifies if it were the target of the message. Using the outer Sec-Attributes (JWS2/MAC), the CSE1 604 uses the associated Credential-ID(s) in order to identify the right credential(s) and fetch them from a secure keystore (e.g. secure element such as SIM card), determine the appropriate context info and usage parameters. In this case, the Ke2e_CSE2_CSE1_msg_auth key is retrieved along with the Nonce in the JWS2 and using the message or message header or meta-data of the message the CSE1 604 generates a Generated_Auth_Tag and compares it to the Auth_Tag within the JWS2/MAC, if they match then CSE1 604 authenticates that the message was sent through a trusted CSE1 604.

The CSE1 604 discards the outer JWS2/MAC and processes the inner Sec-Attributes/JWE1. From within the JWE1, the CSE1 604 obtains the credential-ID(s), in case, where separate keys are used for both message authentication as well as message confidentiality both the keys will have to be fetched from the keystore based on the Credential-ID(s). Using the JWE info "alg", as well the "cred-id", CSE1 604 is able to determine if an AEAD is used for security protection, and if so, only a single associated credential identified by the cred-id may be retrieved. Verifies if the message has the right set of characteristics based on the context info, which determines the type of security (signing, encryption), the entities involved etc and the usage (algorithms, availability of nonce etc.), identifies the AAD, IV, nonces and other parameters and uses the Ke2e_AE2_CSE1_msg_auth_conf key in order to decrypt the "ciphertext" and extract the "plaintext", which may contain the message as well as the data payload. CSE1 604 uses the message or the message header or the meta-data of the message or uses the information that has been identified as the AAD in order to compute the Generated_Auth_Tag. In some cases the entire message that was originally sent by AE2 1102, or the message header or meta-data of the message and uses the nonce that may be present along with context info that provides the parameters as input into the "alg" identified within the JWE, which happens to be AES-CCM in this case and generates a Generated_Auth_Tag. The CSE1 604 verifies if the Generated_Auth_Tag is the same as the Auth_Tag contained within the JWE and if so, the AE2's message has been authenticated.

At step 6 of FIG. 19, the CSE1 604 then checks to see if AE2 1102 has been authorized to perform an "Update" operation on AE1 602 resource. If AE2 1102 is authorized to perform the "Update" operation then the CSE1 604 updates the AE1 602 resource identified by R-ID.

At step 7 of FIG. 19, the CSE1 604 prepares to send a "Notify" message to AE1 602 indicating an update operation that was performed on AE1's resource. If an existing (D)TLS connection does not exist between the AE1 602 and CSE1 604 or if there does not exist a credential between CSE1 604 and AE1 602 that is used for performing hop-by-hop security association or if policies dictate that hop-by-hop security associations by means of (D)TLS are not to be used, then the Object Security mechanisms by means of JWS is used to provide message authentication. CSE1 604 generates a JWS3/MAC based on ContextInfo and Usage-Info associated with the Ke2e_CSE1_AE1_msg_auth key, using a newly generated Nonce along with the message, message header or metadata of the message. The JWS3/MAC is appended to the "Notify" Request message generated by the CSE1 604 and sent to AE1 602 indicating of an "Update" to AE1's resource "R-ID". If policies dictate that hop-by-hop security by means of (D)TLS is to be used for securing the communications between CSE1 604 and AE1 602 then a (D)TLS connections may be created by using the shared symmetric key Kpsa_AE1_CSE1, which may have to be provisioned or generated based on the oneM2M technical specifications TS-0003 Release 1. The "Notify" message may be sent over the secure connection instead of using Object Security mechanism.

At step 8 of FIG. 19, the AE1 602 verifies the JWS3/MAC and authenticates the "notify" message.

At step 9 of FIG. 19, the CSE1 604 creates a response message which is a response to the request message sent by AE2 1102. CSE1 604 uses the process that is similar to the procedure used by AE2 1102 in step 2 in order to generate an Auth_Tag2, encrypted message and a JWE2 using the Ke2e_AE2_CSE1_msg_auth_conf, that is associated between AE2 1102 and CSE1 604. The Sec-Attributes/JWE2 is appended to the message header or the AAD. It is recommended to use a new Nonce and IV each time and include it as part of the JWE and not re-use an existing Nonce. All the Sec-Attributes (e.g. Nonce, Auth-Tag2, Credential-ID, message or message header or meta-data of the message identified as the AAD, the IV and the ciphertext) may be included in order to create a JWE2. Optionally, the CSE1 604 also generates an outer JWS4/MAC (Auth_Tag) that is used to provide message authentication to CSE2 702. The JWS4 is generated by using Ke2e_CSE2_CSE1_msg_auth along with the appropriate parameters described previously.

At step 10 of FIG. 19, the CSE1 604 sends the response message to CSE2 702 along with the JWS4/MAC. If policies require the setup of a (D)TLS connection between CSE1 604 and CSE2 702, then the response message may be sent over the secure connection and skip the generation of JWS4.

At step 11 of FIG. 19, the CSE2 702 may verify the message received from CSE1 604 for authenticity/integrity by verifying the JWS4 and strips the JWS4/MAC from the message. CSE2 702, then generates an Auth_Tag using the Ke2e_AE2_CSE2_msg_auth and other parameters (e.g. new Nonce, message header or message or meta-data of the message, ContextInfo and other parameters) as described above and incorporates the Auth_Tag onto the JWS5.

At step 12 of FIG. 19, AE2 1102 verifies the JWS5 and authenticates the Response message that also includes the Sec-Attributes/JWE2 by using the Ke2e_AE2_CSE2_msg_auth key on the Response message using similar mechanisms as described in step 5 of FIG. 19. The AE2 1102 therefore determines that the Response message was forwarded by a trustworthy CSE2 702.

The AE2 1102 discards the outer JWS5/MAC and processes the inner Sec-Attributes/JWE2. From within the JWE2, the AE2 1102 obtains the credential-ID(s), in case, where separate keys are used for both message authentication as well as message confidentiality both the keys will have to be fetched from the keystore based on the Credential-ID(s). Using the JWE info "alg", as well the "cred-id", AE2 1102 is able to determine if an AEAD is used for security protection, and if so, only a single associated credential identified by the cred-id may be retrieved. Verifies if the message has the right set of characteristics based on the context info, which determines the type of security (signing, encryption), the entities involved etc and the usage (algorithms, availability of nonce etc.), identifies the AAD, IV, nonces and other parameters and uses the Ke2e_AE2_CSE1_msg_auth_conf key in order to decrypt the "ciphertext" and extract the "plaintext", which may contain the message as well as the data payload. AE2 1102 uses the message or the message header or the meta-data of the message or uses the information that has been identified as the AAD in order to compute the Generated_Auth_Tag. In some cases the entire message that was originally sent by CSE1 604, or the message header or meta-data of the message and uses the nonce that may be present along with context info that provides the parameters as input into the "alg" identified within the JWE, which happens to be AES-CCM in this case and generates a Generated_Auth_Tag. The AE2 1102 verifies if the Generated_Auth_Tag is the same as the Auth_Tag contained within the JWE and if so, the CSE1's message has been authenticated.

It is understood that the entities performing the steps illustrated in FIG. 19 are logical entities that may be implemented in the form of software (i.e., computer-executable instructions) stored in a memory of, and executing on a processor of, a network node or computer system such as those illustrated in FIG. 21C or FIG. 21D. That is, the method(s) illustrated in FIG. 19 may be implemented in the form of software (i.e., computer-executable instructions) stored in a memory of a network node, such as the node or computer system illustrated in FIG. 21C or FIG. 21D, which computer executable instructions, when executed by a processor of the node, perform the steps illustrated in FIG. 19. It is also understood that any transmitting and receiving steps illustrated in FIG. 19 may be performed by communication circuitry of the node under control of the processor of the node and the computer-executable instructions (e.g., software) that it executes.

E2E Authentication at the Session Layer Using Delegated Mode

Figure 9:
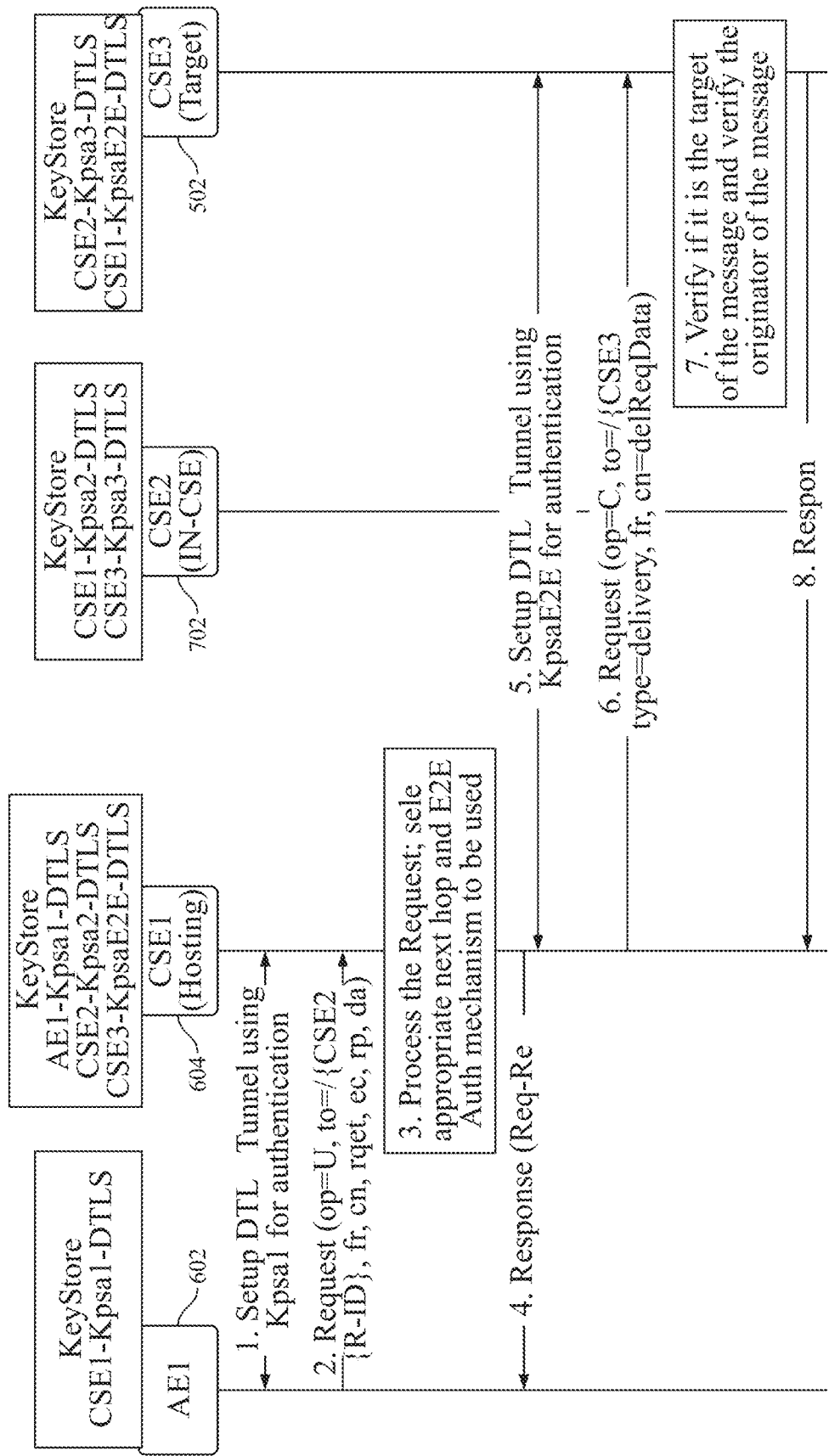
FIG. 9 is a diagram that illustrates E2E authentication performed at the Session Layer (DTLS/TLS) using delegated mode.

FIG. 9 illustrates E2E authentication performed at the Session Layer (DTLS/TLS) using delegated mode. Similar to the approach used in above, except here, the authentication is performed by setting a separate session layer connection between the two E2E entities (CSE1 604 and CSE3 502). CSE1 604 and CSE3 502 perform a DTLS or TLS based authentication instead of performing a hop-by-hop authentication with the E2E authentication MAC being carried within the Request messages. Messaging details:

Step 1-4 of FIG. 9, similar to messaging mechanisms with respect to FIG. 8A-B

Step 5 of FIG. 9, CSE1 604 establishes a DTLS connection with CSE3 502 using KpsaE2E. As part of the parameter provisioning process, the CSE1 604 is able to obtain the URI of CSE3 502 and a port # that should be used for setting up an E2E DTLS connection between CSE1 604 and CSE3 502.

Step 6 of FIG. 9, the Request message from CSE1 604 is forwarded within the DTLS tunnel to the CSE3 502. Here, CSE3 is assumed as another next hop via the DTLS tunnel from CSE1 604.

Step 7 of FIG. 9, CSE3 502 verifies the Message originator information, which here happens to be CSE1 604.

It is understood that the entities performing the steps illustrated in FIG. 9 are logical entities that may be implemented in the form of software (i.e., computer-executable instructions) stored in a memory of, and executing on a processor of, a network node or computer system such as those illustrated in FIG. 21C or FIG. 21D. That is, the method(s) illustrated in FIG. 9 may be implemented in the form of software (i.e., computer-executable instructions) stored in a memory of a network node, such as the node or computer system illustrated in FIG. 21C or FIG. 21D, which computer executable instructions, when executed by a processor of the node, perform the steps illustrated in FIG. 9. It is also understood that any transmitting and receiving steps illustrated in FIG. 9 may be performed by communication circuitry of the node under control of the processor of the node and the computer-executable instructions (e.g., software) that it executes.

E2E Authentication at Session Layer Using Direct Mode

Figure 10:
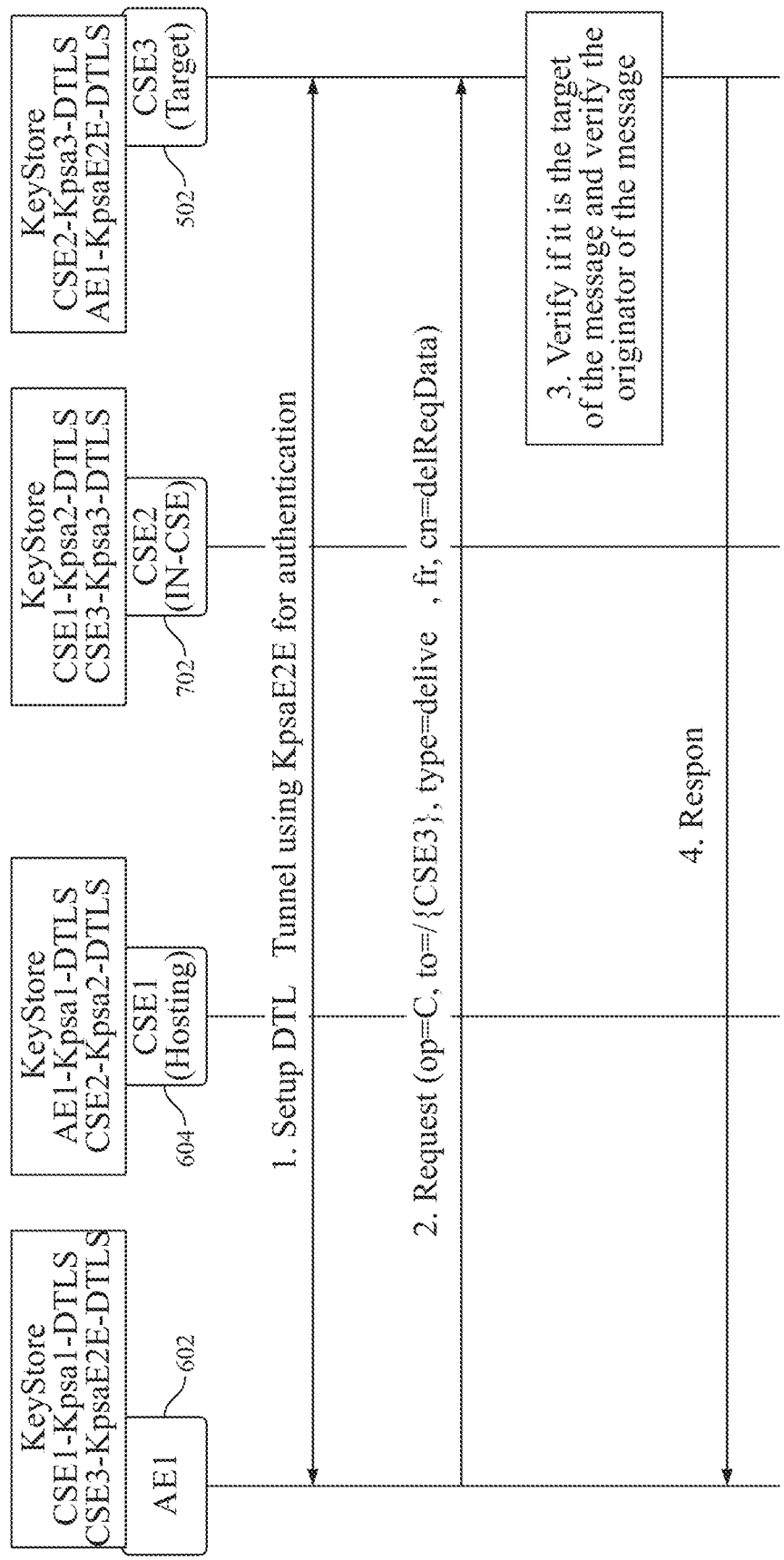
FIG. 10 is a diagram that illustrates an E2E authentication at the Session Layer using Direct mode

FIG. 10 illustrates an E2E authentication at the Session Layer using Direct mode and unlike the mechanisms previously described, the AE1 602 based on the credentials obtained from the TTP that is associated with CSE3 502, sets up direct DTLS connection with CSE3 502. Using the URI, port# and the AE ID, the resource is appropriately configured. CSE3 502 verifies if the originator of the message.

It is understood that the entities performing the steps illustrated in FIG. 10 are logical entities that may be implemented in the form of software (i.e., computer-executable instructions) stored in a memory of, and executing on a processor of, a network node or computer system such as those illustrated in FIG. 21C or FIG. 21D. That is, the method(s) illustrated in FIG. 10 may be implemented in the form of software (i.e., computer-executable instructions) stored in a memory of a network node, such as the node or computer system illustrated in FIG. 21C or FIG. 21D, which computer executable instructions, when executed by a processor of the node, perform the steps illustrated in FIG. 10. It is also understood that any transmitting and receiving steps illustrated in FIG. 10 may be performed by communication circuitry of the node under control of the processor of the node and the computer-executable instructions (e.g., software) that it executes.

Group Authentication

Entities may be grouped based on the capabilities and functionalities that are offered by those entities. It may be envisioned that each of the entities offering the same type of service may be identified by means of a "service identity" or in the case of oneM2M may be identified as an "Application Identity" that may be unique within a M2M service provider domain or even globally unique.

Case 1: Groups Authentication may be performed in some number of ways:
 A unique Group Key associated with each Group
 Provisioned during the Service Enablement and Security Configuration process
 All Entities that belong to the same Group shares the same E2E Group Key
 E2E authenticate one another using the Group Authentication key that may be pre-provisioned during the provisioning phase
 Group Session Keys may be derived after authentication and shared between Group members provisioned by a Group Manager (e.g. CSE)

Case 2: No unique Group Key but Unique E2E Authentication Key (Reduces E2E messaging)—Special case of Delegated Authentication
 Group may be managed by a Group Manager (e.g. Hosting CSE)
 All Group members are registered with the Hosting CSE
 Each member of the Group has an Unique E2E Authentication Key
 Group members are authenticated with the remote CSE or any other entity using the Unique E2E Auth Key as described previously in the sections above.

Case 3: Hybrid mode:
 Group is managed by a Group Manager, who is pre-provisioned with its own Group Manager key (GM key)

- All group members are registered with the Group Manager
- Each member of the Group has an Unique E2E Authentication Key
- Group Manager uses GM key as E2E Group Key for initial Group Authentication
- The unique E2E Authentication Keys for each entity is used for additional multi-factor/multi-layer authentications
- New members to the group may use the E2E Group key to obtain their unique E2E keys, or they may be provisioned during the Service Enablement and Security Configuration process
- Group authentication procedures may include:
- Negotiation between the Group Manager and group members for common security parameters to be used for the group
- Negotiation between the Group Manager and the TTP for credentials to be used for new/future members of the group and revocation of group member information and associated credentials.

Figure 11A:
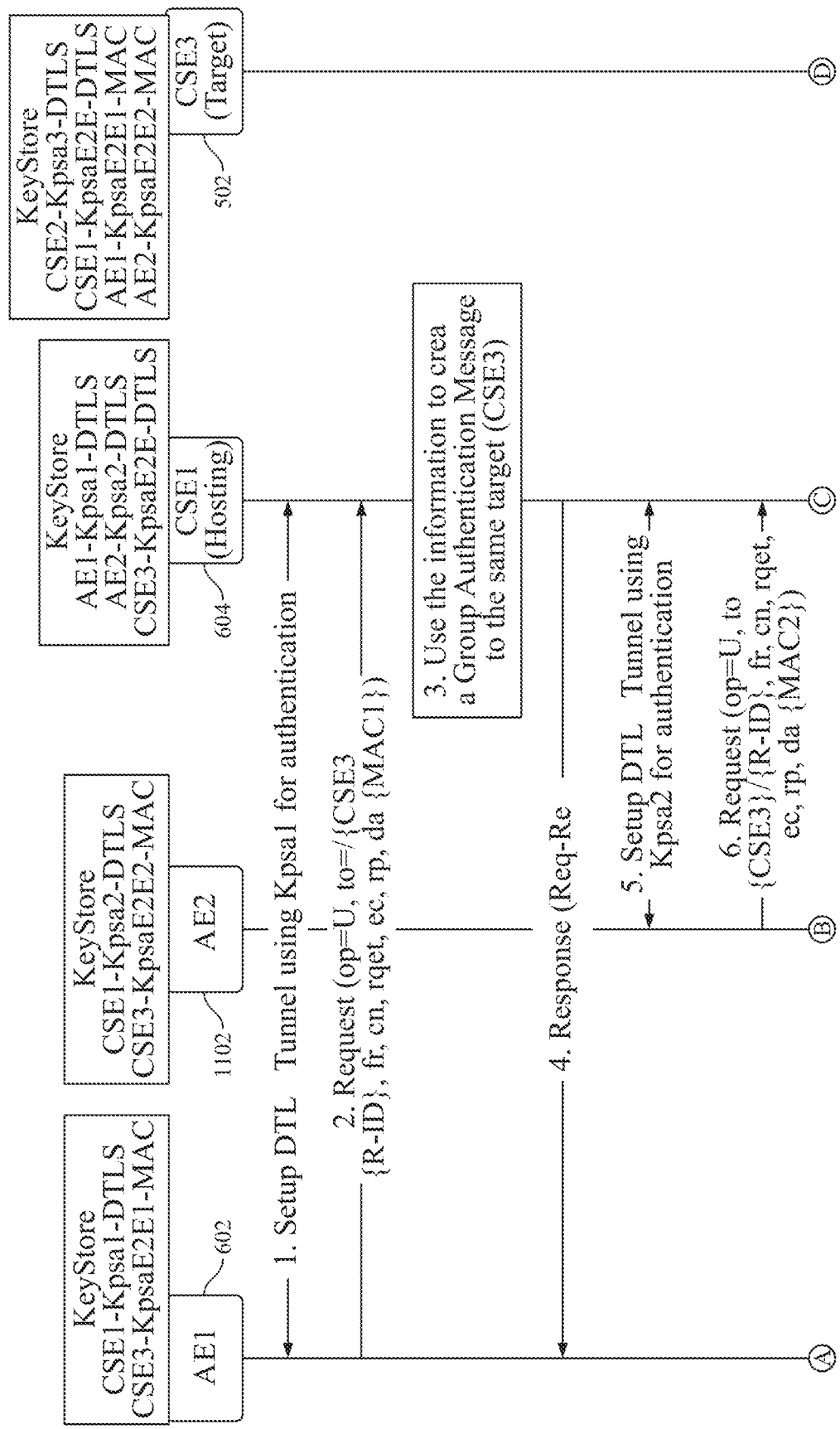
FIG. 11A-B is a diagram that illustrates group authentication.
Figure 11B:
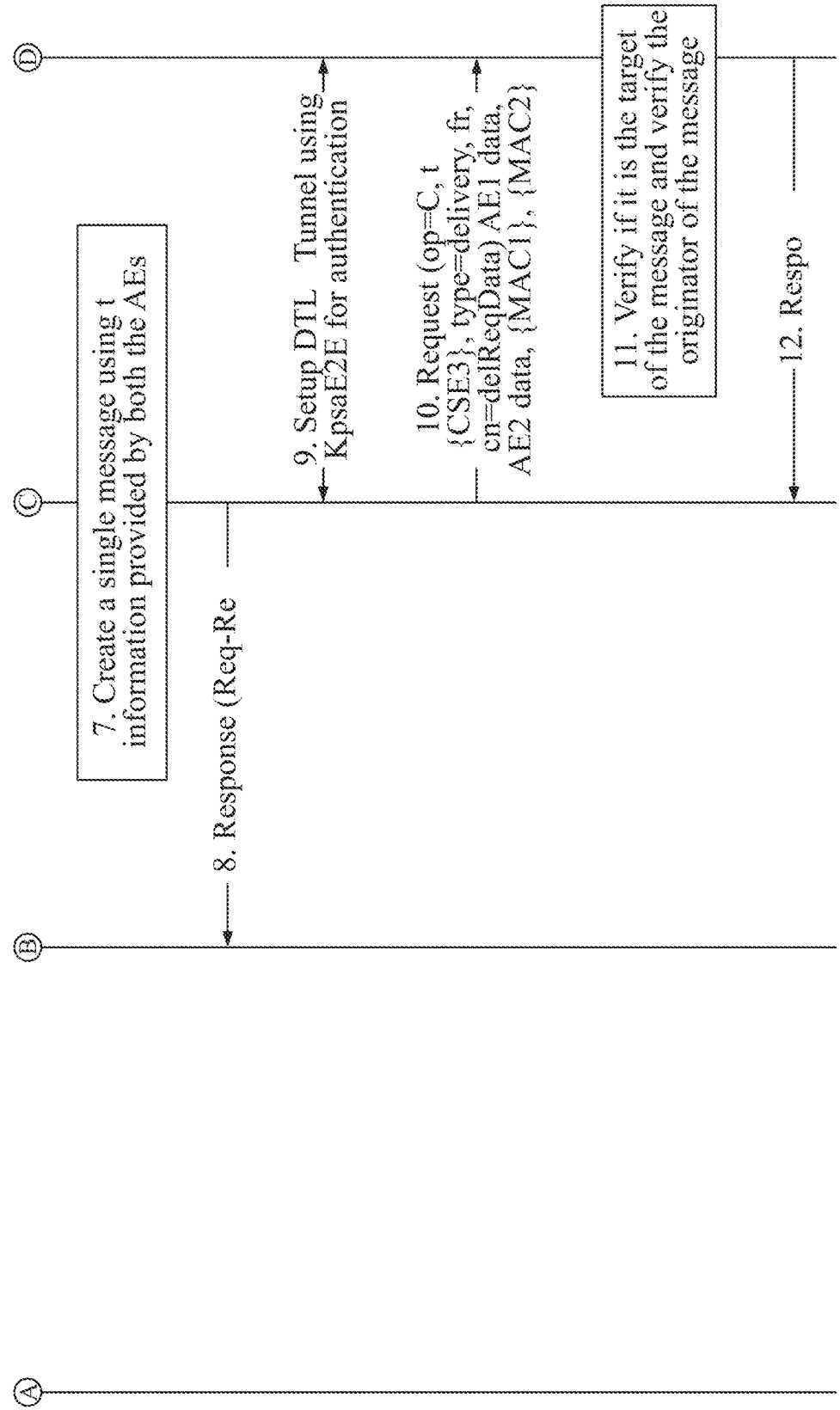

An embodiment of group authentication wherein, NO group key is provisioned but uses Unique E2E key between the entities in a delegated authentication mode scenario is illustrated in FIG. 11A-B. Group is managed by a Group Manager (e.g. CSE1 604). The relevant steps are described:

Steps 1-6 of FIG. 11A-B follow mechanisms described in previous sections.

In Step 7 of FIG. 11A-B, based on information inferred based on target of the messaging, CSE1, creates a consolidated message that includes relevant parts of Message 2 along with MAC1 (generated using Kpsa_E2E1 associated with Entity A) and relevant parts of Message 6 along with MAC2 (generated using Kpsa_E2E2 associated Entity B).

Step 8 of FIG. 11A-B is the same as described in earlier sections

In step 9 of FIG. 11A-B, CSE1 604 creates a (D)TLS connection with CSE3 502 (target) using KpsaE2E.

Step 10 of FIG. 11A-B, the consolidated message created at Step 7 is sent securely over the (D)TLS connection by the CSE1 604 to the CSE3 502.

Step 11 of FIG. 11A-B, the CSE3 502 verifies the that there are two service layer messages originating from two entities (AE1 602 and cse1 102) and verifies the respective MACs there by verifying the originators or the message and also ensures that the messages have not been replayed.

It is understood that the entities performing the steps illustrated in FIG. 11A-B are logical entities that may be implemented in the form of software (i.e., computer-executable instructions) stored in a memory of, and executing on a processor of, a network node or computer system such as those illustrated in FIG. 21C or FIG. 21D. That is, the method(s) illustrated in FIG. 11A-B may be implemented in the form of software (i.e., computer-executable instructions) stored in a memory of a network node, such as the node or computer system illustrated in FIG. 21C or FIG. 21D, which computer executable instructions, when executed by a processor of the node, perform the steps illustrated in FIG. 11A-B. It is also understood that any transmitting and receiving steps illustrated in FIG. 11A-B may be performed by communication circuitry of the node under control of the processor of the node and the computer-executable instructions (e.g., software) that it executes.

Interfaces

Figure 12:
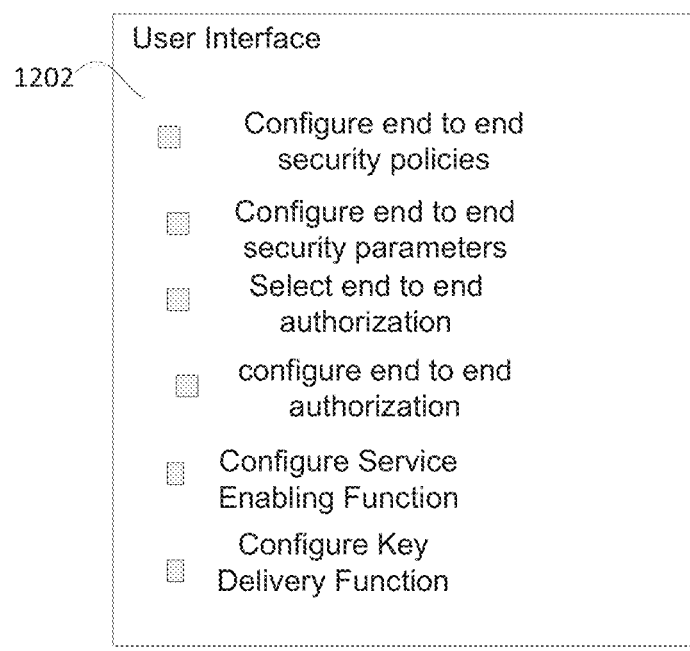
FIG. 12 is a diagram that illustrates an interface of one embodiment.
Figure 13:
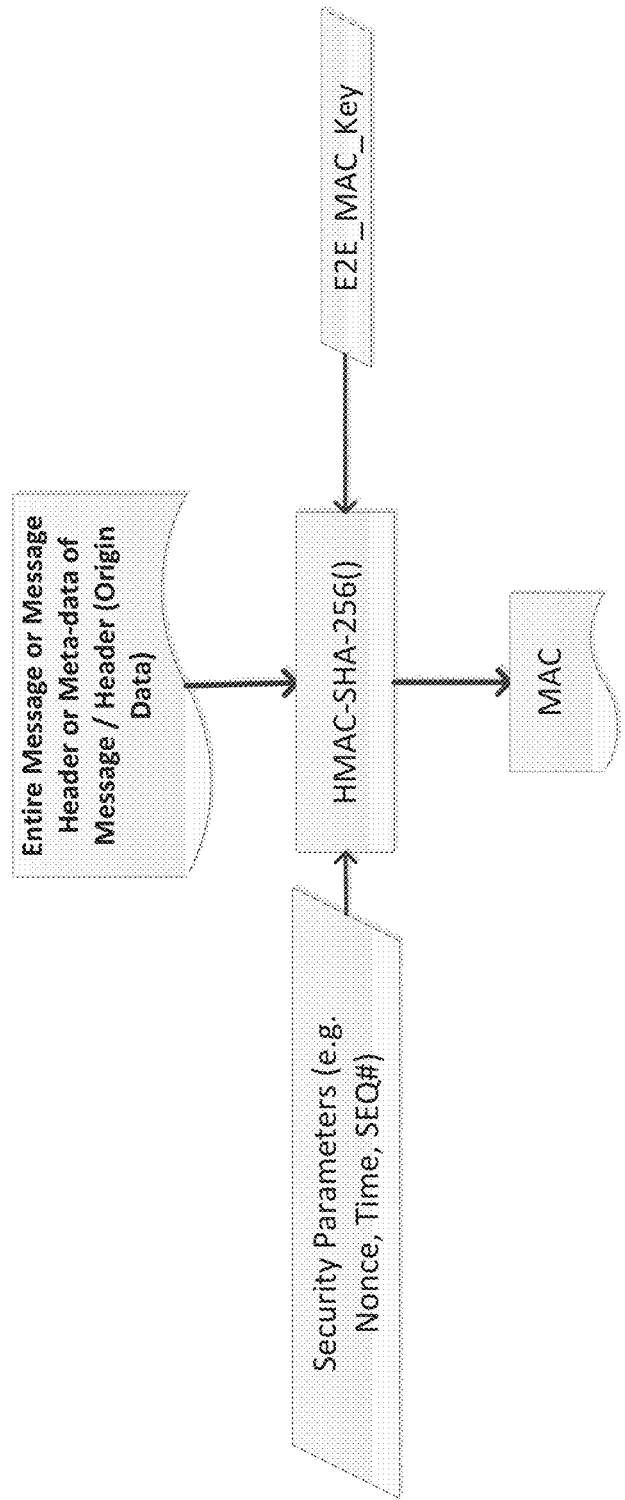
FIG. 13 is a diagram that illustrates the creation of a MAC for end to end message authentication.

Interfaces, such as Graphical User Interfaces (GUIs), can be used to assist user to control and/or configure functionalities related to the end-to-end authorization. FIG. 12 is a diagram that illustrates an interface 1202 that allows a user to select and configure the end to end authentication including configuring the Service Enabling Function and Key Delivery Function. The user interface 1202 can be used to configure/display end-to-end security policies and associated security parameters at an M2M device/gateway/server. It is to be understood that interface 2102 can be produced using displays such as those shown in FIGS. 21C-D described below.

Example M2M/IoT/WoT Communication System

FIG. 21A is a diagram of an example machine-to machine (M2M), Internet of Things (IoT), or Web of Things (WoT) communication system 10 in which one or more disclosed embodiments may be implemented. Generally, M2M technologies provide building blocks for the IoT/WoT, and any M2M device, M2M gateway, M2M server, or M2M service platform may be a component or node of the IoT/WoT as well as an IoT/WoT service layer, etc. Communication system 10 can be used to implement functionality of the disclosed embodiments and can include functionality and logical entities such as Service Enabling Function 204 and 304, Key Delivery Function 206, Trusted Third Parties, CSE 402, 502, 504, 604, 704 and 2002, CSF 408 and 412, AE1 602, AE2 1102, SP repository 2004, DP/EP repository 2006, MEF 2008 and logical entities to produce the user interface 1202.

As shown in FIG. 21A, the M2M/IoT/WoT communication system 10 includes a communication network 12. The communication network 12 may be a fixed network (e.g., Ethernet, Fiber, ISDN, PLC, or the like) or a wireless network (e.g., WLAN, cellular, or the like) or a network of heterogeneous networks. For example, the communication network 12 may be comprised of multiple access networks that provide content such as voice, data, video, messaging, broadcast, or the like to multiple users. For example, the communication network 12 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like. Further, the communication network 12 may comprise other networks such as a core network, the Internet, a sensor network, an industrial control network, a personal area network, a fused personal network, a satellite network, a home network, or an enterprise network for example.

As shown in FIG. 21A, the M2M/IoT/WoT communication system 10 may include the Infrastructure Domain and the Field Domain. The Infrastructure Domain refers to the network side of the end-to-end M2M deployment, and the Field Domain refers to the area networks, usually behind an M2M gateway. The Field Domain and Infrastructure Domain may both comprise a variety of different network nodes (e.g., servers, gateways, device, and the like). For example, the Field Domain may include M2M gateways 14 and terminal devices 18. It will be appreciated that any number of M2M gateway devices 14 and M2M terminal devices 18 may be included in the M2M/IoT/WoT communication system 10 as desired. Each of the M2M gateway devices 14 and M2M terminal devices 18 are configured to transmit and receive signals, using communications circuitry, via the communication network 12 or direct radio link. A M2M gateway 14 allows wireless M2M devices (e.g. cellular and non-cellular) as well as fixed network M2M devices (e.g., PLC) to communicate either through operator networks, such as the communication network 12 or direct radio link. For example, the M2M terminal devices 18 may collect data and send the data, via the communication network 12 or direct radio link, to an M2M application 20 or other M2M devices 18. The M2M terminal devices 18 may also receive data from the M2M application 20 or an M2M terminal device 18. Further, data and signals may be sent to and received from the M2M application 20 via an M2M service layer 22, as described below. M2M terminal devices 18 and gateways 14 may communicate via various networks including, cellular, WLAN, WPAN (e.g., Zigbee, 6LoWPAN, Bluetooth), direct radio link, and wireline for example.

Exemplary M2M terminal devices 18 include, but are not limited to, tablets, smart phones, medical devices, temperature and weather monitors, connected cars, smart meters, game consoles, personal digital assistants, health and fitness monitors, lights, thermostats, appliances, garage doors and other actuator-based devices, security devices, and smart outlets.

Referring to FIG. 21B, the illustrated M2M service layer 22 in the field domain provides services for the M2M application 20, M2M gateway devices 14, and M2M terminal devices 18 and the communication network 12. Communication network 12 can be used to implement functionality of the disclosed embodiments and can include functionality and logical entities such as Service Enabling Function 204 and 304, Key Delivery Function 206, Trusted Third Parties, CSE 402, 502, 504, 604, 704 and 2002, CSF 408 and 412, AE1 602, AE2 1102, SP repository 2004, DP/EP repository 2006, MEF 2008 and logical entities to produce the user interface 1202. The M2M service layer 22 may be implemented by one or more servers, computers, devices, virtual machines (e.g. cloud/storage farms, etc.) or the like, including for example the devices illustrated in FIGS. 21C and 21D described below. It will be understood that the M2M service layer 22 may communicate with any number of M2M applications, M2M gateways 14, M2M terminal devices 18, and communication networks 12 as desired. The M2M service layer 22 may be implemented by one or more nodes of the network, which may comprises servers, computers, devices, or the like. The M2M service layer 22 provides service capabilities that apply to M2M terminal devices 18, M2M gateways 14, and M2M applications 20. The functions of the M2M service layer 22 may be implemented in a variety of ways, for example as a web server, in the cellular core network, in the cloud, etc.

Similar to the illustrated M2M service layer 22, there is the M2M service layer 22' in the Infrastructure Domain. M2M service layer 22' provides services for the M2M application 20' and the underlying communication network 12' in the infrastructure domain. M2M service layer 22' also provides services for the M2M gateways 14 and M2M terminal devices 18 in the field domain. It will be understood that the M2M service layer 22' may communicate with any number of M2M applications, M2M gateways and M2M devices. The M2M service layer 22' may interact with a service layer by a different service provider. The M2M service layer 22' by one or more nodes of the network, which may comprises servers, computers, devices, virtual machines (e.g., cloud computing/storage farms, etc.) or the like.

Referring also to FIG. 21B, the M2M service layers 22 and 22' provide a core set of service delivery capabilities that diverse applications and verticals can leverage. These service capabilities enable M2M applications 20 and 20' to interact with devices and perform functions such as data collection, data analysis, device management, security, billing, service/device discovery etc. Essentially, these service capabilities free the applications of the burden of implementing these functionalities, thus simplifying application development and reducing cost and time to market. The service layers 22 and 22' also enable M2M applications 20 and 20' to communicate through various networks 12 and 12' in connection with the services that the service layers 22 and 22' provide.

The methods of the present application may be implemented as part of a service layer 22 and 22'. The service layer 22 and 22' is a software middleware layer that supports value-added service capabilities through a set of Application Programming Interfaces (APIs) and underlying networking interfaces. Both ETSI M2M and oneM2M use a service layer that may contain the connection methods of the present application. ETSI M2M's service layer is referred to as the Service Capability Layer (SCL). The SCL may be implemented within an M2M device (where it is referred to as a device SCL (DSCL)), a gateway (where it is referred to as a gateway SCL (GSCL)) and/or a network node (where it is referred to as a network SCL (NSCL)). The oneM2M service layer supports a set of Common Service Functions (CSFs) (i.e. service capabilities). An instantiation of a set of one or more particular types of CSFs is referred to as a Common Services Entity (CSE) which can be hosted on different types of network nodes (e.g. infrastructure node, middle node, application-specific node). Further, connection methods of the present application can implemented as part of an M2M network that uses a Service Oriented Architecture (SOA) and/or a resource-oriented architecture (ROA) to access services such as the connection methods of the present application.

In some embodiments, M2M applications 20 and 20' may be used in conjunction with the disclosed systems and methods. The M2M applications 20 and 20' may include the applications that interact with the UE or gateway and may also be used in conjunction with other disclosed systems and methods.

In one embodiment, the logical entities such as Service Enabling Function 204 and 304, Key Delivery Function 206, Trusted Third Parties, CSE 402, 502, 504, 604, 704 and 2002, CSF 408 and 412, AE1 602, AE2 1102, SP repository 2004, DP/EP repository 2006, MEF 2008 and logical entities to produce the user interface 1202 may be hosted within a M2M service layer instance hosted by an M2M node, such as an M2M server, M2M gateway, or M2M device, as shown in FIG. 21B. For example, the logical entities such as Service Enabling Function 204 and 304, Key Delivery Function 206, Trusted Third Parties, CSE 402, 502, 504, 604, and 704, CSF 408 and 412, AE1 602, AE2 1102 and logical entities to produce the user interface 1202 may comprise an individual service capability within the M2M service layer instance or as a sub-function within an existing service capability.

The M2M applications 20 and 20' may include applications in various industries such as, without limitation, transportation, health and wellness, connected home, energy management, asset tracking, and security and surveillance. As mentioned above, the M2M service layer, running across the devices, gateways, servers and other nodes of the system, supports functions such as, for example, data collection, device management, security, billing, location tracking/geofencing, device/service discovery, and legacy systems integration, and provides these functions as services to the M2M applications 20 and 20'.

Generally, the service layers 22 and 22' define a software middleware layer that supports value-added service capabilities through a set of Application Programming Interfaces (APIs) and underlying networking interfaces. Both the ETSI M2M and oneM2M architectures define a service layer. ETSI M2M's service layer is referred to as the Service Capability Layer (SCL). The SCL may be implemented in a variety of different nodes of the ETSI M2M architecture. For example, an instance of the service layer may be implemented within an M2M device (where it is referred to as a device SCL (DSCL)), a gateway (where it is referred to as a gateway SCL (GSCL)) and/or a network node (where it is referred to as a network SCL (NSCL)). The oneM2M service layer supports a set of Common Service Functions (CSFs) (i.e., service capabilities). An instantiation of a set of one or more particular types of CSFs is referred to as a Common Services Entity (CSE) which can be hosted on different types of network nodes (e.g. infrastructure node, middle node, application-specific node). The Third Generation Partnership Project (3GPP) has also defined an architecture for machine-type communications (MTC). In that architecture, the service layer, and the service capabilities it provides, are implemented as part of a Service Capability Server (SCS). Whether embodied in a DSCL, GSCL, or NSCL of the ETSI M2M architecture, in a Service Capability Server (SCS) of the 3GPP MTC architecture, in a CSF or CSE of the oneM2M architecture, or in some other node of a network, an instance of the service layer may be implemented as a logical entity (e.g., software, computer-executable instructions, and the like) executing either on one or more standalone nodes in the network, including servers, computers, and other computing devices or nodes, or as part of one or more existing nodes. As an example, an instance of a service layer or component thereof may be implemented in the form of software running on a network node (e.g., server, computer, gateway, device or the like) having the general architecture illustrated in FIG. 21C or FIG. 21D described below.

Further, logical entities such as Service Enabling Function 204 and 304, Key Delivery Function 206, Trusted Third Parties, CSE 402, 502, 504, 604, and 704, CSF 408 and 412, AE1 602, AE2 1102 and logical entities to produce the user interface 1202 can implemented as part of an M2M network that uses a Service Oriented Architecture (SOA) and/or a Resource-Oriented Architecture (ROA) to access services of the present application.

FIG. 21C is a block diagram of an example hardware/software architecture of a M2M network node 30, such as an M2M device 18, an M2M gateway 14, an M2M server, or the like. The node 30 can execute or include logical entities such as Service Enabling Function 204 and 304, Key Delivery Function 206, Trusted Third Parties, CSE 402, 502, 504, 604, 704 and 2002, CSF 408 and 412, AE1 602, AE2 1102, SP repository 2004, DP/EP repository 2006, MEF 2008 and logical entities to produce the user interface 1202. The device 30 can be part of an M2M network as shown in FIG. 21A-B or part of a non-M2M network. As shown in FIG. 21C, the M2M node 30 may include a processor 32, non-removable memory 44, removable memory 46, a speaker/microphone 38, a keypad 40, a display, touchpad, and/or indicators 42, a power source 48, a global positioning system (GPS) chipset 50, and other peripherals 52. The node 30 may also include communication circuitry, such as a transceiver 34 and a transmit/receive element 36. It will be appreciated that the M2M node 30 may include any sub-combination of the foregoing elements while remaining consistent with an embodiment. This node may be a node that implements the SMSF functionality described herein.

The processor 32 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. In general, the processor 32 may execute computer-executable instructions stored in the memory (e.g., memory 44 and/or memory 46) of the node in order to perform the various required functions of the node. For example, the processor 32 may perform signal coding, data processing, power control, input/output processing, and/or any other functionality that enables the M2M node 30 to operate in a wireless or wired environment. The processor 32 may run application-layer programs (e.g., browsers) and/or radio access-layer (RAN) programs and/or other communications programs. The processor 32 may also perform security operations such as authentication, security key agreement, and/or cryptographic operations, such as at the access-layer and/or application layer for example.

As shown in FIG. 21C, the processor 32 is coupled to its communication circuitry (e.g., transceiver 34 and transmit/receive element 36). The processor 32, through the execution of computer executable instructions, may control the communication circuitry in order to cause the node 30 to communicate with other nodes via the network to which it is connected. In particular, the processor 32 may control the communication circuitry in order to perform the transmitting and receiving steps described herein and in the claims. While FIG. 21C depicts the processor 32 and the transceiver 34 as separate components, it will be appreciated that the processor 32 and the transceiver 34 may be integrated together in an electronic package or chip.

The transmit/receive element 36 may be configured to transmit signals to, or receive signals from, other M2M nodes, including M2M servers, gateways, device, and the like. For example, in an embodiment, the transmit/receive element 36 may be an antenna configured to transmit and/or receive RF signals. The transmit/receive element 36 may support various networks and air interfaces, such as WLAN, WPAN, cellular, and the like. In an embodiment, the transmit/receive element 36 may be an emitter/detector configured to transmit and/or receive IR, UV, or visible light signals, for example. In yet another embodiment, the transmit/receive element 36 may be configured to transmit and receive both RF and light signals. It will be appreciated that the transmit/receive element 36 may be configured to transmit and/or receive any combination of wireless or wired signals.

In addition, although the transmit/receive element 36 is depicted in FIG. 21C as a single element, the M2M node 30 may include any number of transmit/receive elements 36. More specifically, the M2M node 30 may employ MIMO technology. Thus, in an embodiment, the M2M node 30 may include two or more transmit/receive elements 36 (e.g., multiple antennas) for transmitting and receiving wireless signals.

The transceiver 34 may be configured to modulate the signals that are to be transmitted by the transmit/receive element 36 and to demodulate the signals that are received by the transmit/receive element 36. As noted above, the M2M node 30 may have multi-mode capabilities. Thus, the transceiver 34 may include multiple transceivers for enabling the M2M node 30 to communicate via multiple RATs, such as UTRA and IEEE 802.11, for example.

The processor 32 may access information from, and store data in, any type of suitable memory, such as the non-removable memory 44 and/or the removable memory 46. For example, the processor 32 may store session context in its memory, as described above. The non-removable memory 44 may include random-access memory (RAM), read-only memory (ROM), a hard disk, or any other type of memory storage device. The removable memory 46 may include a subscriber identity module (SIM) card, a memory stick, a secure digital (SD) memory card, and the like. In other embodiments, the processor 32 may access information from, and store data in, memory that is not physically located on the M2M node 30, such as on a server or a home computer. The processor 32 may be configured to control lighting patterns, images, or colors on the display or indicators 42 to reflect the status of an M2M service layer session migration or sharing or to obtain input from a user or display information to a user about the node's session migration or sharing capabilities or settings. In another example, the display may show information with regard to a session state. The current disclosure defines a RESTful user/application API in the oneM2M embodiment. A graphical user interface, which may be shown on the display, may be layered on top of the API to allow a user to interactively establish and manage an E2E session, or the migration or sharing thereof, via the underlying service layer session functionality described herein.

The processor 32 may receive power from the power source 48, and may be configured to distribute and/or control the power to the other components in the M2M node 30. The power source 48 may be any suitable device for powering the M2M node 30. For example, the power source 48 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 32 may also be coupled to the GPS chipset 50, which is configured to provide location information (e.g., longitude and latitude) regarding the current location of the M2M node 30. It will be appreciated that the M2M node 30 may acquire location information by way of any suitable location-determination method while remaining consistent with an embodiment.

The processor 32 may further be coupled to other peripherals 52, which may include one or more software and/or hardware modules that provide additional features, functionality and/or wired or wireless connectivity. For example, the peripherals 52 may include an accelerometer, an e-compass, a satellite transceiver, a sensor, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

FIG. 21D is a block diagram of an exemplary computing system 90 which may also be used to implement one or more nodes of an M2M network, such as an M2M server, gateway, device, or other node. Computing system 90 may comprise a computer or server and may be controlled primarily by computer readable instructions, which may be in the form of software, wherever, or by whatever means such software is stored or accessed. Computing system 90 can execute or include logical entities such as Service Enabling Function 204 and 304, Key Delivery Function 206, Trusted Third Parties, CSE 402, 502, 504, 604, 704 and 2002, CSF 408 and 412, AE1 602, AE2 1102, SP repository 2004, DP/EP repository 2006, MEF 2008 and logical entities to produce the user interface 1202. Computing system 90 can be an M2M device, user equipment, gateway, UE/GW or any other nodes including nodes of the mobile care network, service layer network application provider, terminal device 18 or an M2M gateway device 14 for example. Such computer readable instructions may be executed within a processor, such as central processing unit (CPU) 91, to cause computing system 90 to do work. In many known workstations, servers, and personal computers, central processing unit 91 is implemented by a single-chip CPU called a microprocessor. In other machines, the central processing unit 91 may comprise multiple processors. Coprocessor 81 is an optional processor, distinct from main CPU 91, that performs additional functions or assists CPU 91. CPU 91 and/or coprocessor 81 may receive, generate, and process data related to the disclosed systems and methods for E2E M2M service layer sessions, such as receiving session credentials or authenticating based on session credentials.

In operation, CPU 91 fetches, decodes, and executes instructions, and transfers information to and from other resources via the computer's main data-transfer path, system bus 80. Such a system bus connects the components in computing system 90 and defines the medium for data exchange. System bus 80 typically includes data lines for sending data, address lines for sending addresses, and control lines for sending interrupts and for operating the system bus. An example of such a system bus 80 is the PCI (Peripheral Component Interconnect) bus.

Memories coupled to system bus 80 include random access memory (RAM) 82 and read only memory (ROM) 93. Such memories include circuitry that allows information to be stored and retrieved. ROMs 93 generally contain stored data that cannot easily be modified. Data stored in RAM 82 can be read or changed by CPU 91 or other hardware devices. Access to RAM 82 and/or ROM 93 may be controlled by memory controller 92. Memory controller 92 may provide an address translation function that translates virtual addresses into physical addresses as instructions are executed. Memory controller 92 may also provide a memory protection function that isolates processes within the system and isolates system processes from user processes. Thus, a program running in a first mode can access only memory mapped by its own process virtual address space; it cannot access memory within another process's virtual address space unless memory sharing between the processes has been set up.

In addition, computing system 90 may contain peripherals controller 83 responsible for communicating instructions from CPU 91 to peripherals, such as printer 94, keyboard 84, mouse 95, and disk drive 85.

Display 86, which is controlled by display controller 96, is used to display visual output generated by computing system 90. Such visual output may include text, graphics, animated graphics, and video. Display 86 may be implemented with a CRT-based video display, an LCD-based flat-panel display, gas plasma-based flat-panel display, or a touch-panel. Display controller 96 includes electronic components required to generate a video signal that is sent to display 86.

Further, computing system 90 may contain communication circuitry, such as for example a network adaptor 97, that may be used to connect computing system 90 to an external communications network, such as network 12 of FIG. 21A and FIG. 21B, to enable the computing system 90 to communicate with other nodes of the network.

User equipment (UE) can be any device used by an end-user to communicate. It can be a hand-held telephone, a laptop computer equipped with a mobile broadband adapter, or any other device. For example, the UE can be implemented as the M2M terminal device 18 of FIGS. 21 A-B or the device 30 of FIG. 21 C.

It is understood that any or all of the systems, methods, and processes described herein may be embodied in the form of computer executable instructions (i.e., program code) stored on a computer-readable storage medium which instructions, when executed by a machine, such as a node of an M2M network, including for example an M2M server, gateway, device or the like, perform and/or implement the systems, methods and processes described herein. Specifically, any of the steps, operations or functions described above, including the operations of the gateway, UE, UE/GW, or any of the nodes of the mobile core network, service layer or network application provider, may be implemented in the form of such computer executable instructions. Logical entities such as Service Enabling Function 204 and 304, Key Delivery Function 206, Trusted Third Parties, CSE 402, 502, 504, 604, 704 and 2002, CSF 408 and 412, AE1 602, AE2 1102, SP repository 2004, DP/EP repository 2006, MEF 2008 and logical entities to produce the user interface 1202 may be embodied in the form of the computer executable instructions stored on a computer-readable storage medium. Computer readable storage media include both volatile and nonvolatile, removable and non-removable media implemented in any non-transitory (i.e., tangible or physical) method or technology for storage of information, but such computer readable storage media do not includes signals. Computer readable storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other tangible or physical medium which can be used to store the desired information and which can be accessed by a computer.

In describing preferred embodiments of the subject matter of the present disclosure, as illustrated in the Figures, specific terminology is employed for the sake of clarity. The claimed subject matter, however, is not intended to be limited to the specific terminology so selected, and it is to be understood that each specific element includes all technical equivalents that operate in a similar manner to accomplish a similar purpose.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have elements that do not differ from the literal language of the claims, or if they include equivalent elements with insubstantial differences from the literal language of the claims.

What is claimed:

1. A method comprising:
   receiving, from a first service layer entity performing delegated authentication on behalf of a second service layer entity, a request for one or more security credentials;
   accessing a security profile associated with the second service layer entity, wherein the security profile comprises an indication of one or more security requirements associated with the second service layer entity, and wherein the one or more security requirements comprise an indication of at least one of a security level and a type of security protection mechanism associated with the second service layer entity;
   generating, based on the security profile, the one or more security credentials; and
   sending, to the first service layer entity, the one or more security credentials,
   wherein the one or more security credentials enable the first service layer entity to establish a security association with at least one other service layer entity over a network,
   wherein the first service layer entity is implemented on an apparatus of the network and the other service layer entity is implemented on another apparatus of the network, and
   wherein the first service layer entity and the other service layer entity are interconnected to one another by one or more intermediate service layer entities.

2. The method of claim 1, wherein the security profile is received as part of a service enablement and security configuration process.

3. The method of claim 2, wherein the security profile is based on a type of service to be provided by the second service layer entity.

4. The method of claim 1, wherein the one or more security credentials are further generated based on a device profile associated with the second service layer entity, wherein the device profile comprises an indication of one or more capabilities of the second service layer entity.

5. The method of claim 1, wherein the one or more security credentials are further generated based on an entity profile associated with the second service layer entity, wherein the entity profile comprises an indication of one or more of a class of service, a type of service, a security level, and a privacy level associated with the second service layer entity.

6. The method of claim 1, wherein the one or more security credentials comprise one or more keys.

7. The method of claim 6, wherein a size of the one or more keys is determined based on the at least one of the security level and the type of security protection mechanism associated with the second service layer entity.

8. A device comprising a processor and a memory, the memory storing computer-executable instructions which, when executed by the processor, cause the device to perform operations comprising:
   receiving, from a first service layer entity performing delegated authentication on behalf of a second service layer entity, a request for one or more security credentials;
   accessing a security profile associated with the second service layer entity, wherein the security profile comprises an indication of one or more security requirements associated with the second service layer entity, and wherein the one or more security requirements comprise an indication of at least one of a security level and a type of security protection mechanism associated with the second service layer entity;
   generating, based on the security profile, the one or more security credentials; and
   sending, to the first service layer entity, the one or more security credentials,
   wherein the one or more security credentials enable first service layer entity to establish a security association with at least one other service layer entity over a network,
   wherein the first service layer entity is implemented on an apparatus of the network and the other service layer entity is implemented on another apparatus of the network, and wherein the first service layer entity and the other service layer entity are interconnected to one another by one or more intermediate service layer entities.

9. The device of claim 8, wherein the security profile is received as part of a service enablement and security configuration process.

10. The device of claim 9, wherein the security profile is based on a type of service to be provided by the second service layer entity.

11. The device of claim 8, wherein the one or more security credentials are further generated based on a device profile associated with the second service layer entity, wherein the device profile comprises an indication of one or more capabilities of the second service layer entity.

12. The device of claim 8, wherein the one or more security credentials are further generated based on an entity profile associated with the second service layer entity, wherein the entity profile comprises an indication of one or more of a class of service, a type of service, a security level, and a privacy level associated with the second service layer entity.

13. The device of claim 8, wherein the one or more security credentials comprise one or more keys.

14. The device of claim 13, wherein a size of the one or more keys is determined based on the at least one of the security level and the type of security protection mechanism associated with the second service layer entity.

15. A computer-readable storage medium comprising computer-executable instructions which, when executed by a processor of a device, cause the device to perform operations comprising:
receiving, from a first service layer entity performing delegated authentication on behalf of a second service layer entity, a request for one or more security credentials;
accessing a security profile associated with the second service layer entity, wherein the security profile comprises an indication of one or more security requirements associated with the second service layer entity, and wherein the one or more security requirements comprise an indication of at least one of a security level and a type of security protection mechanism associated with the second service layer entity;
generating, based on the security profile, the one or more security credentials; and
sending, to the first service layer entity, the one or more security credentials,
wherein the one or more security credentials enable the first service layer entity to establish a security association with at least one other service layer entity over a network,
wherein the first service layer entity is implemented on an apparatus of the network and the other service layer entity is implemented on another apparatus of the network, and
wherein the first service layer entity and the other service layer entity are interconnected to one another by one or more intermediate service layer entities.

16. The computer-readable storage medium of claim 15, wherein the security profile is received as part of a service enablement and security configuration process.

17. The computer-readable storage medium of claim 16, wherein the security profile is based on a type of service to be provided by the second service layer entity.

18. The computer-readable storage medium of claim 15, wherein the one or more security credentials are further generated based on a device profile associated with the second service layer entity, wherein the device profile comprises an indication of one or more capabilities of the second service layer entity.

19. The computer-readable storage medium of claim 15, wherein the one or more security credentials comprise one or more keys.

20. The computer-readable storage medium of claim 19, wherein a size of the one or more keys is determined based on the at least one of the security level and the type of security protection mechanism associated with the second service layer entity.

* * * * *